(12) United States Patent
Lee et al.

(10) Patent No.: US 7,275,577 B2
(45) Date of Patent: Oct. 2, 2007

(54) SUBSTRATE BONDING MACHINE FOR LIQUID CRYSTAL DISPLAY DEVICE

(75) Inventors: Sang Seok Lee, Taegu-kwangyokshi (KR); Myoung Gu Kang, Kyongsangbuk-do (KR); Young Kug Lim, Kyongsangbuk-do (KR); Soo Min Kwak, Kyongsangbuk-do (KR); Jong Han Kim, Taegu-kwangyokshi (KR); Heung Sun Kim, Yongin-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/661,472

(22) Filed: Sep. 15, 2003

(65) Prior Publication Data

US 2004/0095546 A1   May 20, 2004

(30) Foreign Application Priority Data

Nov. 16, 2002  (KR) .................. 10-2002-0071366
Nov. 16, 2002  (KR) .................. 10-2002-0071368
Nov. 16, 2002  (KR) .................. 10-2002-0071370
Nov. 18, 2002  (KR) .................. 10-2002-0071714

(51) Int. Cl.
*B32B 41/00* (2006.01)
*B32B 37/10* (2006.01)

(52) U.S. Cl. .................. 156/351; 156/358; 156/378; 156/379; 156/382

(58) Field of Classification Search ............... 156/358, 156/351, 378, 379, 381, 382, 580, 556, 581; 29/833, 834
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,306,380 A * | 4/1994 | Hiroki ................... | 156/345.32 |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |

(Continued)

FOREIGN PATENT DOCUMENTS

DE   10352413   6/2004

(Continued)

OTHER PUBLICATIONS

JPO machine translation of JP2001-356353, which was submitted with the IDS filed Dec. 11, 2003.*

*Primary Examiner*—George Koch
(74) *Attorney, Agent, or Firm*—McKenna Long & Aldridge LLP

(57) ABSTRACT

A substrate bonding device for fabricating a liquid crystal display (LCD) device accurately aligns substrates of the LCD device while preventing the introduction of foreign material into the substrate bonding device, thereby substantially preventing the generation of defects within liquid crystal material of the LCD device.

113 Claims, 36 Drawing Sheets

U.S. PATENT DOCUMENTS

| | | | |
|---|---|---|---|
| 5,539,545 | A | 7/1996 | Shimizu et al. |
| 5,548,429 | A | 8/1996 | Tsujita |
| 5,642,214 | A | 6/1997 | Ishii et al. |
| 5,680,189 | A | 10/1997 | Shimizu et al. |
| 5,742,173 | A * | 4/1998 | Nakagomi et al. .......... 324/758 |
| 5,742,370 | A | 4/1998 | Kim et al. |
| 5,757,451 | A | 5/1998 | Miyazaki et al. |
| 5,766,407 | A * | 6/1998 | Miwa et al. ................ 156/382 |
| 5,852,484 | A | 12/1998 | Inoue et al. |
| 5,854,664 | A | 12/1998 | Inoue et al. |
| 5,861,932 | A | 1/1999 | Inata et al. |
| 5,875,922 | A | 3/1999 | Chastine et al. |
| 5,952,676 | A | 9/1999 | Sato et al. |
| 5,952,678 | A | 9/1999 | Ashida |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,219,126 | B1 | 4/2001 | Von Gutfeld |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 2001/0021000 | A1 | 9/2001 | Egami |
| 2002/0043344 | A1* | 4/2002 | Watanabe et al. ........ 156/583.4 |

FOREIGN PATENT DOCUMENTS

| | | |
|---|---|---|
| EP | 1 003 066 A1  A1 | 5/2000 |
| JP | 51-065656 | 6/1976 |
| JP | 57-038414 A1 | 3/1982 |
| JP | 57-088428 A1 | 6/1982 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 A1 | 8/1985 |
| JP | 60-217343 A1 | 10/1985 |
| JP | 61-007822 A1 | 1/1986 |
| JP | 61-055625 A1 | 3/1986 |
| JP | S62-054225 | 3/1987 |
| JP | S62-054228 | 3/1987 |
| JP | S62-054229 | 3/1987 |
| JP | 62-089025 A1 | 4/1987 |
| JP | 62-090622 A1 | 4/1987 |
| JP | 62-205319 A1 | 9/1987 |
| JP | 63-109413 A1 | 5/1988 |
| JP | 63-110425 A1 | 5/1988 |
| JP | 63-128315 A1 | 5/1988 |
| JP | 63-311233 A1 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 A1 | 5/1993 |
| JP | 05-154923 | 6/1993 |
| JP | 05-265011 A1 | 10/1993 |
| JP | 05-281557 A1 | 10/1993 |
| JP | 05-281562 A1 | 10/1993 |
| JP | H06-018829 | 1/1994 |
| JP | 06-051256 A1 | 2/1994 |
| JP | H06-064229 | 3/1994 |
| JP | 06-148657 A1 | 5/1994 |
| JP | 06-160871 | 6/1994 |
| JP | H06-194637 | 7/1994 |
| JP | 06-235925 | 8/1994 |
| JP | 06-265915 A1 | 9/1994 |
| JP | 06-313870 | 11/1994 |
| JP | 07-084268 | 3/1995 |
| JP | 07-128674 A1 | 5/1995 |
| JP | 07-181507 A1 | 7/1995 |
| JP | H07-275770 | 10/1995 |
| JP | H07-275771 | 10/1995 |
| JP | H08-076133 | 3/1996 |
| JP | 08-095066 A1 | 4/1996 |
| JP | 08-101395 | 4/1996 |
| JP | 08-106101 A1 | 4/1996 |
| JP | H08-110504 | 4/1996 |
| JP | H08-136937 | 5/1996 |
| JP | 08-171094 A1 | 7/1996 |
| JP | 08-190099 A1 | 7/1996 |
| JP | H08-173874 | 7/1996 |
| JP | 08-240807 A1 | 9/1996 |
| JP | 09-005762 A1 | 1/1997 |
| JP | 09-026578 A1 | 1/1997 |
| JP | H09-001026 | 1/1997 |
| JP | 09-061829 | 3/1997 |
| JP | 09-073075 A1 | 3/1997 |
| JP | 09-073096 A1 | 3/1997 |
| JP | H09-094500 | 4/1997 |
| JP | 09-127528 A1 | 5/1997 |
| JP | 09-230357 A1 | 9/1997 |
| JP | 09-281511 A1 | 10/1997 |
| JP | 09-311340 A1 | 12/1997 |
| JP | 10-104590 | 4/1998 |
| JP | 10-123537 A1 | 5/1998 |
| JP | 10-123538 A1 | 5/1998 |
| JP | 10-142616 A1 | 5/1998 |
| JP | 10-177178 | 6/1998 |
| JP | H10-174924 | 6/1998 |
| JP | 10-221700 A1 | 8/1998 |
| JP | 10-282512 A1 | 10/1998 |
| JP | 10-333157 | 12/1998 |
| JP | 10-333159 | 12/1998 |
| JP | 11-014953 A1 | 1/1999 |
| JP | 11-038424 A1 | 2/1999 |
| JP | 11-064811 A1 | 3/1999 |
| JP | 11-109388 A1 | 4/1999 |
| JP | 11-133438 | 5/1999 |
| JP | 11-142864 | 5/1999 |
| JP | 11-174477 A1 | 7/1999 |
| JP | 11-212045 A1 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 A1 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |

| | | | | | | |
|---|---|---|---|---|---|---|
| JP | 2001-091727 | 4/2001 | | JP | 2002-122870 | 4/2002 |
| JP | 2001-117105 | 4/2001 | | JP | 2002-122872 A1 | 4/2002 |
| JP | 2001-117109 | 4/2001 | | JP | 2002-122873 A1 | 4/2002 |
| JP | 2001-133745 | 5/2001 | | JP | 2002-131762 | 5/2002 |
| JP | 2001-133794 | 5/2001 | | JP | 2002-139734 | 5/2002 |
| JP | 2001-133799 | 5/2001 | | JP | 2002-156518 | 5/2002 |
| JP | 2001-142074 | 5/2001 | | JP | 2002-169166 | 6/2002 |
| JP | 2001-147437 | 5/2001 | | JP | 2002-169167 | 6/2002 |
| JP | 2001-154211 | 6/2001 | | JP | 2002-182222 | 6/2002 |
| JP | 2001-166272 | 6/2001 | | JP | 2002-202512 A1 | 7/2002 |
| JP | 2001-166310 | 6/2001 | | JP | 2002-202514 A1 | 7/2002 |
| JP | 2001-183683 | 7/2001 | | JP | 2002-214626 A1 | 7/2002 |
| JP | 2001-209052 | 8/2001 | | JP | 2002-229042 | 8/2002 |
| JP | 2001-209056 | 8/2001 | | JP | 2002-229471 | 8/2002 |
| JP | 2001-209057 | 8/2001 | | JP | 2002-236276 | 8/2002 |
| JP | 2001-209058 | 8/2001 | | JP | 2002-258299 | 8/2002 |
| JP | 2001-209060 | 8/2001 | | JP | 2002-236292 | 9/2002 |
| JP | 2001-222017 | 8/2001 | | JP | 2002-277865 | 9/2002 |
| JP | 2001-235758 | 8/2001 | | JP | 2002-277866 | 9/2002 |
| JP | 2001-215459 | 9/2001 | | JP | 2002-277881 | 9/2002 |
| JP | 2001-255542 | 9/2001 | | JP | 2002-287156 | 10/2002 |
| JP | 2001-264782 | 9/2001 | | JP | 2002-296605 | 10/2002 |
| JP | 2001-201750 | 10/2001 | | JP | 2002-311438 | 10/2002 |
| JP | 2001-272640 | 10/2001 | | JP | 2002-311440 | 10/2002 |
| JP | 2001-281675 | 10/2001 | | JP | 2002/311442 | 10/2002 |
| JP | 2001-281678 | 10/2001 | | JP | 2002-323687 | 11/2002 |
| JP | 2001-282126 | 10/2001 | | JP | 2002-323694 | 11/2002 |
| JP | 2001-305563 | 10/2001 | | JP | 2002-333628 | 11/2002 |
| JP | 2001-330837 | 11/2001 | | JP | 2002-333635 | 11/2002 |
| JP | 2001-330840 A1 | 11/2001 | | JP | 2002-333843 | 11/2002 |
| JP | 2001-356353 | 12/2001 | | JP | 2002-341329 | 11/2002 |
| JP | 2001-356354 A1 | 12/2001 | | JP | 2002-341355 | 11/2002 |
| JP | 2002-014360 A1 | 1/2002 | | JP | 2002-341356 | 11/2002 |
| JP | 2002-023176 A1 | 1/2002 | | JP | 2002-341357 | 11/2002 |
| JP | 2002-049045 A1 | 2/2002 | | JP | 2002-341358 | 11/2002 |
| JP | 2002-079160 | 3/2002 | | JP | 2002-341359 | 11/2002 |
| JP | 2002-080321 | 3/2002 | | JP | 2002-341362 | 11/2002 |
| JP | 2002-082340 A1 | 3/2002 | | KR | 2000-035302 A1 | 6/2000 |
| JP | 2002-090758 | 3/2002 | | WO | 02/07212 A1 | 1/2002 |
| JP | 2002-090759 A1 | 3/2002 | | | | |
| JP | 2002-090760 A1 | 3/2002 | | | | |
| JP | 2002-107740 A1 | 4/2002 | | | | |

* cited by examiner

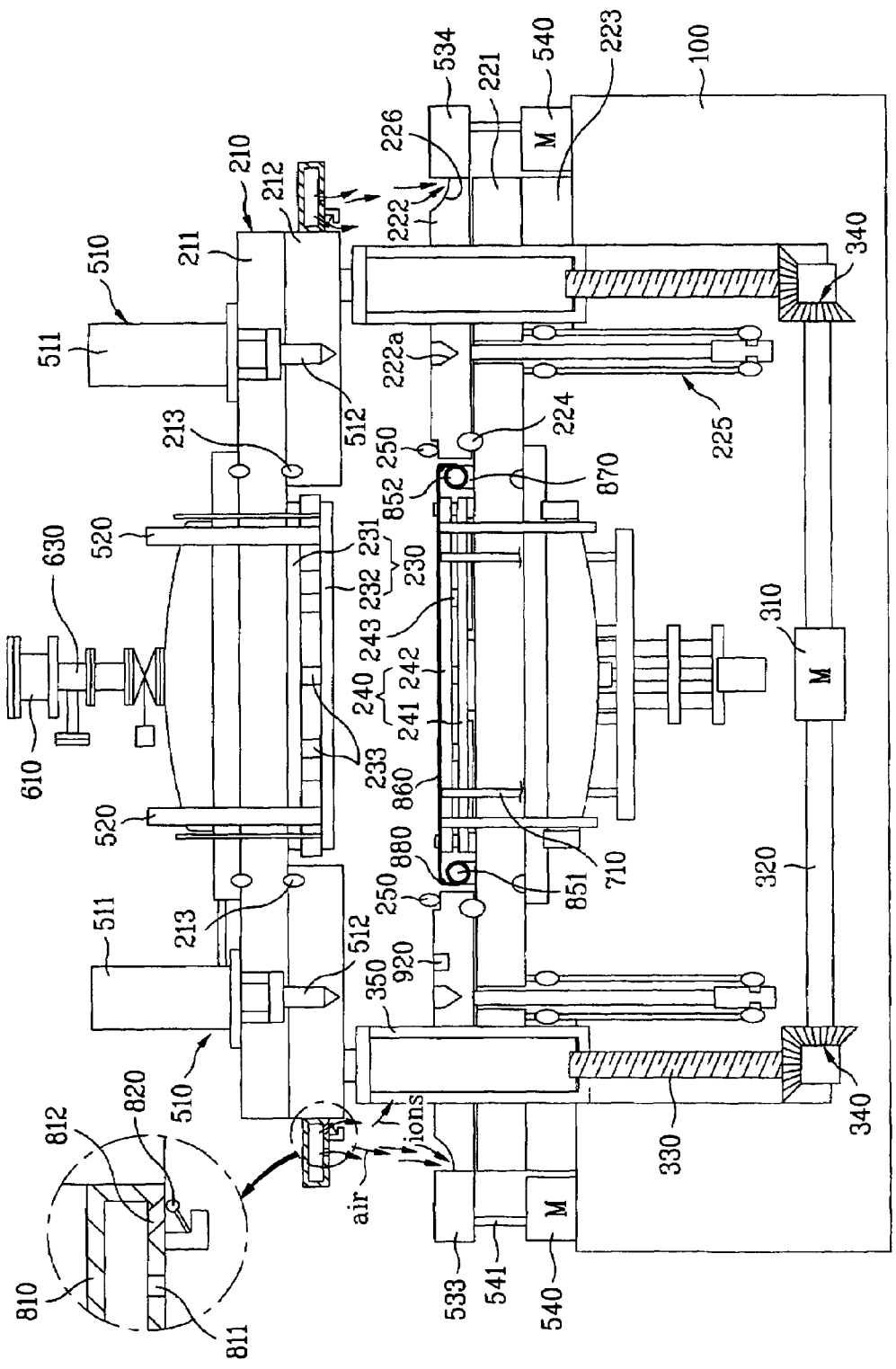

SUBSTRATE BONDING MACHINE FOR LIQUID CRYSTAL DISPLAY DEVICE

This application claims the benefit of the Korean Application Nos. P2002-71366, P2002-71368, and P2002-71370, each filed on Nov. 16, 2002, and P2002-71714, filed on Nov. 18, 2002, which is hereby incorporated by reference for all purposes as if fully set forth herein. This application incorporates by reference two applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to liquid crystal display (LCD) devices, and more particularly to a substrate bonding device facilitating the fabrication of large-sized LCD devices.

2. Background of the Related Art

With the expansion of the information society, a need has arisen for displays capable of producing high quality images in thin, lightweight packages and that consume little power. To meet such needs, research has produced a variety of flat panel display devices, including liquid crystal displays (LCD), plasma displays (PDP), electro luminescent displays (ELD), and vacuum fluorescent displays (VFD). Some of these display technologies have already been applied in various types of displays.

Of the various types of flat panel display devices, LCD devices, having excellent display quality, light weight, thin dimensions, and consuming low amounts of power, have been very widely used. In fact, in portable devices, such as notebook PC computers, LCD technology has already replaced cathode ray tubes (CRT) as the display of choice. Moreover, even in desktop PCs and in TV monitors, LCDs devices are becoming more common.

Despite various technical developments in LCD technology, however, research in enhancing the picture quality of LCD devices has been lacking compared to research in other features and advantages of LCD devices. Therefore, to increase the use of LCD devices as displays in various fields of application, LCD devices capable of expressing high quality images (e.g., images having a high resolution and a high luminance) with large-sized screens, while still maintaining a light weight, minimal dimensions, and low power consumption must be developed.

LCDs are generally fabricated by coating a patterned sealant material onto one of two substrates, providing the patterned sealant material with an injection hole, bonding the two substrates together in a vacuum, and injecting liquid crystal material through the injection hole and into a space between the two bonded substrates. It has also been suggested that the liquid crystal material may be provided to LCDs via a dispensing method, rather than an injection method. For example, Japanese Laid Open Patent Nos. 2000-284295 and 2001-005405 can be understood to disclose a method of dispensing liquid crystal material wherein, after liquid crystal material is dispensed and sealant material is coated onto one of the two substrates, the other of the two substrates is bonded to the one substrate in a vacuum.

Generally, liquid crystal material dispensing methods are advantageous over liquid crystal material injection methods because they reduce the number of fabrication steps required to fabricate LCD panels (e.g., formation of the liquid crystal injection hole, injection of the liquid crystal material, sealing of the liquid crystal injection hole, etc., are omitted), thereby simplifying fabrication of LCD panels. Accordingly, fabricating LCD panels by dispensing liquid crystal material have been the subject of recent research.

FIGS. 1 and 2 illustrate a related art substrate bonding device used in fabricating LCD panels formed with dispensed liquid crystal material.

Referring to FIGS. 1 and 2, the related art LCD device substrate bonding device is provided with a frame 10, an upper stage 21, a lower stage 22, a sealant dispensing part (not shown), a liquid crystal material dispensing part 30, an upper chamber unit 31, a lower chamber unit 32, chamber moving means, and stage moving means.

The sealant dispensing part (not shown) and liquid crystal dispensing part 30 are typically provided at a side portion of the frame 10. Moreover, the upper and lower chamber units 31 and 32, respectively, can be joined to each other to bond substrates of an LCD panel.

The chamber moving means generally includes a driving motor 40 for moving the lower chamber unit 32 laterally to predetermined positions where the substrates are to be bonded (S2) and where the sealant material is to be coated and where the liquid crystal material is to be dispensed (S1). The stage moving means includes a driving motor 50 for raising and lowering the upper stage 21 to predetermined positions.

A method for fabricating an LCD panel using the related art substrate bonding device will now be described in greater detail.

A first substrate 51 is positioned on the lower stage 22 of the lower chamber unit 32 and the chamber moving means 40 moves the lower chamber unit 32 under the upper chamber unit 31 such that the lower stage 22 is beneath the upper stage 21. Next, the driving motor 50 of the stage moving means lowers the upper stage 21 to a predetermined position such that the first substrate 51 is secured to the lowered upper stage 21. Subsequently, the upper stage 21, to which the first substrate 51 is secured, is raised to a predetermined position. The chamber moving means 40 then moves the lower chamber unit 32 to a position where a second substrate 52 is loaded on the lower stage 22. Subsequently, the chamber moving means 40 moves the lower chamber unit 32 to a first predetermined position S1 (as shown in FIG. 1). At the first predetermined position S1, sealant material coating and liquid crystal material dispensing processes are applied to the second substrate 52 using the sealant dispensing part (not shown) and the liquid crystal dispensing part 30, respectively. After the coating the sealant material and dispensing the liquid crystal material, the chamber moving means 40 moves the lower chamber unit 32 to a second predetermined position S2 (as shown in FIG. 2) where the first and second substrates 51 and 52, respectively, can be bonded together. Next, the upper and lower chamber units 31 and 32, respectively, are joined to each other such that the upper and lower stages 21 and 22, respectively, are arranged within an enclosed space. A vacuum is then created within the enclosed space using an evacuating means (not shown). After the vacuum is created, the stage moving means 50 lowers the upper stage 21 such that the first substrate 51, secured to the upper stage 21, contacts the second substrate 52 on the lower stage 22. The upper stage 21 is lowered until the two substrates become bonded, thereby completing the fabrication of the LCD panel.

Use of the aforementioned related art substrate LCD device substrate bonding device is disadvantageous, however, because the overall size of the aforementioned related art substrate bonding device is excessively large, especially when designed to fabricate large-sized LCD panels. The excessively large overall size of the related substrate bonding device creates problems when designing LCD device fabrication processes because an adequate amount of space must be provided to install the related art substrate bonding device while preserving the space in which other apparatuses of other processes are located.

Further, while the related art bonding device applies sealant and liquid crystal material to substrates supporting thin film transistors and color filter layers and bonds the two substrates together, the related art bonding device may increases the overall amount of time required to fabricate one LCD panel. More specifically, because liquid crystal material is dispensed, sealant material is coated, and substrates are bonded all using the same apparatus, substrates transported from preceding processes must stand idle until the processes performed by the related art substrate bonding device are complete. Moreover, the overall productivity of the LCD fabrication process is reduced since the related art substrate bonding device cannot process material transported thereto while other fabrication processes are in progress.

Still further, an imperfect seal can be formed between the joined upper and lower chamber units 31 and 32, respectively. As a result, air may leak from the external environment into the enclosed space defined by the upper and lower chamber units and the substrates may become damaged during bonding, thereby creating a defective bond.

Moreover, a substantially high degree of alignment is required to position the lower chamber unit 32 and successfully bond the two substrates. Such alignment can be extremely difficult and complicated and unduly lengthen the entire process of fabricating the LCD panel. Accordingly, the many positions the lower chamber 32 is required to move to (e.g., the first position S1 for dispensing the liquid crystal and coating the sealant material onto the second substrate 52, the second position S2 for bonding the two substrates, etc.) prevent the substrates from being properly aligned for a successful bonding.

Additionally, when loading and unloading substrates through the portion of the substrate bonding device, unbonded substrates cannot be loaded until the bonded substrates are unloaded. Accordingly, a bottleneck is often generated in the LCD fabrication line and a substantially continuous process is cannot be established. Accordingly, the overall amount of time required to fabricate and LCD device is increased.

Further, static electricity is generated between various components and foreign materials introduced during the loading of the substrates to their respective stages. Such static electricity damages the substrates, necessitates frequent cleaning of the stages, and results in a poor yield of the fabrication process.

SUMMARY OF THE INVENTION

Accordingly, the present invention is directed to a substrate bonding device for a liquid crystal display device that substantially obviates one or more of the problems due to limitations and disadvantages of the related art.

An advantage of the present invention provides a substrate bonding device for use in fabricating an LCD device that can reduce the overall time required to fabricate LCDs while enabling accurate and simple alignment of substrates.

Another advantage of the present invention provides a substrate bonding device for use in fabricating an LCD device that enables easy monitoring of a substrate bonding process and a progression of continuous substrate bonding.

Yet another advantage of the present invention provides a substrate bonding device for use in fabricating an LCD device that substantially prevents the introduction of foreign material into a region of the substrate bonding device where the substrates are bonded together, prevents generation of static electricity around the substrates, and promotes smooth bonding processes.

Still another advantage of the present invention provides a substrate bonding device for use in fabricating an LCD device that can substantially prevent fine particles from sticking to surfaces of the stages and that can substantially prevent the generation of defects within the LCD caused by foreign material introduced during a substrate bonding process.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a substrate bonding device may, for example, include a base frame for providing an outer appearance; a lower chamber unit mounted to the base frame; an upper chamber unit positioned over the lower chamber unit and joinable to the lower chamber unit; chamber moving means mounted to the base frame for raising and lowering the upper chamber unit; an upper stage and a lower stage provided within interior spaces of the upper and lower chamber units, respectively, for securing a first substrate and a second substrate, respectively; alignment cameras provided to at least one of the upper and lower chamber units for verifying an alignment state of alignment marks formed on the first and second substrates; and alignment means provided to side surfaces of the lower chamber unit for adjusting relative positions of the first and second substrates.

In another aspect of the present invention, a substrate bonding device may, for example, include a base frame for providing an outer appearance; a lower chamber unit mounted to the base frame; an upper chamber unit positioned over the lower chamber unit and joinable to the lower chamber unit; chamber moving means mounted to the base frame for raising and lowering the upper chamber unit; an upper stage and a lower stage provided within interior spaces of the upper and lower chamber units, respectively, for securing a first substrate and a second substrate, respectively; sealing means provided to at least one surface of the upper and lower chamber units; and a case for enclosing the upper and lower chamber units, the case having an side portion, wherein an opening is provided in the side portion, through which the substrates may be inserted.

In a further aspect of the present invention, a substrate bonding device may, for example, include a base frame for providing an outer appearance; a lower chamber unit mounted to the base frame; an upper chamber unit positioned over the lower chamber unit and joinable to the lower chamber unit; chamber moving means mounted to the base frame for raising and lowering the upper chamber unit; an upper stage and a lower stage provided within interior spaces of the upper and lower chamber units, respectively, for securing a first substrate and a second substrate, respectively; spraying means provided along side portions of one of the upper and lower chamber units for spraying gas (e.g., nitrogen, air, etc.) toward sides of the other of the upper and lower chamber units; blowing means for blowing gas through the spraying means; and a first flow tube having a first end in communication with the spraying means and a second end in communication with the blowing means.

In still a further aspect of the present invention, a method of protecting stages in a substrate bonding device may, for example, include positioning a protection sheet over a surface of one of an upper and lower stage; verifying a time during which the protection sheet is replaced; and rotating first and second reels when the time for replacing the protection sheet is determined, wherein a used protection sheet is wound over the first reel and an unused protection sheet is wound off the second reel and over the surface of the one of the upper and lower stage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 35 illustrates the principles of the fourth aspect of the present invention applied to the substrate bonding device in accordance with the third aspect of the present invention.

DETAILED DESCRIPTION OF THE ILLUSTRATED EMBODIMENTS

Reference will now be made in detail to embodiments of the present invention, examples of which are illustrated in the accompanying drawings.

Figure 1:
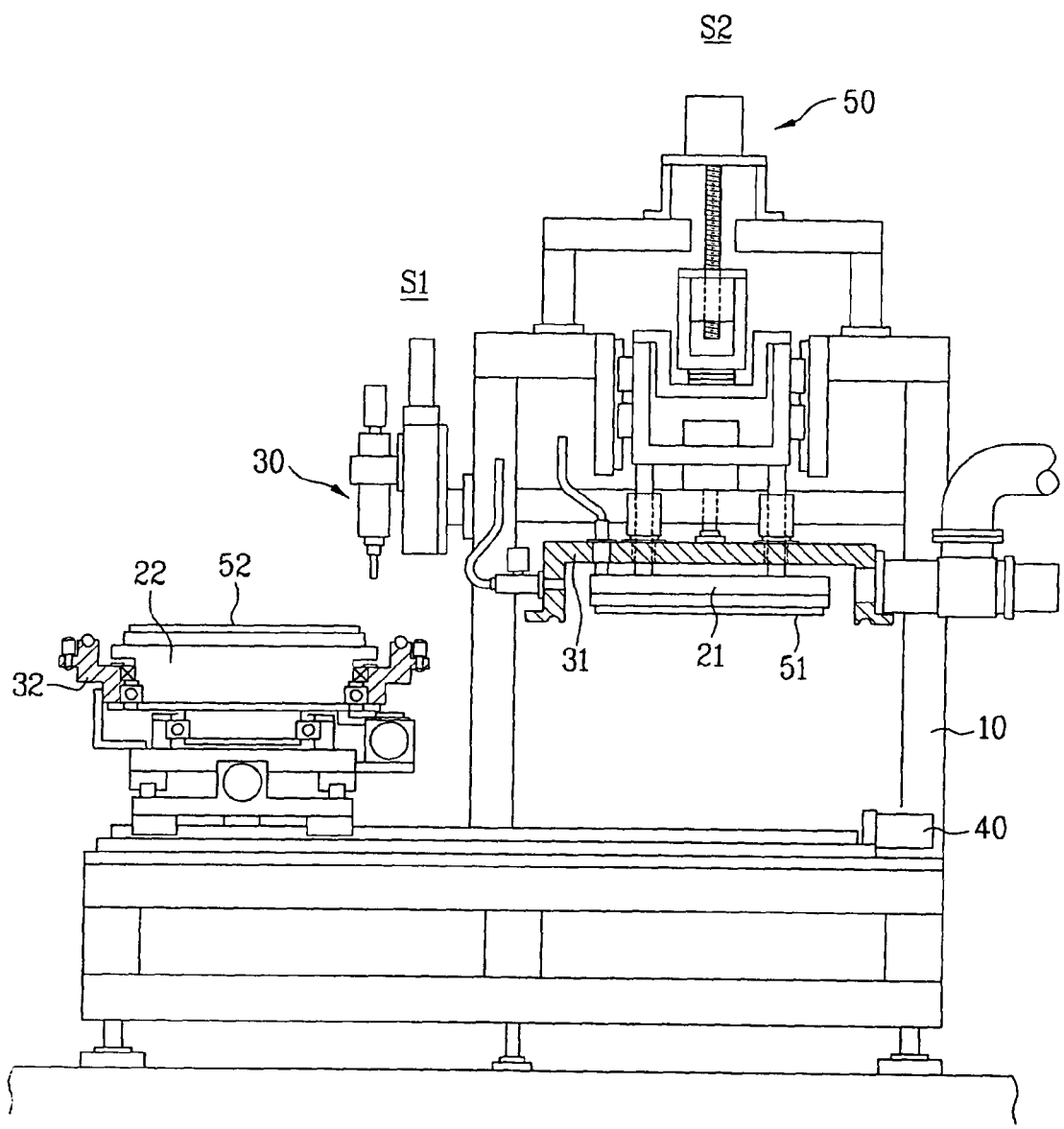
FIGS. 1 and 2 illustrate a related art substrate bonding device for use in fabricating LCD panels formed via liquid crystal material dispensing methods.
Figure 2:
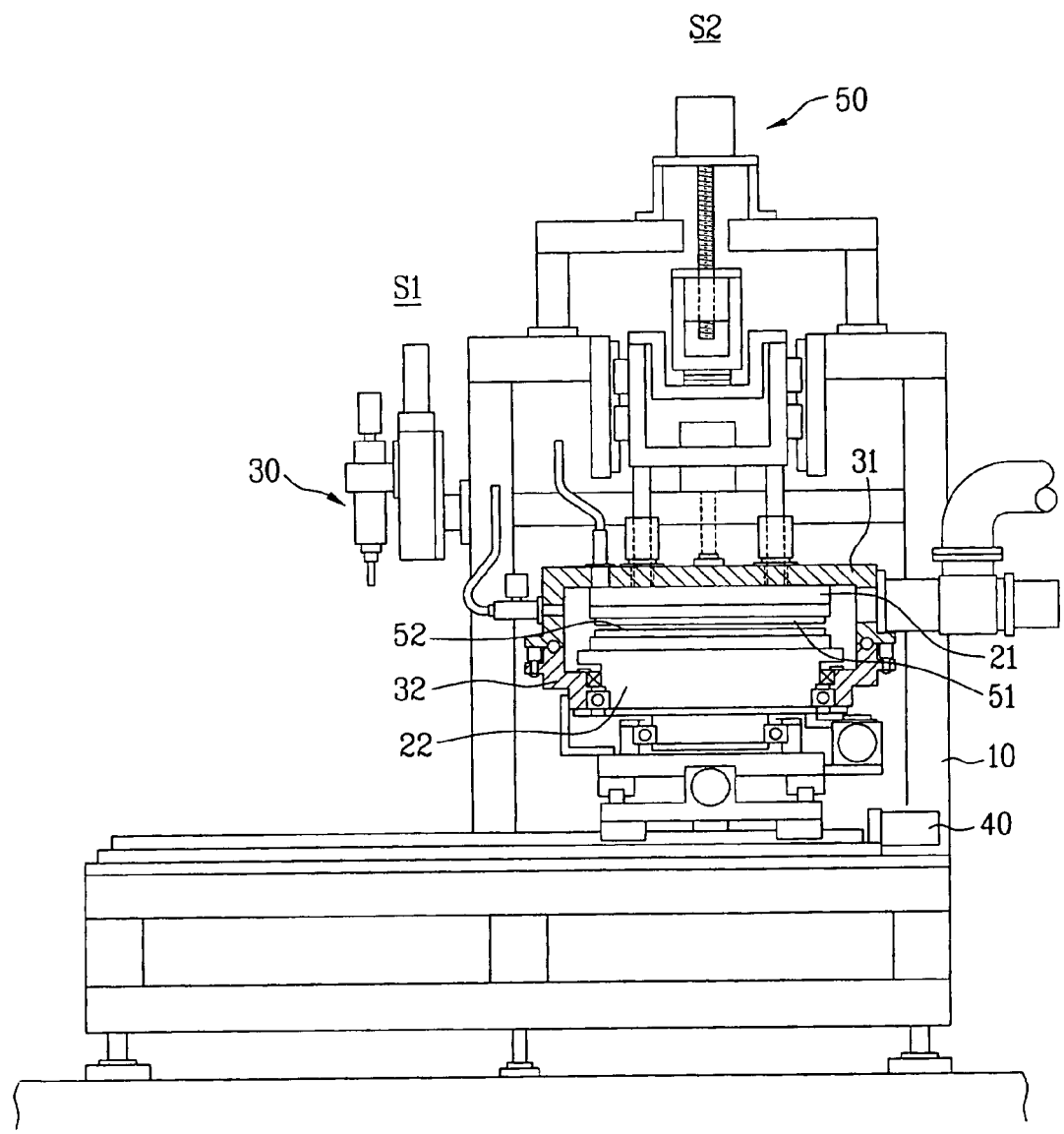
Figure 3:
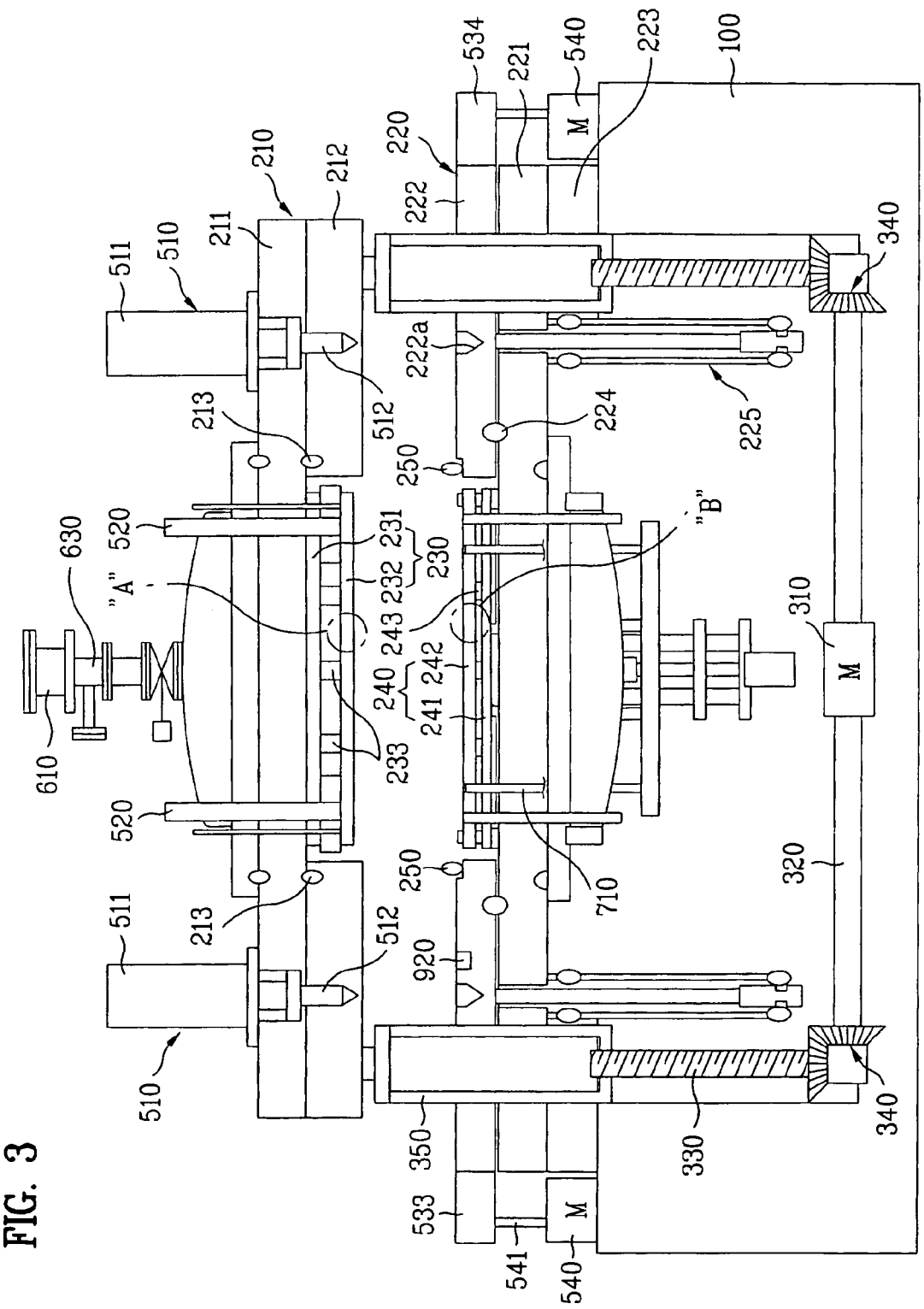
FIG. 3 illustrates a substrate bonding device for fabricating LCD panels in accordance with a first aspect of the present invention in an unloaded state.

FIG. 3 illustrates a substrate bonding device for fabricating LCD panels in accordance with a first aspect of the present invention in an unloaded state.

Figure 5:
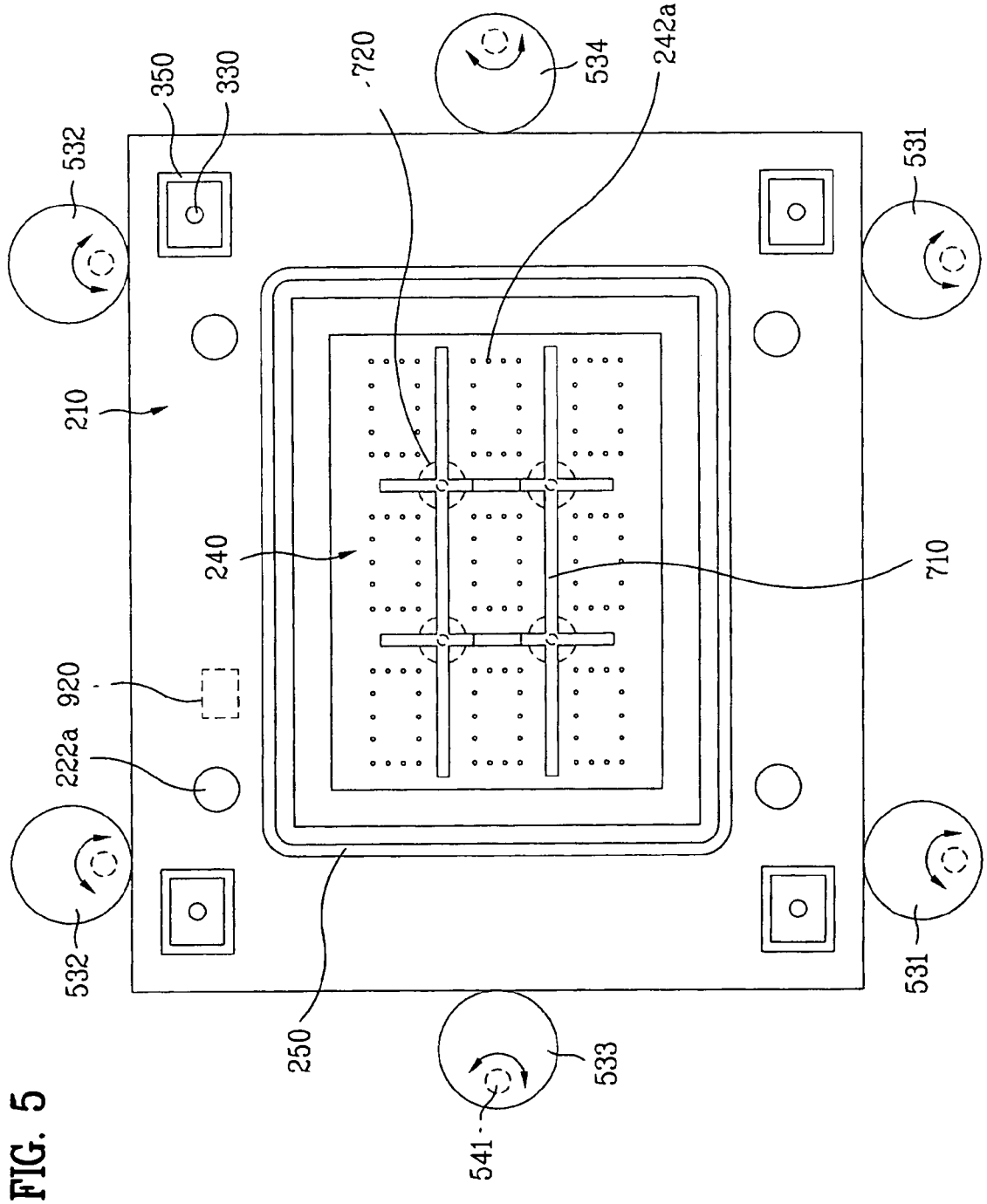
FIG. 5 illustrates a plan view of an arrangement of rotatable cams within the substrate bonding device in accordance with the first aspect of the present invention.
Figure 6:
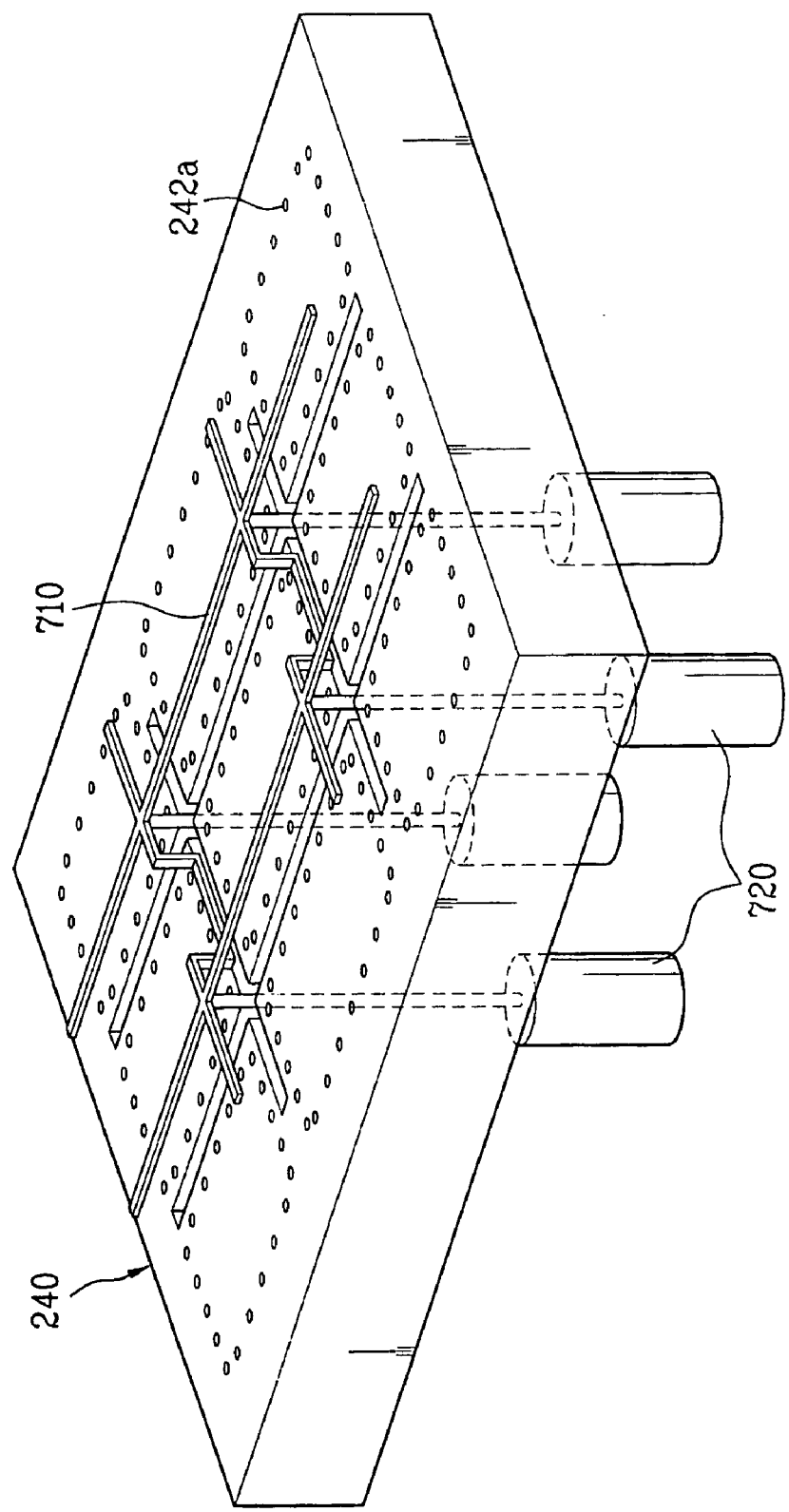
FIG. 6 illustrates a perspective view of support means within the substrate bonding device in accordance with the first aspect of the present invention.
Figure 7:
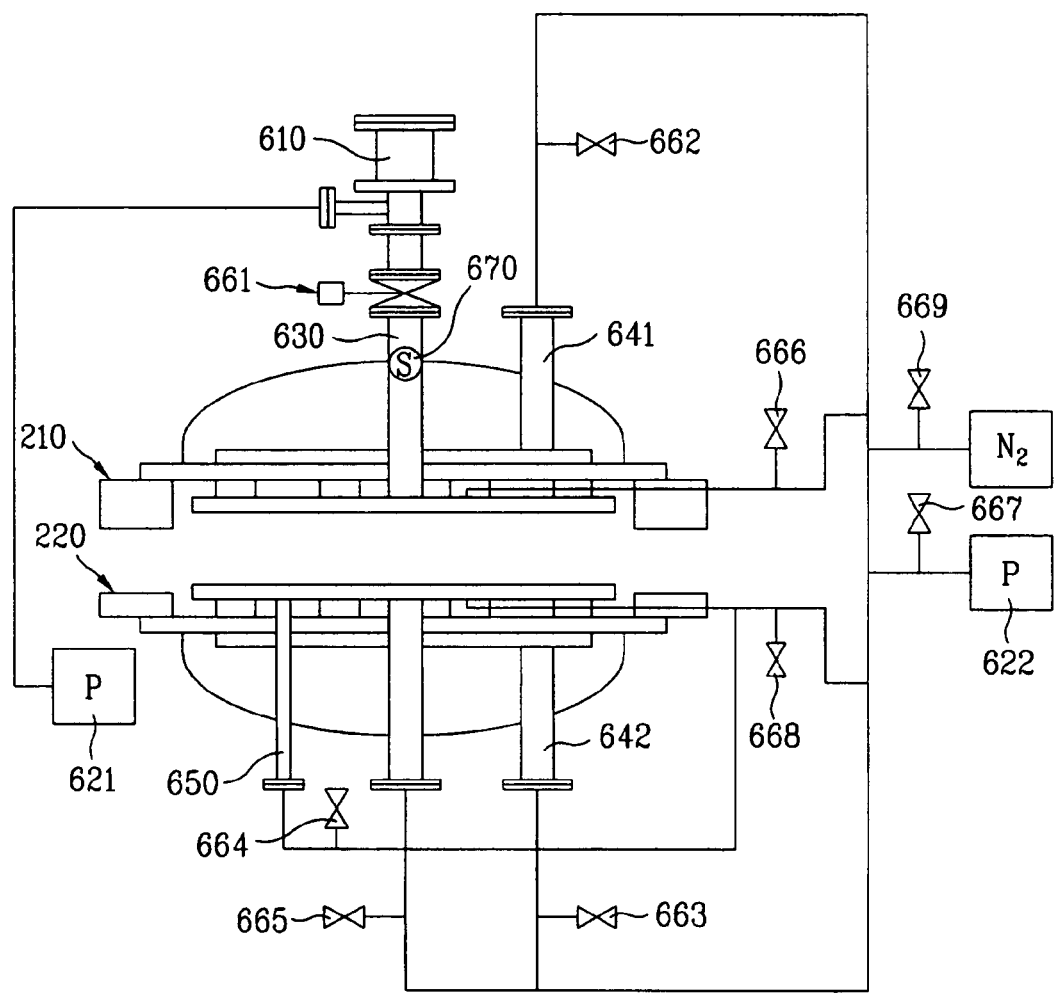
FIG. 7 schematically illustrates vacuum pumps and pipelines within the substrate bonding device in accordance with the first aspect of the present invention.
Figure 8:
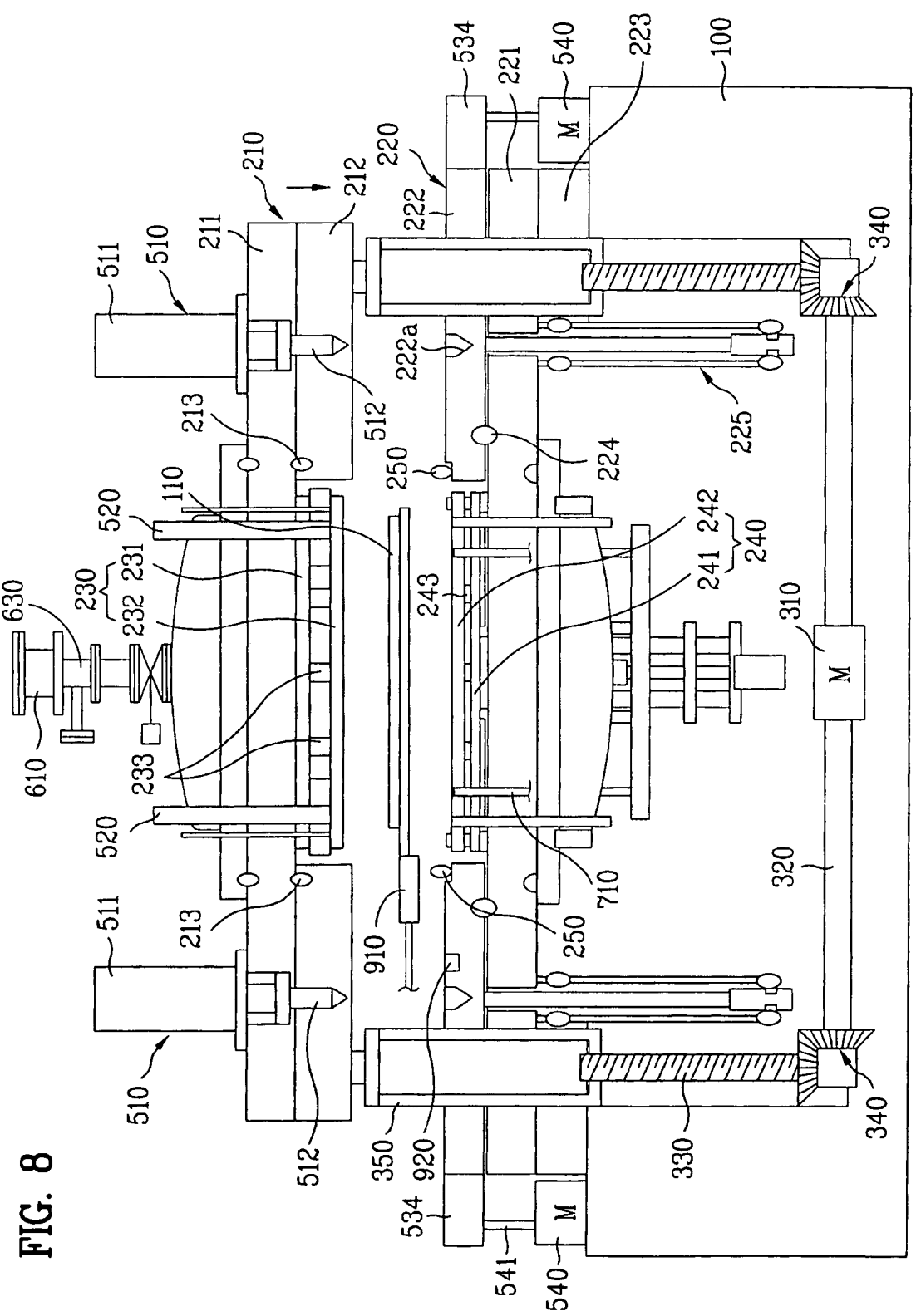
FIG. 8 illustrates the loading of a first substrate within the substrate bonding device in accordance with the first aspect of the present invention.

Referring to generally to FIG. 3, the substrate bonding device in accordance with the principles of the first aspect of the present invention may, for example, include a base frame 100; an upper chamber unit 210; a lower chamber unit 220; chamber moving means (e.g., 310, 320, 330, 340, and 350); an upper stage 230; and a lower stage 240; sealing means (e.g., 250); alignment cameras 520; alignment means (e.g., 531, 532, 533, 534, 540, and 541) shown, for example, in FIG. 5; support means (e.g., 710 and 720), shown for example, in FIG. 6; vacuum pumping means (e.g., 610, 621, and 622) shown, for example, in FIG. 7; and interlocking means (e.g., 510).

In one aspect of the present invention, the base frame 100 may be fixed to a supporting structure or surface (e.g., the ground), may form the exterior appearance of the substrate bonding device, and may support different components discussed in greater detail below.

In another aspect of the present invention, upper and lower stages 230 and 240 may be fixed to the upper chamber unit 210 and the lower chamber unit 220, respectively. As will be described in greater detail below, the upper and lower chamber units 210 and 220 may be selectively joined to each other to define an interior space.

The upper chamber unit 210 may, for example, include an upper base 211 that may be exposed to an external environment and an upper chamber plate 212 immovably attached to a bottom surface of the periphery of the upper base 211. In one aspect of the present invention, the upper chamber plate 212 may be provided as a rectangular rim and define an interior space within which the upper stage 230 is fixed. Since the upper stage 230 is fixed to the upper chamber unit 210, the upper stage may be raised and lowered with the upper chamber unit 210. In another aspect of the present invention, a first seal member 213 may be arranged between the upper base 211 and the upper chamber plate 212 of the upper chamber unit 210 to seal the interior space defined by the upper chamber plate 212 from the external environment. In one aspect of the present invention, the first seal member 213 may be provided as a gasket, an o-ring, or the like, suitable for sealing.

The lower chamber unit 220 may, for example, include a lower base 221 fixed to the base frame 100 and a lower chamber plate 222 arranged above a top surface of the periphery of the lower base 221. In one aspect of the present invention, the lower chamber plate 222 maybe provided as a rectangular rim and define an interior space within the which the lower stage 240 is fixed. In another aspect of the present invention the lower chamber plate 222 may be movable in left, right, forward, and backward (i.e., lateral) directions with respect to the lower base 221. In another aspect of the present invention, the lower chamber unit 220 may include a fixing plate 223 for fixing the lower base 221 to the base frame 100. In yet another aspect of the present invention, a second seal member 224 may be arranged between the lower base 221 and the lower chamber plate 222 of the lower chamber unit 220 and may seal the interior space defined by the lower chamber plate 222 from a the external environment. In one aspect of the present invention, the second seal member 224 may be provided as a gasket, an O-ring, or the like, suitable for sealing.

According to the principles of the present invention, at least one support part 225 may be arranged between the lower base 221 and the lower chamber plate 222 for maintaining the lower chamber plate 222 a predetermined a distance from the upper surface of the lower base 221. The support part 225 may include a first end attached to a bottom portion of the lower chamber plate 222 and a second end that is movable in lateral directions with respect to the lower base 221 and is attached to a piece that is attached to a bottom portion of the lower base 221. Accordingly, the support part 225 enables the lower chamber plate 222 to move in left, right, forward, and backward directions relative to the lower base 221.

Referring still to FIG. 3, the aforementioned chamber moving means may, for example, include a driving motor 310 fixed to the base frame 100, a driving shaft 320 coupled to the driving motor 310, a connecting shaft 330 arranged substantially perpendicular to the driving shaft 320 for receiving a driving force from the driving shaft 320, a connecting part 340 for connecting the driving shaft 320 to the connecting shaft 330, and a jack part 350 mounted at an end of the connecting shaft 330.

In one aspect of the present invention, the driving motor 310 may be arranged within an interior bottom portion of the base frame 100 and may be provided as a bilateral shaft motor, having shafts horizontally projecting from both sides of the driving motor 310. The driving shaft 320 may be connected to the driving motor 310 and transmit driving forces along a horizontal direction to the connecting part 340 while the connecting shaft 330 may be connected to the connecting part 340 to transmit the driving force along a vertical direction with respect to the driving shaft 320. The jack part 350 may be provided at the end of the connecting shaft 330, may be connected to the upper chamber unit 210, and may include a nut housing to move the upper chamber unit 210 upwardly and downwardly, depending on a rotation direction of rotation of the connecting shaft 330. The connecting part 340 may be provided as a system of bevel gears to translate a rotational force supplied from the driving shaft 320 along a horizontal direction into a vertical rotational force to the connecting shaft 330.

According to the principles of the present invention, the upper and lower stages 230 and 240, respectively, may each include a fixing plate 231 and 241, respectively, fixed to a respective one of the upper chamber unit 210 and the lower chamber unit 220; a securing plate 232 and 242, respectively, for securing the first and second substrates; and a plurality of fixing blocks 233 and 243, respectively, arranged between respective pairs of the fixing plates 231 and 241 and the securing plates 232 and 242. In one aspect of the present invention, the securing plates 232 and 242 may each be provided as an electrostatic chuck (ESC) formed of a material such as polyimide for securing a substrate to a respective one of the stages by applying an electrostatic charge.

Figure 4A:
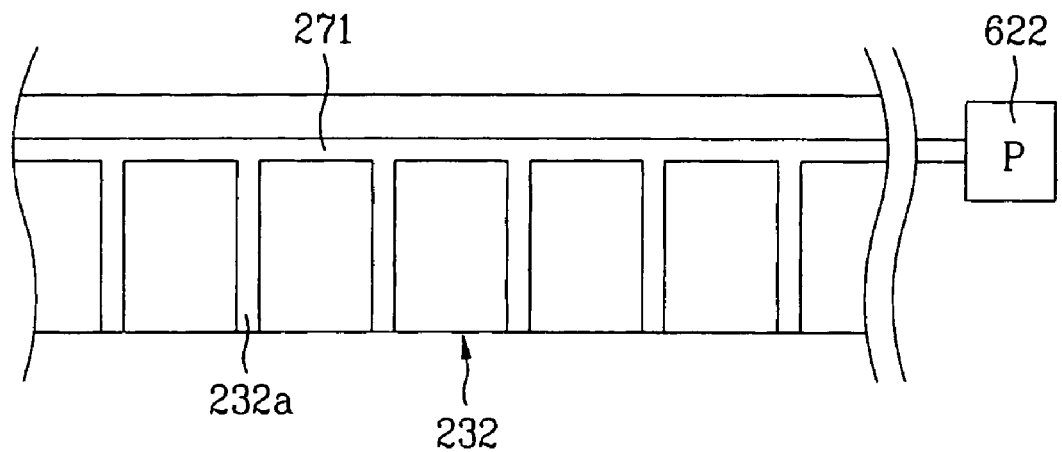
FIGS. 4A and 4B illustrate the interior structures of stages within the substrate bonding device in accordance with the first aspect of the present invention.
Figure 4B:
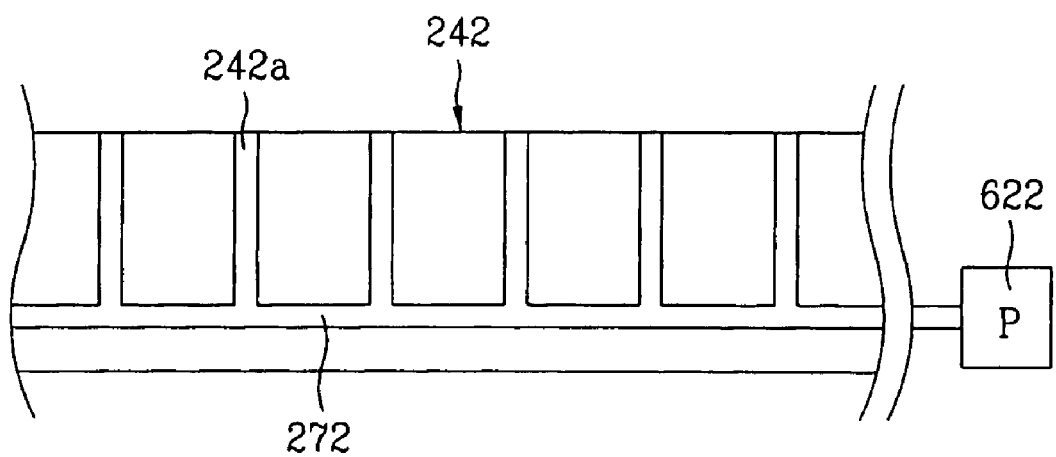

FIGS. 4A and 4B illustrate the interior structures of stages within the substrate bonding device in accordance with the principles of the present invention.

FIGS. 4A and 4B illustrate enlarged sectional views of "A" and "B" regions, respectively, shown in FIG. 3. Accordingly, and while referring to FIGS. 4A and 4B, each of the securing plates 232 and 242 may, for example, additionally include a plurality of holes 232a and 242a, respectively, for transmitting a suction force to secure respective ones of the substrates. Accordingly, each of the plurality of holes 232a and 242a may be in communication with a respective one of a vacuum pipeline 271 and 272, respectively, formed within a respective one of the upper stage 230 and lower stage 240. In one aspect of the present invention, each vacuum pipeline 271 and 272 may be connected to a vacuum pump means (e.g., 622, as shown in FIG. 7) for generating the suction force.

Referring back to FIG. 3, the sealing means 250 (hereinafter referred to as a third seal member) may be provided as an O-ring, formed of a material such as rubber, and fitted along a top surface of the lower chamber plate 222 of the lower chamber unit 220. In one aspect of the present invention, the third seal member 250 may project from the top surface of the lower chamber plate 222 to a predetermined height and be formed to a predetermined thickness sufficient to prevent substrates, secured by respective ones of the upper and lower stages 230 and 240, from becoming proximately arranged next to each other upon initially joining the upper and lower chamber units 210 and 220, as will be discussed in greater detail below. In another aspect of the present invention, the thickness of the third seal member 250 may be sufficient to permit the substrates to contact each other when the third seal member 250 is compressed.

According to the principles of the present invention, the aforementioned alignment means may be used to align substrates 110 and 120 secured to upper and lower stages 230 and 240, respectively. In one aspect of the present invention, the alignment means may be coupled to the lower chamber unit 220 and, during alignment of the substrates 110 and 120, the lower stage 240 may be kept substantially stationary while the position of the upper stage 230 is adjusted in accordance with the position of the lower chamber plate 222, adjustable with the alignment means. In one aspect of the present invention, the alignment means may, for example, include a plurality of cams 531, 532, 533, and 534 and step motors 540 connected to shafts 541 for driving the cams 531, 532, 533, and 534.

FIG. 5 illustrates a plan view of an arrangement of the rotatable cams in the substrate bonding device in accordance with the principles of the present invention.

Referring to FIGS. 3 and 5, each of the cams 531, 532, 533, and 534 may be rotatably arranged to selectively contact a peripheral surface of the lower chamber plate 222. In one aspect of the present invention, the cams 531, 532,533, and 534 may be arranged substantially symmetrically along each of the peripheral surfaces of the lower chamber plate 222. In another aspect of the present invention, each of the cams may be eccentrically rotatable such that, upon rotating, the lower chamber plate 222 may be pushed in a predetermined direction. In accordance with the principles of the present invention, the lower chamber unit may be defined by four sides, wherein a first pair of opposing sides may be longer than a second pair of opposing sides. Accordingly, two cams may be rotatably arranged to selectively contact each side of the first pair of opposing sides and one cam may be arranged to selectively contact a middle portion of each side of the second pair of opposing sides such that the lower chamber plate 222 may be movable in the left, right, forward, and backward directions. In one aspect of the present invention, each of the cams 531 532, 533, and 534 may rotate substantially in unison to push the lower chamber plate 222 along a predetermined direction. For example, if first cams 531 are rotated to push the lower chamber plate 222 along a predetermined direction, the second cams 532, arranged opposite the first cams 531, and the third and fourth cams 533 and 534, respectively, arranged adjacent the first cams 531, may all rotate substantially in unison such that the lower chamber plate 222 is pushed along the predetermined direction. According to the principles of the present invention, a distance between surfaces of oppositely arranged cams (e.g., 531 and 532 or 533 and 534) may remain substantially constant (e.g., the length or width of the lower chamber plate 222).

According to the principles of the present invention, the interlocking means 510 may, for example, includes a plurality of holes 222a provided in the lower chamber plates 222 of the lower chamber unit 220, and a plurality of linear actuators 511 fixed along a periphery of the upper chamber unit 210 for lowering corresponding ones of the plurality of movable shafts 512 until the movable shafts 512 are received within respective ones of the holes 222a.

FIG. 6 illustrates a perspective view of support means within the substrate bonding device in accordance with the first aspect of the present invention.

Referring to FIGS. 3 and 6, the support means may, for example, include a lift pin 710 and a plurality of actuators 720. In one aspect of the present invention, the lift pin 710 may have a thickness sufficient to support at least one substrate while substantially preventing the at least one substrate from sagging. A central region of the lift pin 710 may include a downwardly bent portion for allowing a loader 910 to support the at least one substrate without interfering with the lift pin 710. Moreover, portions of the lift pin 710 may be raised through the lower stage 240 and above the upper surface of the lower stage 240 to facilitate the safe seating of the substrate 120 as it is loaded onto the lower stage 240. In one aspect of the present invention, when a substrate is not loaded onto the lower stage 240, a top surface of the lift pin 710 may be positioned below the top surface of the lower stage 240. In another aspect of the present invention, a plurality of actuators 720 may raise and lower the lift pin 710 as required. Accordingly, the support means may facilitate the unloading of the bonded and unbonded substrates seated on the lower stage 240 (see, for example FIG. 21).

FIG. 7 schematically illustrates vacuum pumps and pipelines within the substrate bonding device in accordance with the first aspect of the present invention.

Referring to FIGS. 3 and 7, the aforementioned vacuum pumping means 610, 621, and 622 may be provided to at least one of the upper and lower chamber units 210 and 220 and may evacuate the sealed interior space defined by the upper and lower chamber units 210 and 220 joined together. In one aspect of the present invention, the vacuum pumping means 610, 621, and 622 may, for example, include a high vacuum pump (Turbo Molecular Pump, "TMP") 610 and a first and second low vacuum pump (Dry-Pump) 621 and 622, respectively.

The first low vacuum pump 621 may be connected to a high vacuum chamber pipeline 630 provided at a central region of the upper chamber unit 210 and enable the high vacuum pump 610 and the interior spaces defined by the upper and lower chamber plates 212 and 222 to be in communication with each other. Moreover, the first low vacuum pump may evacuate the sealed interior space, definable by the upper and lower chamber units 210 and 220 to a predetermined pressure.

The second low vacuum pump 622 may be connected to low vacuum chamber pipelines 641 and 642 passing through side regions of the upper and lower chamber units 210 and 220. Further, the second low vacuum pump 622 may be connected to pipelines in the upper and lower stages 230 and 240 and to a substrate securing pipeline 650 connected to the vacuum pipelines 271 and 272 in the stages 230 and 240, respectively, for securing the substrates using a suction force. The pipelines 630, 641, 642, and 650 may include at least one shut off valve 661, 662, 663, 664, 665, 666, 667, 668, and 669. The high pressure vacuum pipeline 630 may include a pressure sensor 670 for measuring a pressure inside of the interior spaces the substrates are held therein.

As will be discussed in greater detail below, the low vacuum chamber pipelines 641 and 642 and the substrate securing pipeline 650, in communication with the second low vacuum pump 622, may be used as pipelines for venting. Accordingly, a gas such as nitrogen ($N_2$) may be injected into the sealed interior space definable by the upper and lower chamber units 210 and 220 for returning a pressure therein from a vacuum state to an atmospheric pressure.

Referring back to FIG. 3, a plurality of alignment cameras 520 may be mounted within at least one of the upper and lower chamber units 210 and 220, respectively, such that alignment marks (not shown) formed on the substrates (not shown), secured by the upper or lower stages 230 or 240, may be observed through at least one of the upper chamber unit 210 and the lower chamber unit 220.

A method for fabricating an LCD device using the substrate bonding device shown in FIGS. 3 to 7 will now be described in greater detail with reference to FIGS. 8 to 19B.

The substrate bonding device may first be provided in the unloaded state as shown in FIG. 3. Subsequently, a first substrate 110 may be brought into a space between the upper and lower chamber units 210 and 220, respectively, via a loader 910.

Figure 9:
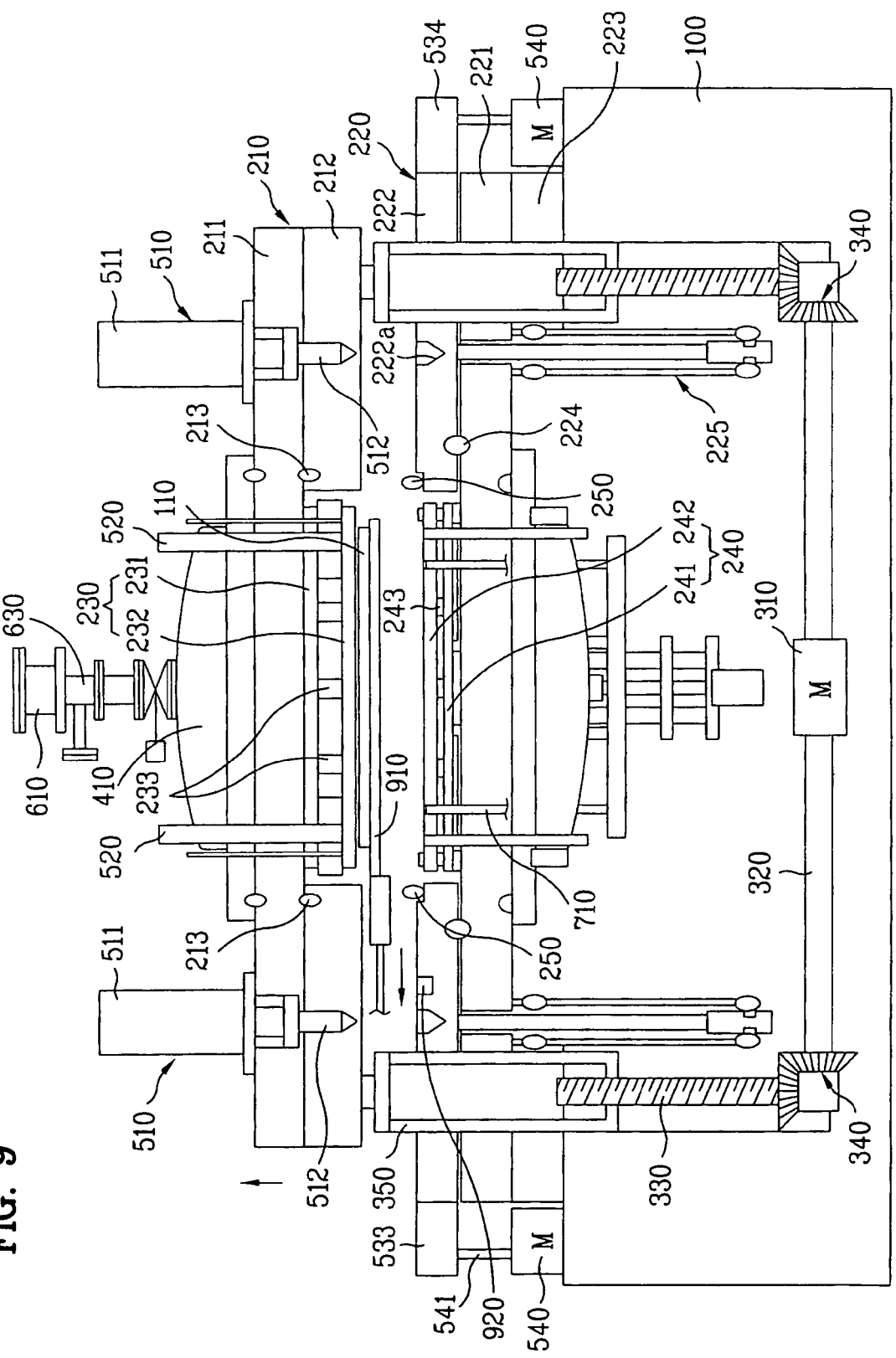
FIGS. 9 and 10 illustrate the securing of a first substrate to an upper stage within the substrate bonding device in accordance with the first aspect of the present invention.

Next, and while referring to FIG. 9, the upper chamber unit 210 may be lowered from its original position such that the upper stage 230 is arranged proximate the first substrate 110. The first substrate 110 may then become secured to the upper stage 230 by a suction force generated by the second low vacuum pump 622 and by an electrostatic charge (ESC) generated by the securing plate 232.

Figure 10:
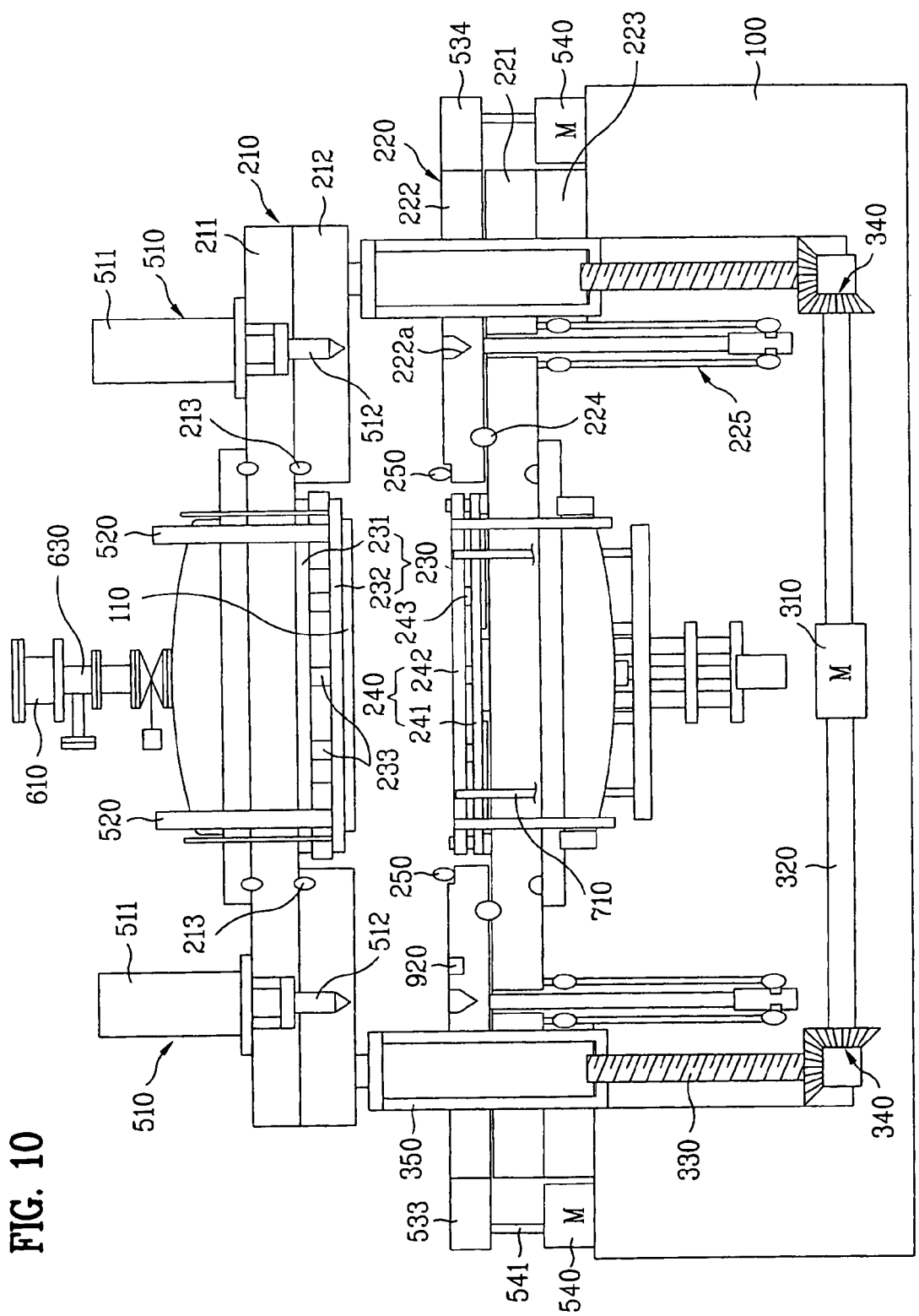

Referring now to FIG. 10, after the first substrate 110 has been secured to the upper stage 230, the upper chamber unit 210 may be raised to its original position and the loader 910 may be removed from the substrate bonding device.

Figure 11:
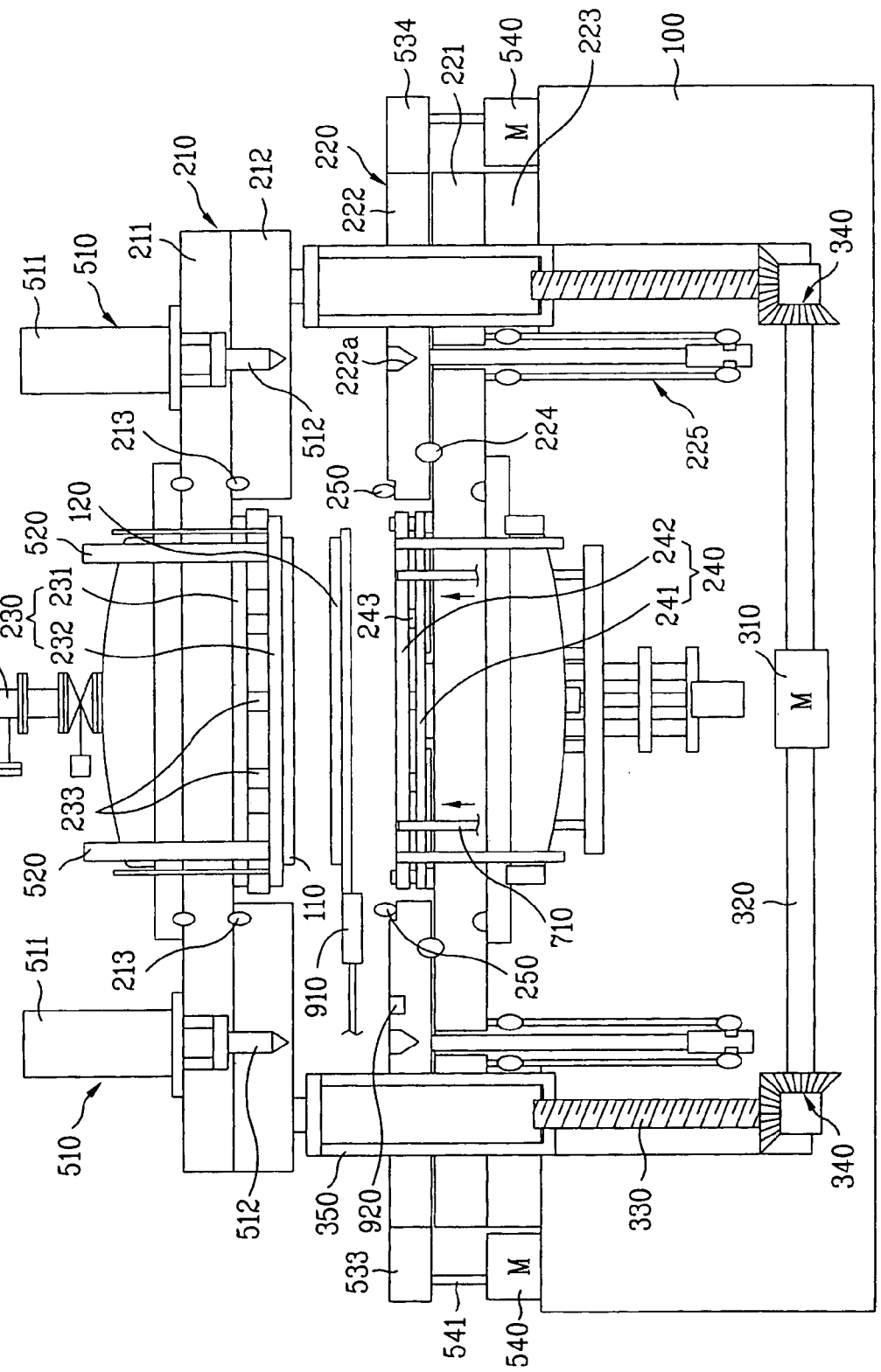
FIGS. 11 to 13 illustrate the loading of a second substrate and the securing of the second substrate to a lower stage within the substrate bonding device in accordance with the first aspect of the present invention.
Figure 12:
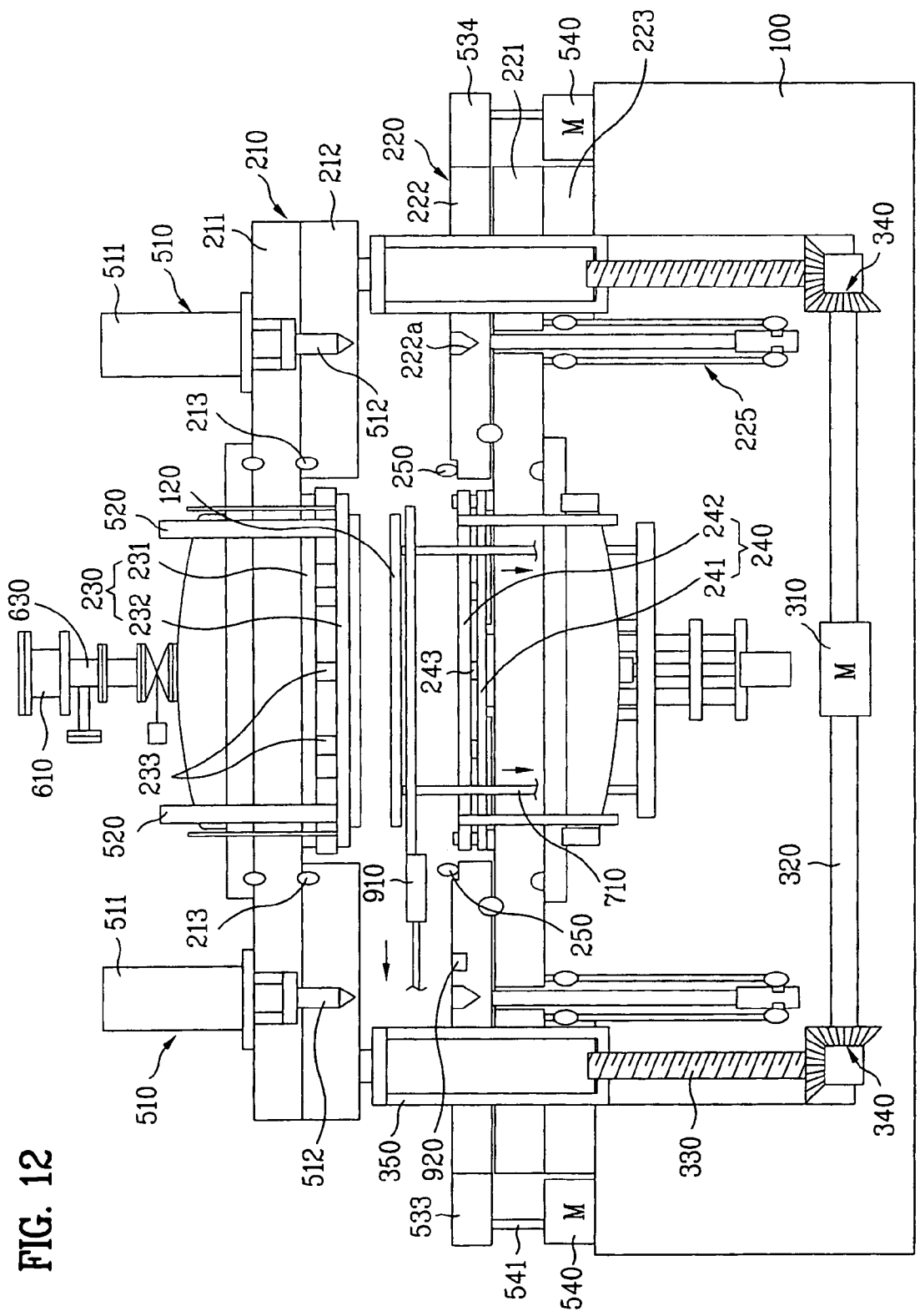

Next, and with reference to FIG. 11, the loader 910 may be re-inserted inserted into the substrate bonding device while supporting the second substrate 120. Upon loading the second substrate 120 into the substrate bonding device, the lift pin 710 may be raised from its original position, through the lower stage 230 and from below the upper surface of the lower stage 230, to push the second substrate 120 away from the loader 910. Accordingly, the lift pin 710 may support the second substrate 120 at a predetermined height above the loader 910 (as shown in FIG. 12). When the second substrate 120 is supported at the predetermined height, the loader 910 may be removed from the substrate bonding device. Next, the lift pin 710 may be lowered such that the second substrate 120 rests on, and is supported by, the lower stage 240. When the second substrate 120 is supported by the lower stage 240, the second substrate 120 may be secured to the lower stage 240 using suction forces and electrostatic charges. When the first and second substrates 110 and 120 are secured to their respective stages 230 and 240, loading of the substrate bonding device is complete.

Figure 13:
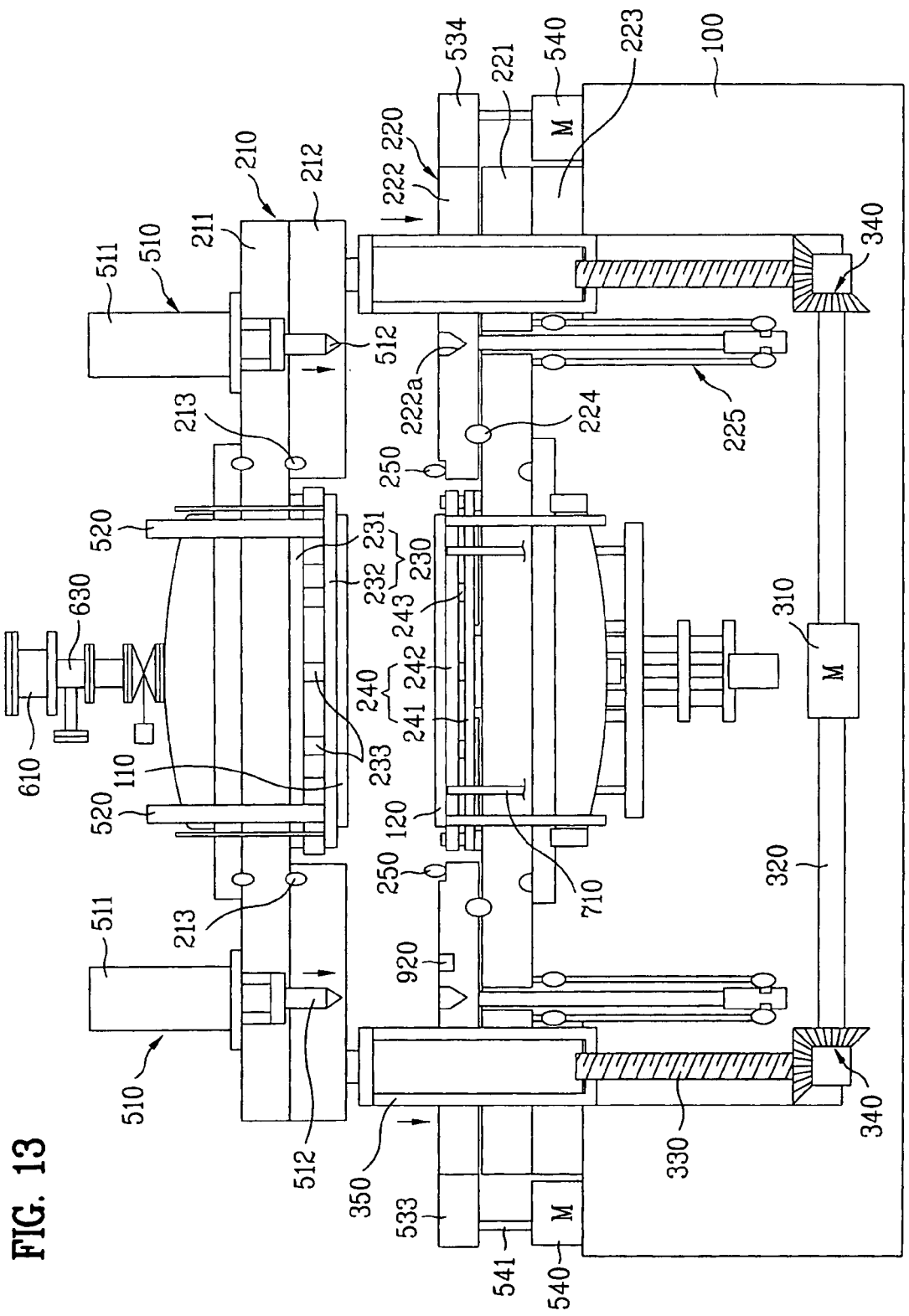

Referring now to FIG. 13, after loading of the substrate bonding device is complete, the driving motor 310 of the chamber moving means may rotate the driving shafts 320 and the connecting shafts 330 to lower the jack parts 350 from their original positions. In one aspect of the present invention, the upper chamber unit 210 is lowered as the jack parts 350 are lowered from their original positions. Further, the linear actuators 511 may lower the plurality of movable shafts 512 such that the moveable shafts 512 project to a predetermined height from the bottom surface of the upper chamber plate 212.

Figure 14:
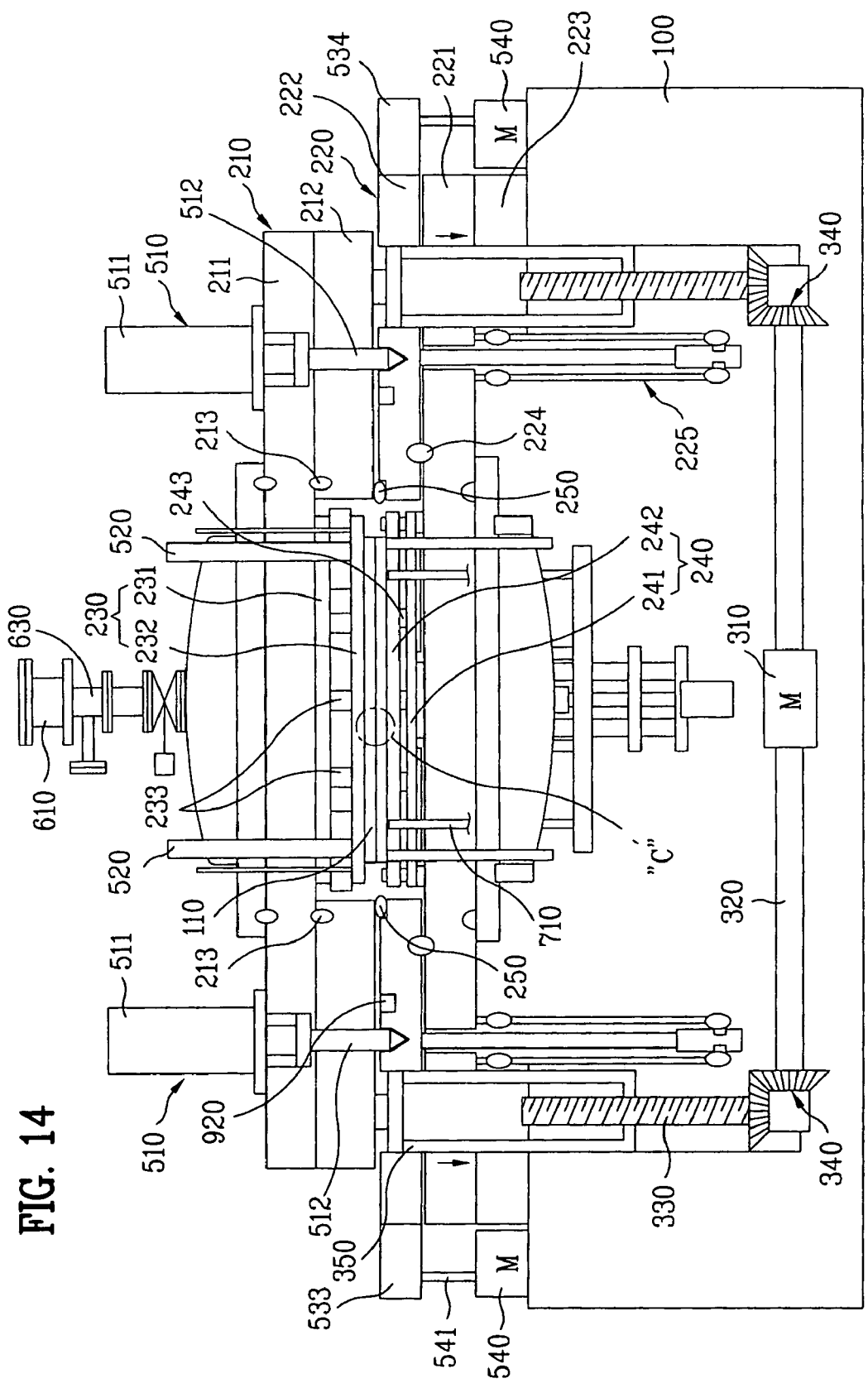
FIGS. 14, 15A, and 15B illustrate a bonding of the substrates within the substrate bonding device in accordance with the first aspect of the present invention.

Referring to FIG. 14, as a result of the lowering of the upper chamber unit 210 and of the projection of the moveable shafts 512, the end portions of the moveable shafts 512 may be received within, and contact interior surfaces of respective ones of the holes 222a formed in the lower chamber plate 222. In the event that, for example, the upper chamber unit 210 is not substantially level with respect to the lower chamber unit 220, the movable shafts 512 may contact the interior surfaces of the holes 222a in succession. As the end portions of the moveable shafts 512 are received within the holes 222a, the chamber moving means moves the upper chamber unit 210 downwardly such that a bottom surface of the upper chamber plate 212 contacts a top surface of the third sealing member 250, fitted to a periphery of the lower chamber plate 222.

Figure 16:
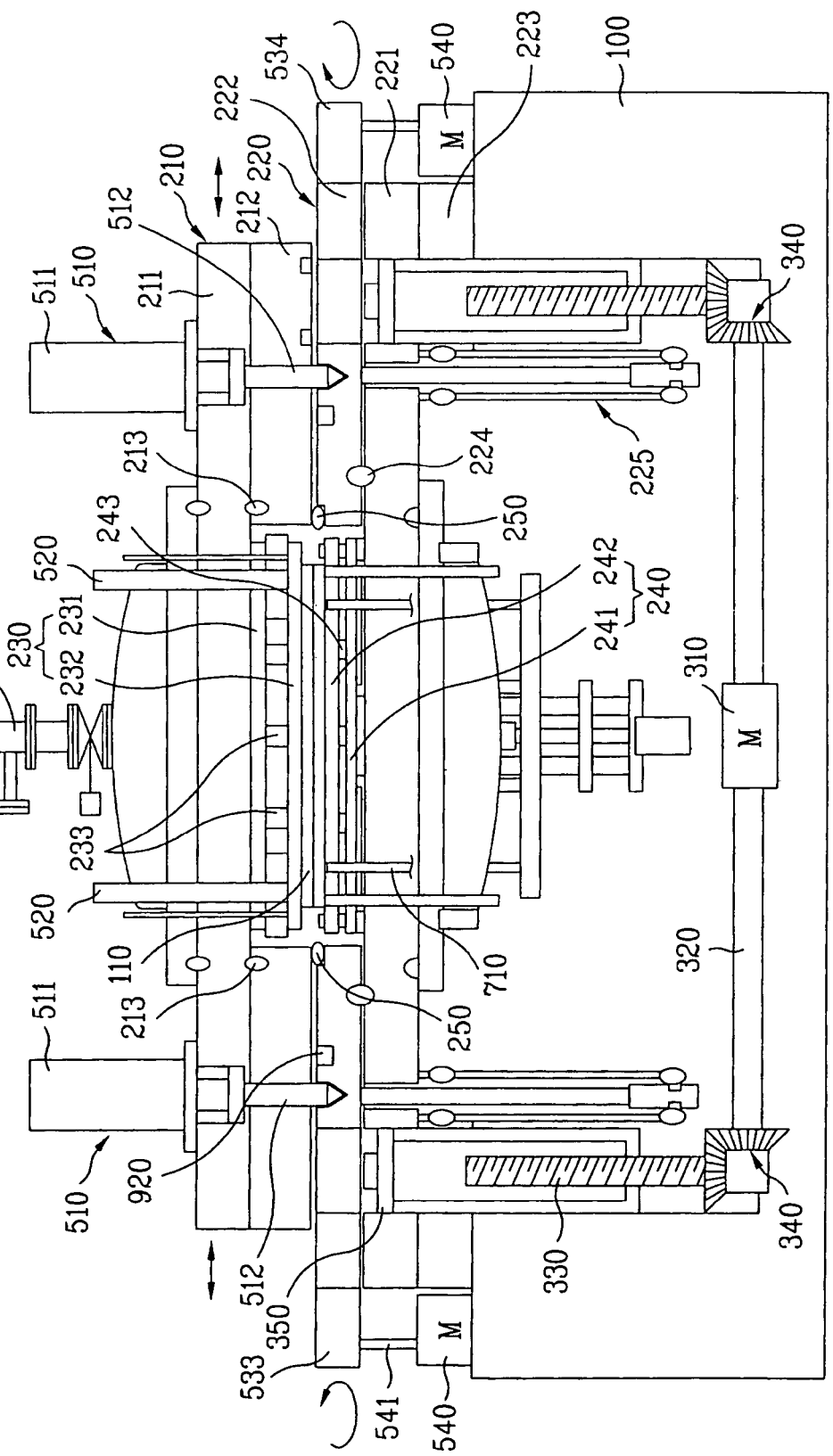
FIGS. 16 to 18 illustrate the alignment of the first and second substrates using the alignment means in accordance with a first preferred embodiment of the present invention, schematically.

Referring now to FIG. 16, as the jack parts 350 are lowered further, they move out from between the upper chamber unit 210 the lower chamber unit 220 such that a sealed interior space, defined by the upper and lower chamber units 210 and 220 is created, wherein the sealed interior space is substantially sealed from the external environment due to the weight of the upper chamber unit 210 pressing upon the third seal member 250. Therefore, the first and second substrates 110 and 120 may be substantially isolated from the external environment.

It one aspect of the present invention the first and second substrates 110 and 120, arranged within sealed interior spaced defined by the joined upper and lower chamber units, may be partially bonded to each other but separated from each other by an initial distance of a few hundred microns. By partially bonding, the relative positions of the first and second substrates 110 and 120 may be adjusted in a subsequent alignment process. After the alignment process is complete, the substrate may be bonded together in a subsequent venting process, as will be discussed in greater detail below. In one aspect of the present invention, the distance between the upper chamber unit 210 and the lower chamber unit 220 (and therefore the gap between the substrates) may be determined by the gap determining sensor 920.

Once created, the sealed interior space defined by the upper and lower chamber units 210 and 220 is evacuated. Accordingly, the first and second low vacuum pumps 621 and 622 may be activated to evacuate the sealed interior space to a first pressure, measured by the pressure sensor 670. After it is determined that the first and second low vacuum pumps 621 and 622 have evacuated the interior space to the first pressure, the high vacuum pump 610 may be activated to substantially evacuate the interior space.

In one aspect of the present invention, the high and first low vacuum pumps 610 and 621 may be connected to the same pipeline 630. Therefore, the first low vacuum pump 621 may be deactivated when the high vacuum pump 610 is activated. After the interior space is substantially evacuated, the first and second substrates 110 and 120, arranged within the evacuated, sealed interior space may be aligned by the alignment means and the alignment cameras 520.

According to the principles of the present invention, the alignment cameras 520 may observe alignment marks (not shown) formed on the first and second substrates 110 and 120 and may verify positional deviations between the alignment marks on the substrates 110 and 120. The verified positional deviations may include distances the upper stage is required to move in order to be properly aligned. Accordingly, the distances the upper stage 230 is required to move to be properly aligned may be calculated with reference to the verified deviations.

According to the principles of the present invention, the lower stage 240 is fixed to a top surface of the lower base 221. Accordingly, the position of the lower chamber plate 222 with respect to the lower stage 240 may be adjusted. Since the upper stage 230 does not move with respect to the upper chamber plate 212, the upper stage 230 moves in substantial unison with the movement of the lower chamber plate 222 via the interlocking means 510. Therefore, to adjust the alignment of the first and second substrates 110 and 120, fixed to their respective stages 230 and 240, the motion of the lower chamber plate 222, generated by the alignment means (e.g., rotation of the cams 531, 532, 533, and 534 at the peripheral surfaces of the lower chamber plate 222), may be translated through the interlocking means 510 to the upper stage 230, fixed to the upper chamber unit 210.

In one aspect of the present invention, the degree and direction the cams rotate may be based on the calculated distance the upper stage is required to move to be properly aligned. Accordingly, step motors 540, eccentrically fixed the cams via cam shafts 541, may rotate the cams as required. According to the principles of the present invention, the cams 531, 532, 533, and 534 may be rotatably arranged to selectively contact a peripheral surface of the lower chamber plate 222.

Figure 17:
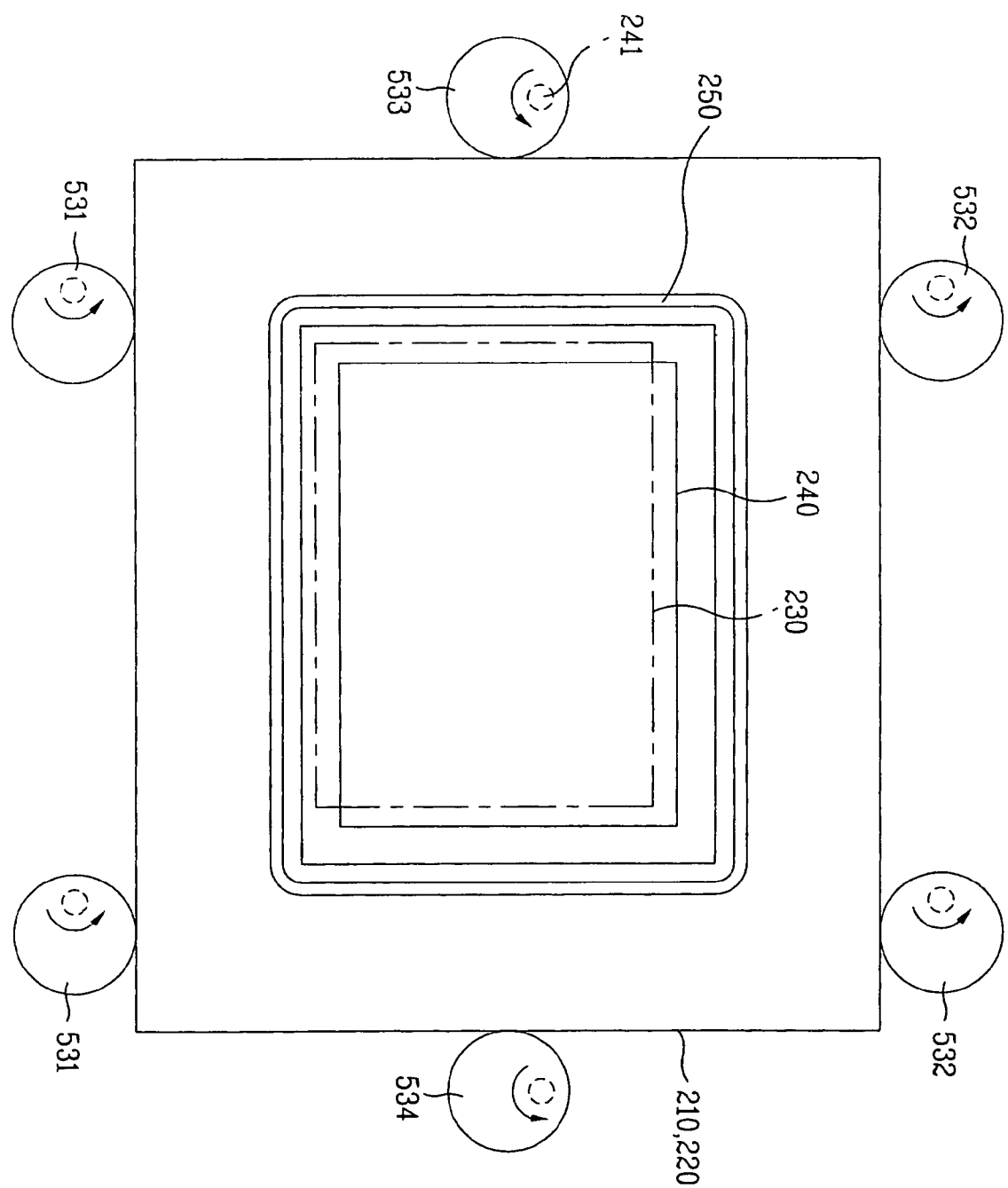

Referring now to FIG. 17, upon verifying a positional deviation between the first and second substrates 110 and 120 using the alignment cameras 520, it may determined, for example, that the first substrate 110 has a 2 mm deviation in a rear direction and 2 mm deviation in a left direction with respect to the second substrate 120, the upper chamber unit 210, having the upper stage 230 fixed thereto, may then be moved by 2 mm in a front direction and 2 mm in a right direction using the aforementioned alignment means. Accordingly, the first and second substrates may be accurately aligned while they are secured by their respective stages 230 and 240.

Figure 18:
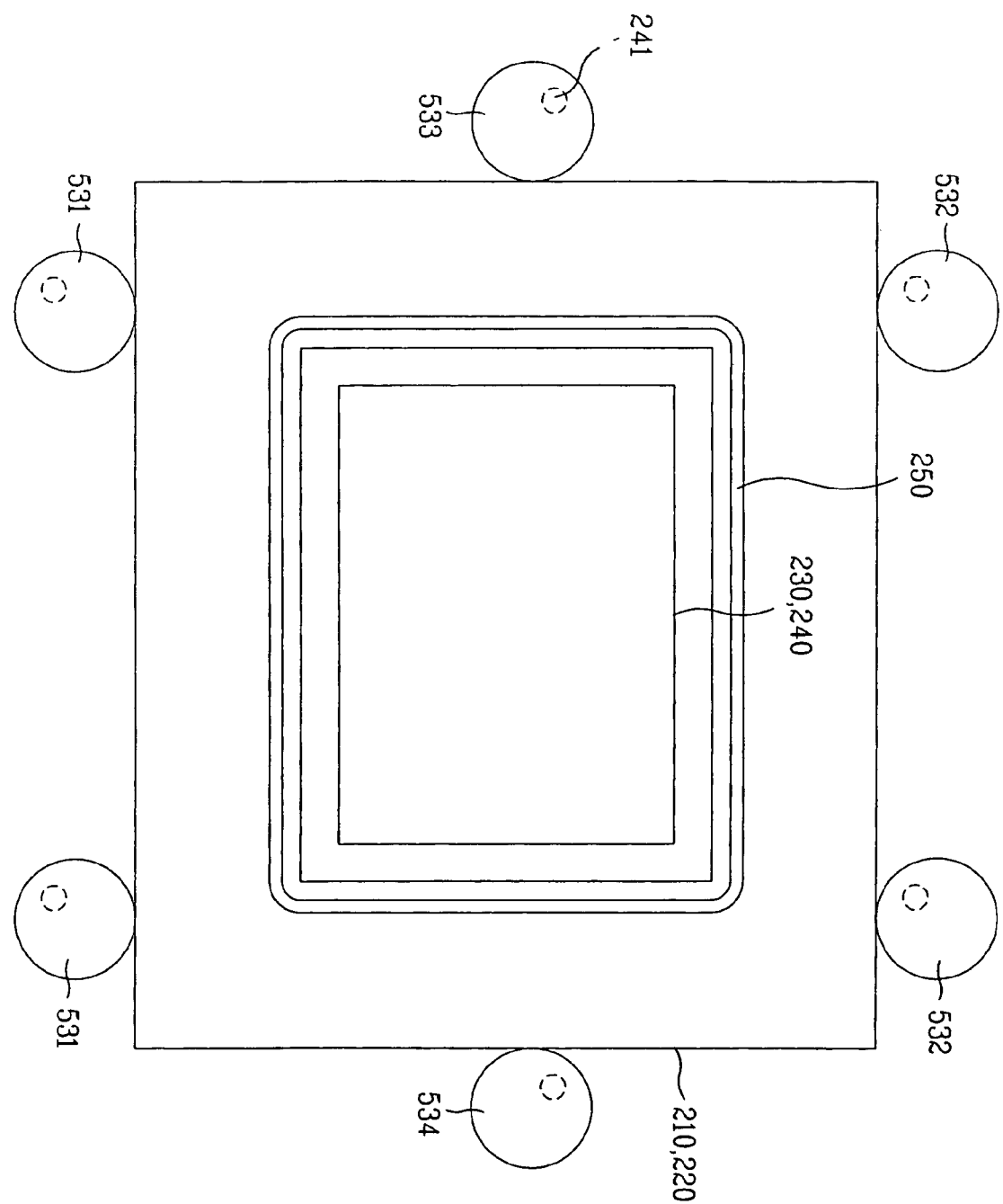

With reference to FIG. 18, the aforementioned exemplary positional deviation may be corrected by eccentrically rotating the cams 531, 532, 533, and 534 contacting the lower chamber plate 222 to a predetermined degree and in a predetermined manner. For example, the first cams 531, arranged at a rear peripheral surface of the lower chamber plate 222 may be eccentrically rotated such that lower chamber plate is moved forward while the second cams 532, arranged at a front peripheral surface of the lower chamber plate 222, are eccentrically rotated such that the second cams 532 and the front peripheral surface of the lower chamber plate 222 are separated by a predetermined distance. Further, the third cam 533, arranged at the left peripheral surface of the lower chamber plate 222, may be eccentrically rotated such that the lower chamber plate 222 is moved to the right while the fourth cam 534, arranged at the right peripheral surface of the lower chamber plate 222, is eccentrically rotated such that the fourth cam and the right peripheral surface of the lower chamber plate are separated by a predetermined distance. It is readily appreciated that the principles of the present invention may be applied to correct substantially any positional deviation between the substrates, wherein rotational amounts and directions of individual ones of the cams may be selectively controlled to move the lower chamber plate 222 in front, rear, left, and right directions either consecutively or simultaneously (e.g., to move the lower chamber plate 222 in diagonal directions).

According to the principles of the present invention, the motion imparted by alignment means to the lower chamber plate 222 is translated through the interlocking means 510 to the upper chamber unit. After the positional deviations have been corrected by the alignment means, the first and second substrates 110 and 120 are substantially aligned. Accordingly, the principles of the present invention provide the lower chamber plate 222, the upper chamber unit 210, the upper stage 230, and the upper substrate 110 to move substantially as a single body, independent of the lower stage 240. Therefore, a smooth and precise positional alignment of the first and second substrates, secured by their respective stages 230 and 240, may be obtained.

According to the principles of the present invention, the first and substrates 110 and 120 may be aligned more than once depending on the type of alignment marks that are formed on the substrates. For example, if two types of alignment marks are formed on the first and second substrates (e.g., rough alignment marks and fine alignment marks), two alignment processes may need to be performed, wherein the rough alignment marks are aligned in a rough alignment process before the fine alignment marks are aligned in a fine alignment process.

Figure 15A:
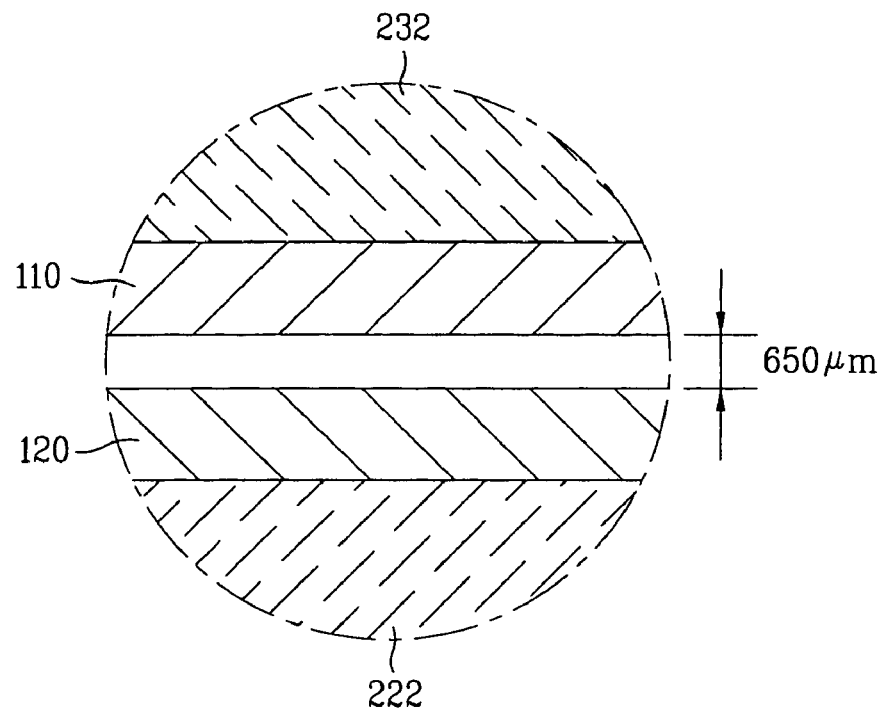
Figure 15B:
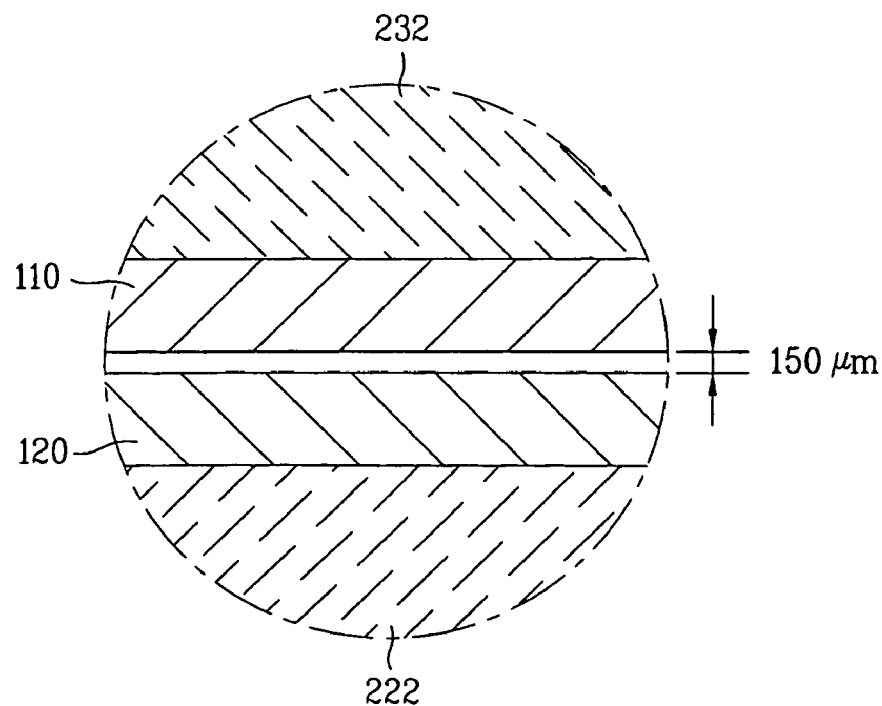

When the rough alignment process is performed, the first substrate 110 may be spaced apart from the second substrate 120 by approximately 500 µm to approximately 800 µm. In one aspect of the present invention, the first substrate 110 may be spaced apart from the second substrate 120 by approximately 650 µm during the rough alignment process, as shown in FIG. 15A. When the fine alignment process is performed, the first substrate 110 may be spaced apart from the second substrate 120 by approximately 100 µm to approximately 250 µm. In one aspect of the present invention, the first substrate 110 may be spaced apart from the second substrate 120 by approximately 150 µm during the fine alignment process, as shown in FIG. 15B.

Figure 19A:
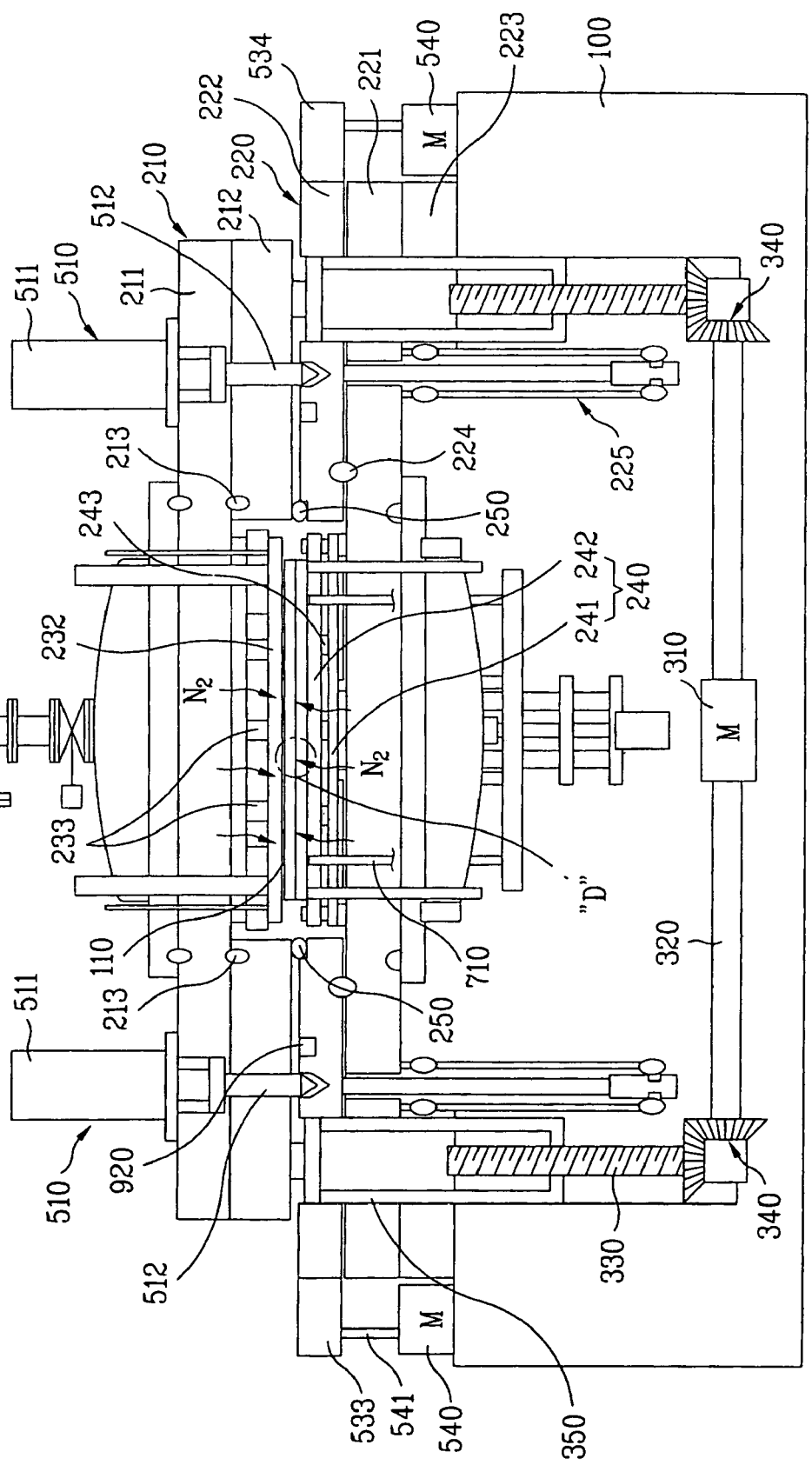
FIGS. 19A and 19B illustrate the venting process within the substrate bonding device in accordance with the first aspect of the present invention.
Figure 19B:
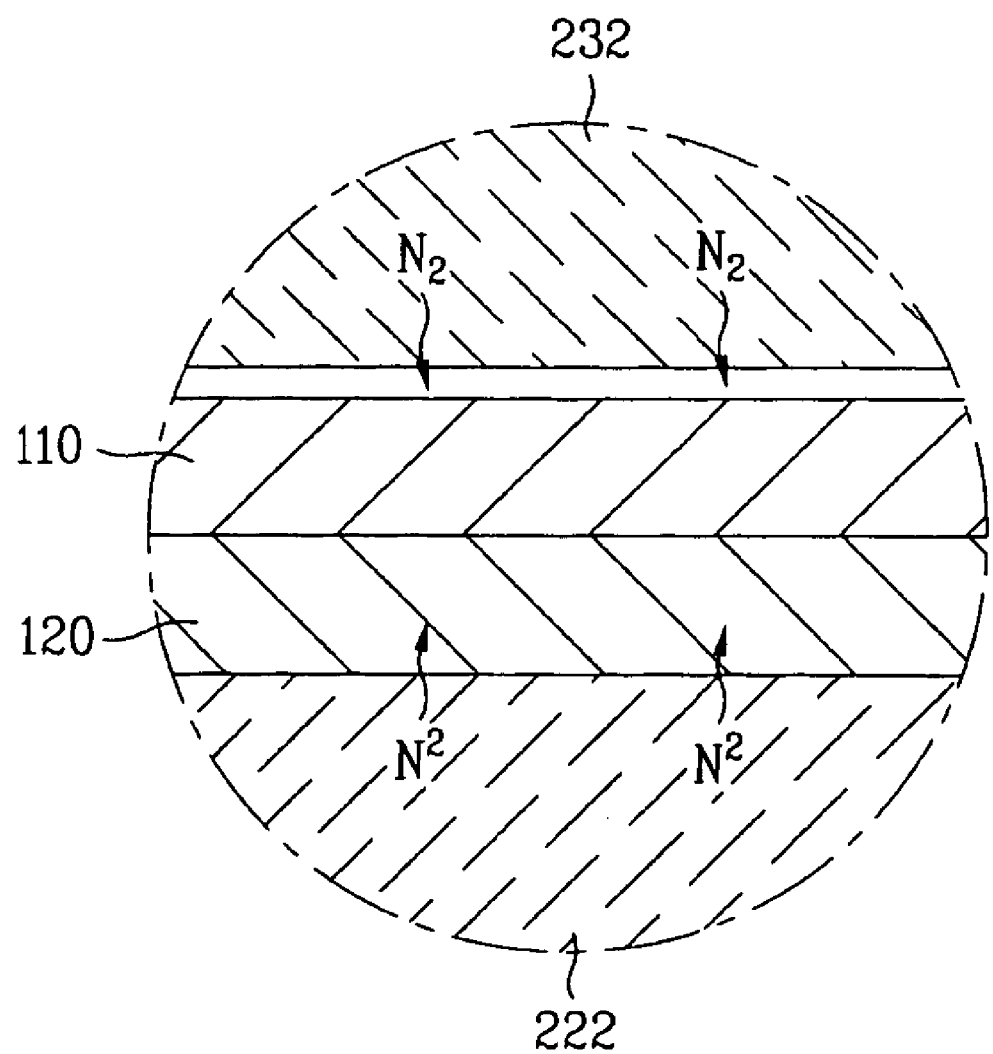

FIGS. 19A and 19B illustrate the venting process within the substrate bonding device in accordance with the first aspect of the present invention.

FIG. 19B illustrates an enlarged sectional view of the region "D" shown in FIG. 19A. Accordingly, and while referring now to FIGS. 19A and 19B, after the first and second substrates 110 and 120 have been substantially aligned, a power applied to the upper stage 230 generating the electrostatic charge, may be turned off and the sealed interior space defined by the upper and lower chamber units, within which the aligned first and second substrates are arranged, may be vented.

According to the principles of the present invention, the venting may be performed by injecting a gas such as nitrogen ($N_2$) into the sealed interior space via the low vacuum pipelines 641 and 642 connected to the second low vacuum pump 622 through the upper and lower stages 230 and 240 to increase pressure within the sealed interior space to an atmospheric pressure. Due to the pressure of the injected gas blowing in through the upper stage 230, the first substrate 110, previously secured by the upper stage 230, moves away from the upper stage 230 and becomes bonded to the second substrate 120. As the venting progresses, the pressure within the sealed interior space increases while the pressure between the bonded substrates remains substantially in a vacuum state. Due to the difference in pressure between the interior of the bonded substrates and the pressure within the sealed interior space, the two substrates 110 and 120 may become fully bonded to each other and the distance between the first and second substrates 110 and 120 decreases.

After the venting is complete, the bonded substrates 110 and 120 may unloaded wherein, after the bonded substrates are unloaded, the aforementioned processes may be repeated to bond other substrates together.

Side portions of substrate bonding device described above, with reference to the first aspect of the present invention, are open to the external environment. Therefore, foreign material may be unintentionally and deleteriously introduced into the upper and lower stages 230 and 240 and into a space between the first and second substrates. Such foreign material may degrade the quality of the liquid crystal material. Accordingly, a substrate bonding device capable of preventing such foreign material from being introduced may be beneficial.

Therefore, and in accordance with the principles of a second aspect of the present invention, a substrate bonding device may be provided wherein foreign material from the external environment is substantially prevented from being introduced either on the stages, on the substrates, or otherwise between the upper and lower chamber units. For example, the substrate bonding device of the second aspect of the present invention may be provided with a case for enclosing the substrate bonding device of the first aspect of the present invention and sealing the substrate bonding device of the first aspect of the present invention from the external environment.

Figure 20:
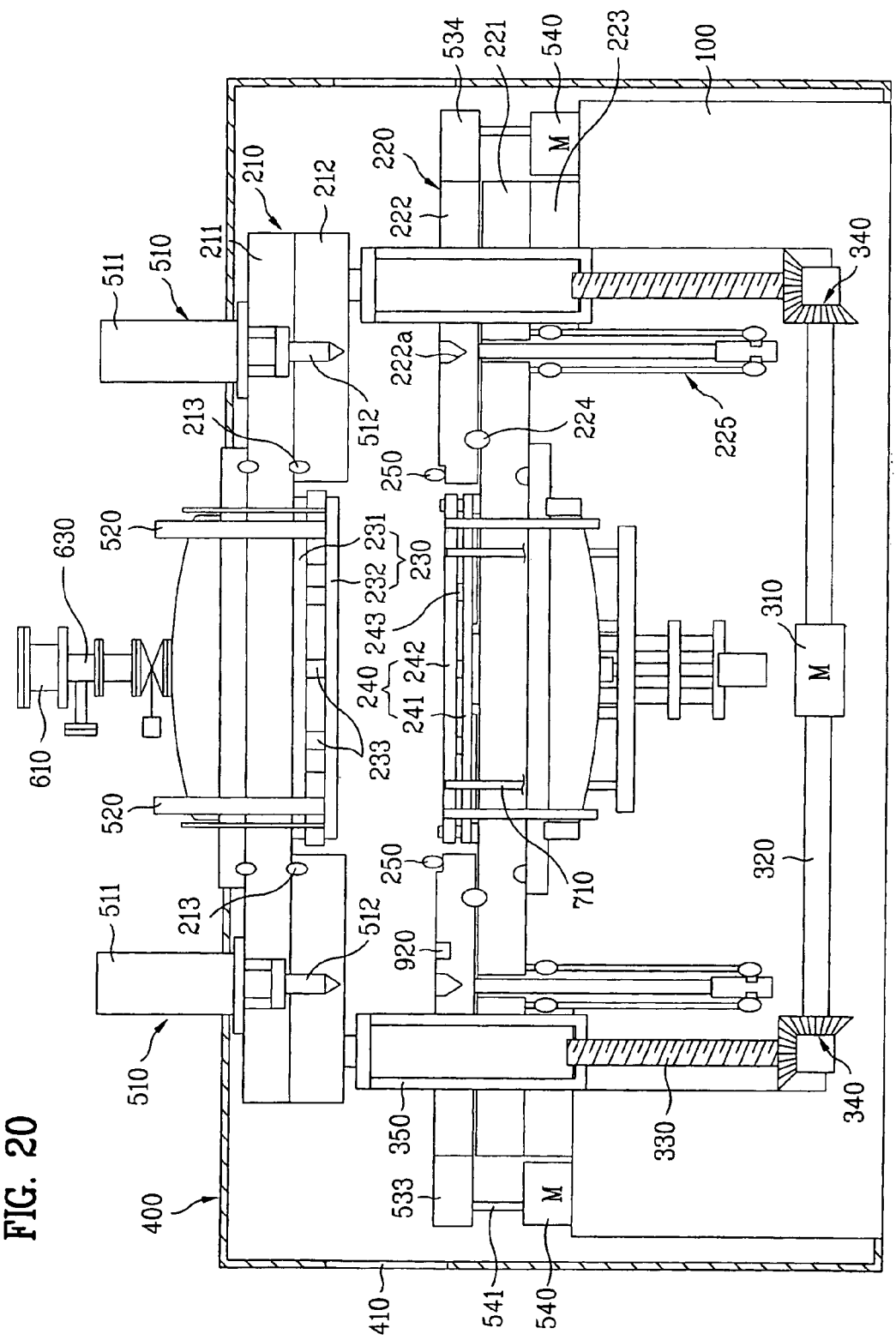
FIG. 20 illustrates a substrate bonding device for fabricating LCD panels in accordance with a second aspect of the present invention in an unloaded state.

FIG. 20 illustrates a substrate bonding device for fabricating LCD panels in accordance with the second aspect of the present invention in an unloaded state.

Referring to FIG. 20, side surfaces of the case 400 may be provided with first and second openings 410 and 420, respectively, through which the first and substrates 110 and 120 may be loaded into and unloaded from the substrate bonding machine. Further, the case 400 may substantially enclose surroundings between the upper chamber unit 210 and lower chamber unit 220 to substantially prevent foreign material from being introduced between the chamber units 210 and 220.

In one aspect of the present invention, a portion of the case 400 proximate the upper and lower chamber units 210 and 220 may be formed out of a transparent material to facilitate observing at least the progression of the bonding of the substrates 110 and 120. In another aspect of the present invention, a portion of the case 400 proximate the upper and lower stages 230 and 240 may be formed out of a transparent material. Accordingly, the portion of the case 400 formed out of the transparent material may be provided as observation windows, or the like. In yet another aspect of the present invention, the entire case 400 may be formed of a transparent material. In one aspect of the present invention, the case 400 may be formed to enclose only a part of the upper and lower chamber units 210 and 220 (e.g., only an upper part of the base frame 100, as shown in FIG. 20) or may enclose substantially the entire substrate bonding device.

Figure 21:
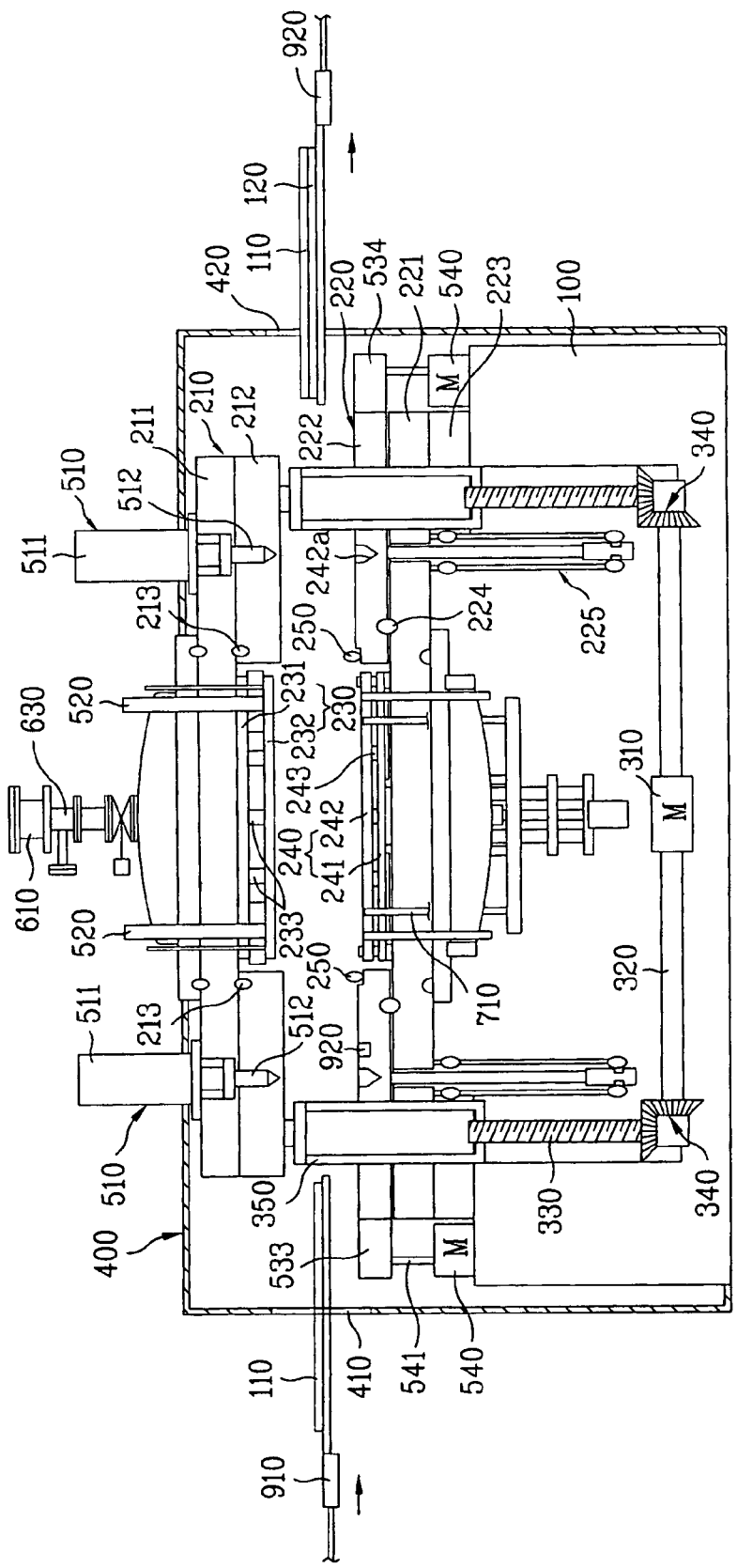
FIG. 21 illustrates the simultaneous loading of unbonded substrates into, and unloading of bonded substrates out of the substrate bonding device in accordance with the second aspect of the present invention.

Referring to FIG. 21, by providing the first and second openings 410 and 420, substrates may be loaded into and unloaded from the substrate bonding device substantially simultaneously. In one aspect of the present invention, the first opening 410 may be arranged within the case 400 and opposite the second opening 420. In another aspect of the present invention, unbonded substrates (e.g., first or second substrates) may be loaded into the substrate bonding device via the first opening 410. In yet another aspect of the present invention, bonded substrates may be unloaded from the substrate bonding device via the second opening 420. In still another aspect of the present invention, a first loader 910 may load unbonded substrates into the substrate bonding device through the first opening 410. In yet another aspect of the present invention, a second loader 920, different from the first loader 910, may unload bonded substrates from the substrate bonding device through the second opening 420.

According to the principles of the present invention, the openings 410 and 420 may be provided with doors (not shown) for closing the openings during progression of the aforementioned substrate bonding processes.

Accordingly, substrate bonding device of the second aspect of the present invention may advantageously prevent the introduction of foreign material between the substrates while enabling the bonding process to be viewed.

Figure 23:
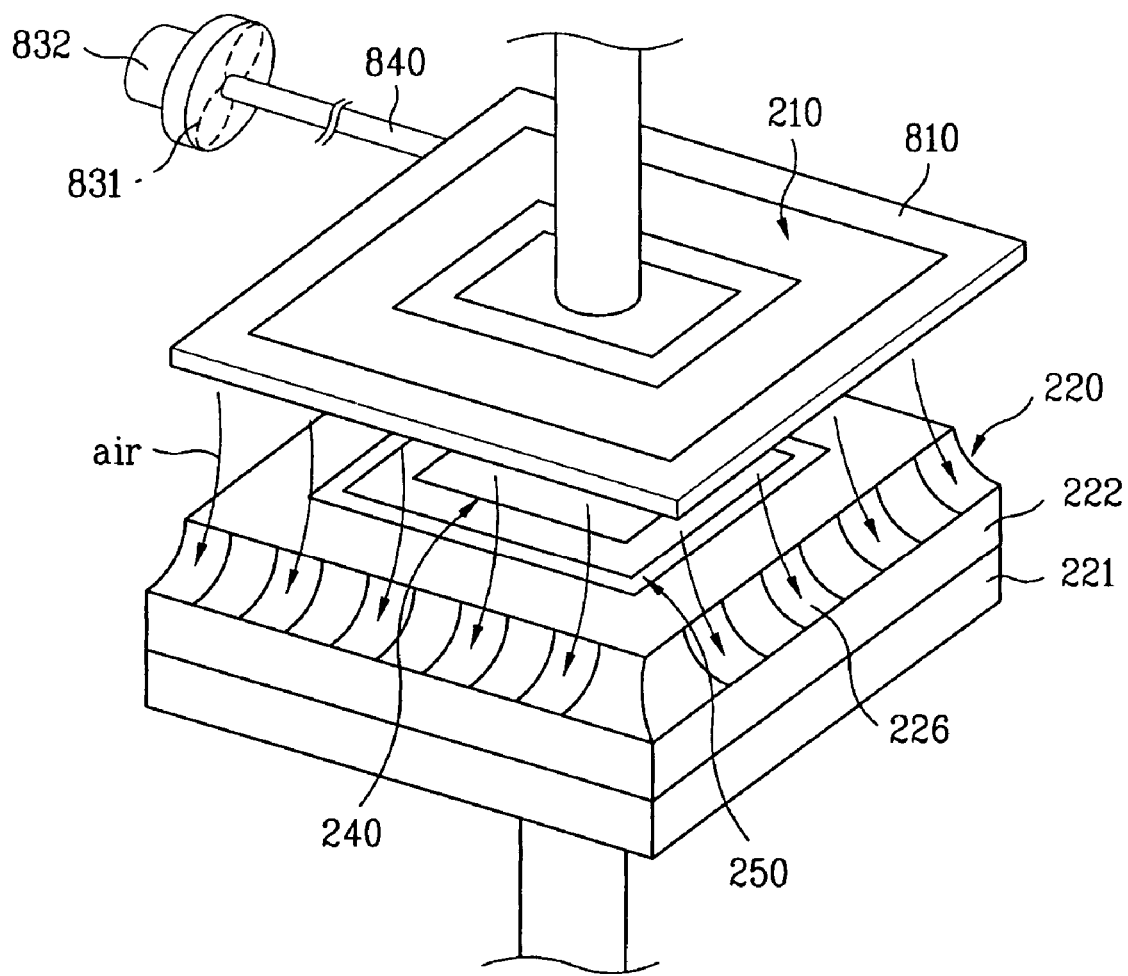
FIG. 23 illustrates a perspective view of spraying means within the substrate bonding device in accordance with the third aspect of the present invention.

FIG. 23 illustrates a perspective view of spraying means within the substrate bonding device in accordance with the third aspect of the present invention.

Figure 22:
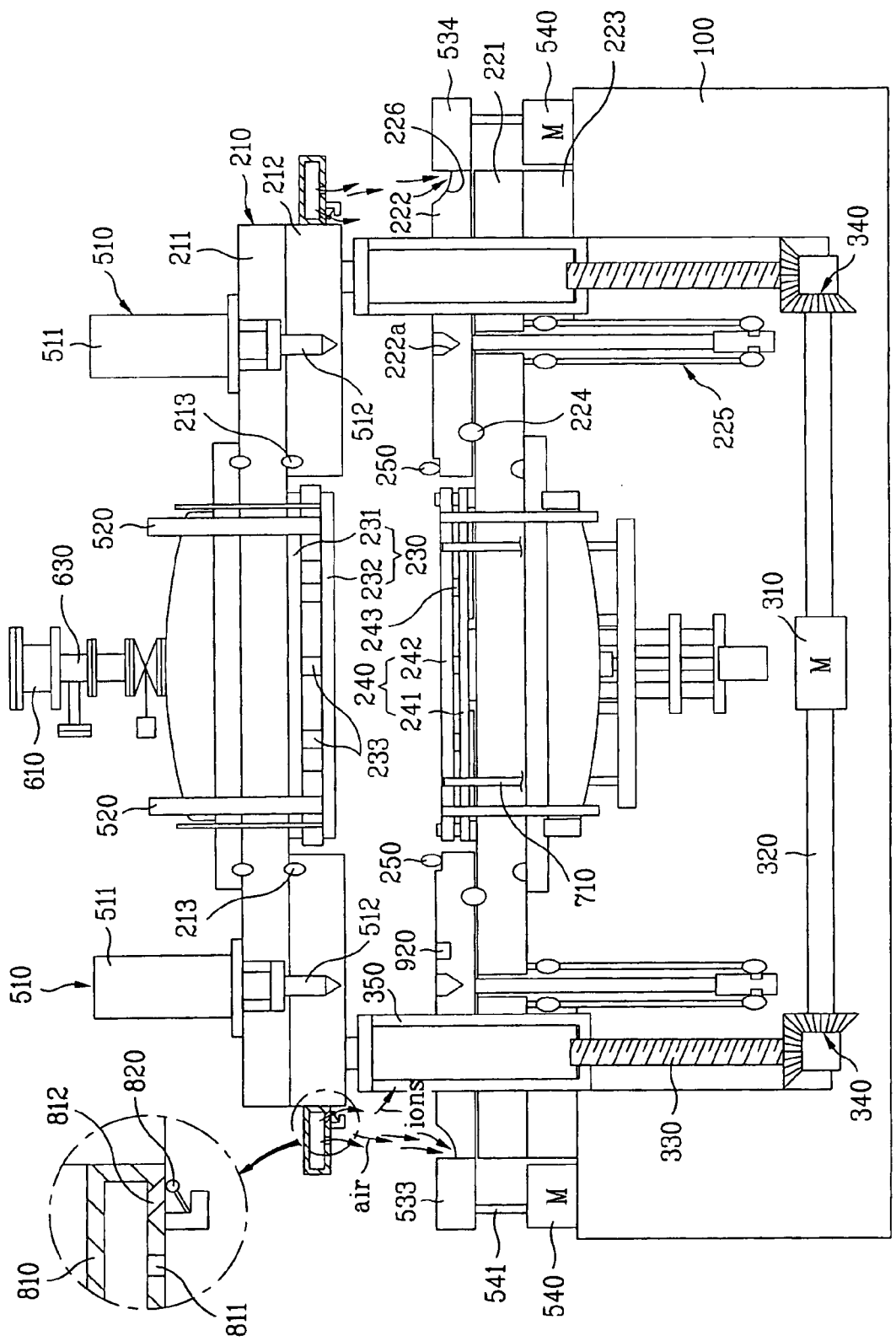
FIG. 22 illustrates a substrate bonding device for fabricating LCD panels in accordance with a third aspect of the present invention in an unloaded state.

Referring to FIGS. 22 and 23, the substrate bonding device in accordance with the principles of the third aspect of the present invention may be provided with the substrate bonding device of the first aspect of the present invention and further include spraying means, blowing means, and a first flow passage 840 to substantially prevent the introduction of foreign material.

In one aspect of the present invention, the spraying means may be mounted to the upper chamber unit 210 and may spray a gas such as nitrogen, air, or the like, to side portions of the lower chamber unit 220. The spraying means may further include an ionizer for emitting ions to side portions of the lower chamber unit 220. Accordingly, the ions emitted by the ionizer may include ions generated from the sprayed gas and may substantially prevent the generation of unwanted static electricity within the substrate bonding device. Consequently, damage to the substrates caused by static electricity may be substantially prevented using the ionizer.

According to the principles of the third aspect of the present invention, a peripheral portion of the lower chamber plate 222 may, for example, include an outwardly sloped surface 226 for discharging gas sprayed through first spraying holes 811 to outside the chamber units 210 and 220. In one aspect of the present invention, the sloped surface 226 may comprise a curved surface, sloping downward toward the edges of the lower chamber plate 222 such that the edges of the lower chamber plate 222 are thinner than interior regions of the lower chamber plate 222. In another aspect of the present invention, the sloped surface 226 may smoothly deflect the sprayed gas while minimizing the degree to which the gas is turbulently deflected. The first flow tube 840 may include a first end in communication with a second flow tube 810 and a second end in communication with a fan 831.

In one aspect of the present invention, the blowing means may include the fan 831 and a fan motor 832 for driving the fan 831.

According to the principles of the present invention, the ionizer may, for example, include a plurality of second spraying holes 812 formed in side surfaces of the second flow tube 810 to direct gas toward the stages 230 and 240 and an ion generating tip 820 arranged proximate each of the second spraying holes 812. In one aspect of the present invention, the ionizer may be formed separately from the spraying means.

A process by which foreign material may be prevented from being introduced into the substrate bonding device of the third aspect of the present invention will now be described in greater detail below.

Using a controlling part (not shown), the fan motor 832 may be activated after the aforementioned substrate bonding process has been initiated but prior to completion of the substrate bonding process (e.g., in the middle of the substrate bonding process). Accordingly, the activated fan motor may rotate the fan 831 to thus blow the gas through the first flow tube 840. Next, the blown gas becomes introduced into the second flow tube 810 via the first flow tube 840, passes through the first spraying holes 811 in the second flow tube 810, and is sprayed toward the sloped surface 226 of the lower chamber plate 222. Subsequently, the sprayed gas flows onto the sloped surface 226 and becomes deflected and discharged outside the lower chamber unit 220 to thereby prevent the introduction of foreign material into a space between the chamber units 210 and 220.

In one aspect of the present invention, the sprayed gas may be ionized. Accordingly, ions from the sprayed gas may be arranged proximate the stages 230 and 240 to substantially prevent static electricity from being generated during bonding of the substrates. In one aspect of the present invention, the ions emitted from the ion generating tips 820 and a portion of the gas in the second flow tube 810 passing through the second spraying holes 812 may be arranged proximate the stages 230 and 240. Accordingly, the generation of unwanted static electricity may be prevented proximate the stages 230 and 240 can be prevented by spraying the gas, including the ions, to the stages 230 and 240.

Figure 24:
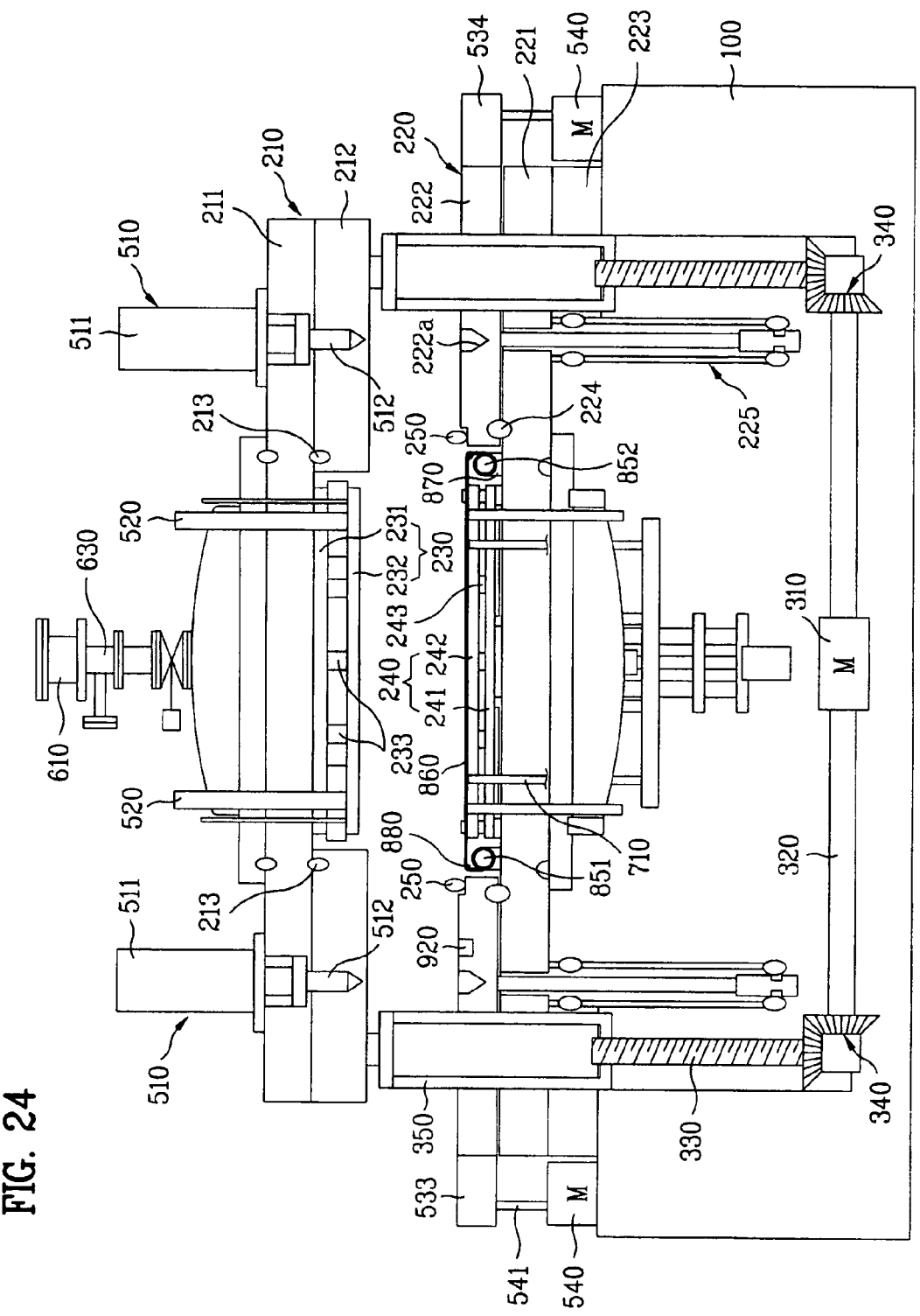
FIG. 24 illustrates a substrate bonding device for fabricating LCD panels in accordance with a fourth aspect of the present invention in an unloaded state.
Figure 30:
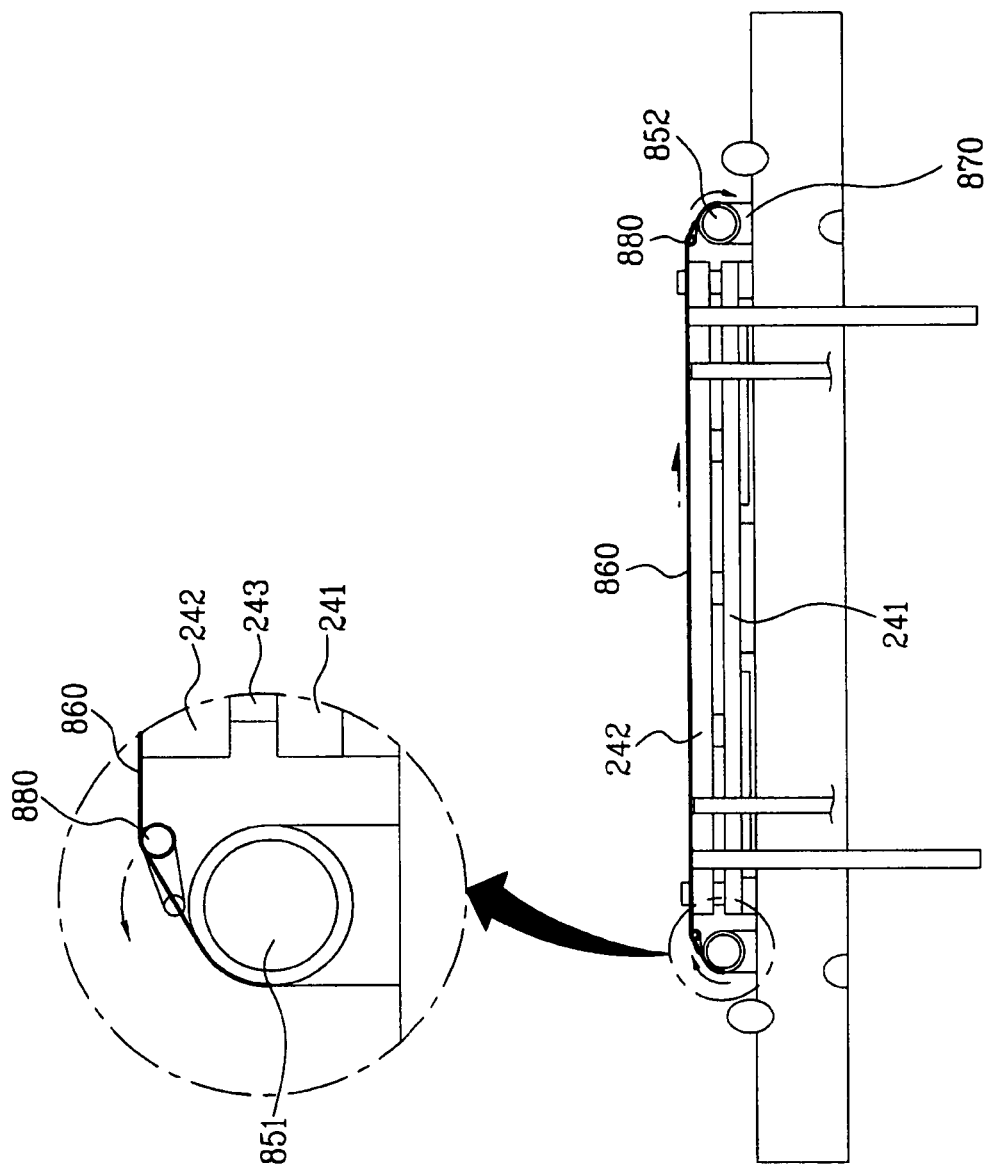
FIGS. 30 and 31 illustrate key parts showing a process for positioning a protection sheet within the substrate bonding device in accordance with the fourth aspect of the present invention.
Figure 31:
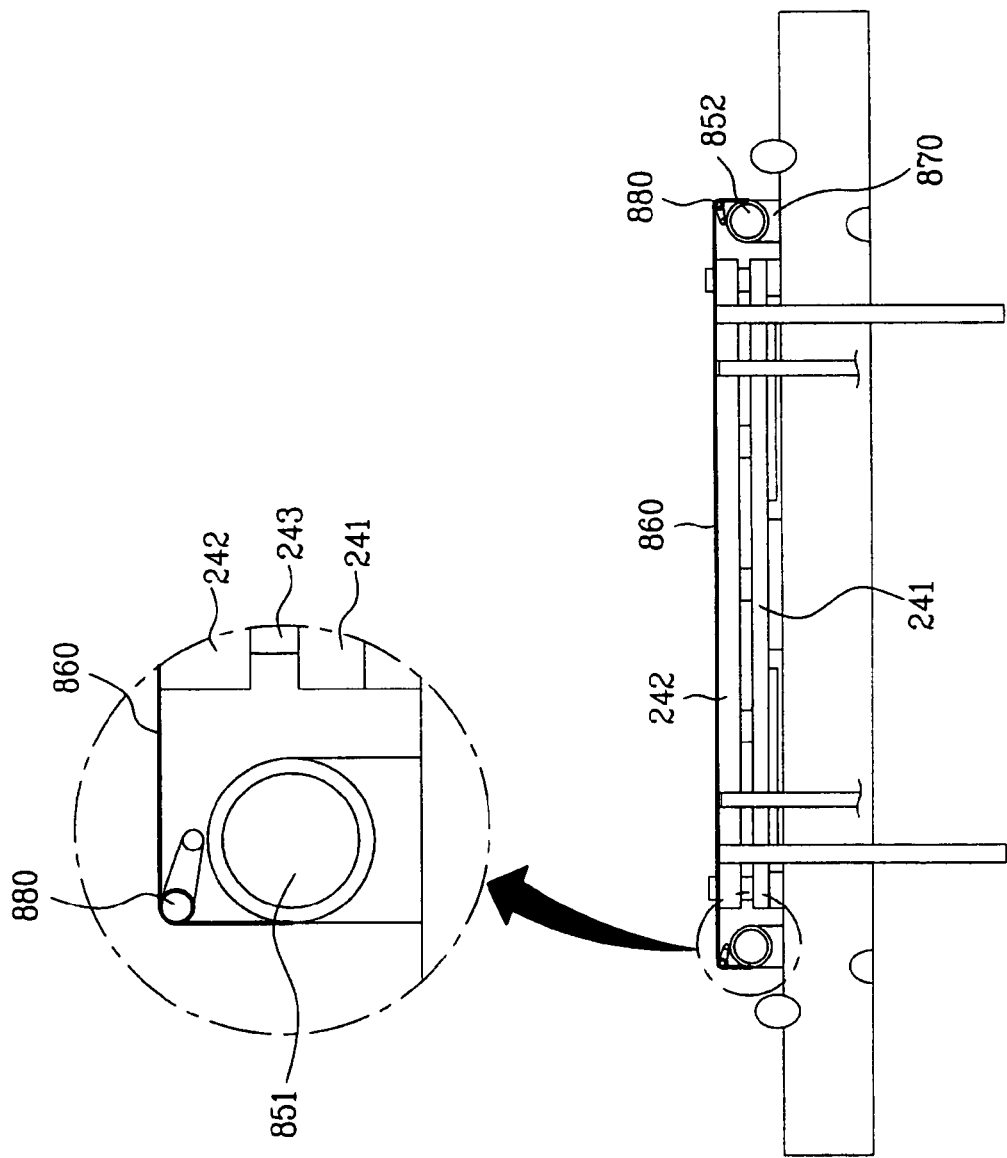

FIG. 24 illustrates a substrate bonding device for fabricating LCD panels in accordance with a fourth aspect of the present invention in an unloaded state. FIGS. 25 to 29 illustrate the process of bonding substrates using the substrate bonding device in accordance with the fourth aspect of the present invention. FIGS. 30 and 31 illustrate a process for positioning a protection sheet within the substrate bonding device in accordance with the fourth aspect of the present invention.

Referring to FIGS. 24 to 31, the substrate bonding device in accordance with principles of the fourth aspect of the present invention may substantially prevent problems related to the introduction of foreign material accumulated on the stages. For example, when foreign material accumulates on the stages, a positional variation on the order of a few microns is generated. Such a positional variation impedes accurate alignment of the substrates. Moreover the foreign material also generates other defects within the LCD. Accordingly, the substrate bonding device of the fourth aspect of the present invention may be provided substantially as the aforementioned substrate bonding device of the first aspect, but may further include a first reel 851, a second reel 852, a protection sheet 860, and a rotating part 870.

In one aspect of the present invention, the first and second reels 851 and 852, respectively, may be arranged at opposite side portions of the lower stage 240, fixed in the lower interior space of the lower chamber unit 220. In another aspect of the present invention, the first and second reels 851 and 852, respectively, may be arranged at opposite side portions of the upper stage 230. In yet another aspect of the present invention, the first and second reels 851 and 852, respectively, may be arranged at opposite side portions of both the upper and lower stages 230 and 240, respectively.

According to the principles of the present invention, the protection sheet 860 may substantially cover a surface of the lower stage 240 (or of the upper stage 230), wherein opposite ends of the protection sheet may be wound around the first and second reels 851 and 852 and wherein the protection sheet 860 may substantially prevent the accumulation of foreign matters on the surface of the lower stage 240 (or upper stage 230).

In one aspect of the present invention, the protection sheet 860 may be formed of a material which can transmit an electrostatic charge generated by the securing plate 242 (or 232) to the substrates 110 and 120 and may include openings corresponding to the plurality of holes 242*a* (or 232*a*) formed in the lower stage 240 (or upper stage 230) and corresponding to the lift pin 710. Therefore, substantially no interference may be made between protection sheet 860 and the transmission of the suction force through the holes 242*a* (or 232*a*) and the operation of the lift pin 710 through the lower stage 240.

In one aspect of the present invention, the protection sheet 860 may include a plurality of sheets formed to cover the surface of the lower stage 240 (or upper stage 230), wherein the plurality of sheets are connected to each other. Accordingly, a first end of the protection sheet 860 may be wound around the first reel 851 and a second end of the protection sheet 860 may be wound around the second reel 852.

The portion of the protection sheet 860 wound around the first reel 851 may be provided as an unused protection sheet 860 for use during future substrate bonding processes, while the portion of the protection sheet 860 wound around the second reel 852 may be provided as a used protection sheet 860 that may be removed from the substrate bonding device after substrate bonding processes have been performed. The portion of the protection sheet 860 arranged over the surface of the stage may be provided as a working protection sheet 860 to be used during a present substrate bonding process.

Accordingly, unused portions of the protection sheet 860 wound around the first reel 851 may be scrolled and arranged over a surface of the stage (i.e., a working region) and be used during a substrate bonding process. After the substrate bonding process has been performed, the used working protection sheet 860 may be scrolled from the working region to the second reel 852, where it may be subsequently discarded. In one aspect of the present invention, the first and second reels 851 and 852 may be arranged elevationally lower (or higher) than the surface of the lower stage 240 (or the upper stage 230) such that the surface of the stage is uniformly and smoothly covered (e.g., such that the portion of the protection sheet 860 is substantially flat over the surface of the stage).

According to the principles of the present invention, tension adjusting jigs 880 may be provided adjacent the first and second reels 851 and 852. In one aspect of the present invention, the tension adjusting jigs 880 may be arranged between each of the reels and the corresponding stage. In another aspect of the present invention, the tension adjusting jigs 880 may be rotatably mounted, mounted vertically (e.g., moveable in up and down directions) with respect to the protection sheet 860, or mounted horizontally (e.g., moveable in left and right directions) with respect to the protection sheet 860 for maintaining the protection sheet 860 in the working region substantially flat.

According to the principles of the present invention, the tension adjusting jigs 880 may be provided with actuators, step motors, or the like, for raising or lowering the tension adjusting jigs 880. In one aspect of the present invention, the tension adjusting jigs 880 may accurately position the openings in the protection sheets 860 in correspondence to the positions of the holes 242*a* in the lower stage 240 and to the position of the lift pin 710 such that operation of the substrate bonding device may proceed while maintaining the protection sheet 860 in the working region substantially flat.

According to the principles of the present invention, the rotating part 870 may rotate the first and second reels 851 and 852 and may be provided to the second reel 852 only, the first reel 851 only, or both the first and second reels 851 and 852.

A process for preventing the accumulation of foreign material on the stages using the substrate bonding device of the fourth aspect of the present invention will now be described in greater detail below.

Referring to FIG. 24, and prior to bonding the substrates, the rotating part 870 may be activated to rotate the second reel 852, wherein the protection sheet 860 wound around the first reel 851 may be scrolled over the surface of the lower stage 240. Accordingly, the positions of the openings in the protection sheet 860 within the working region substantially correspond with positions of the holes 242*a* in the surface of the lower stage 240 and with a position of the lift pin 710. Such correspondence between the openings in the protection sheet 860 and the other structures in the substrate bonding device may be controlled by, for example, controlling an amount of rotation of the second reel 852.

Figure 25:
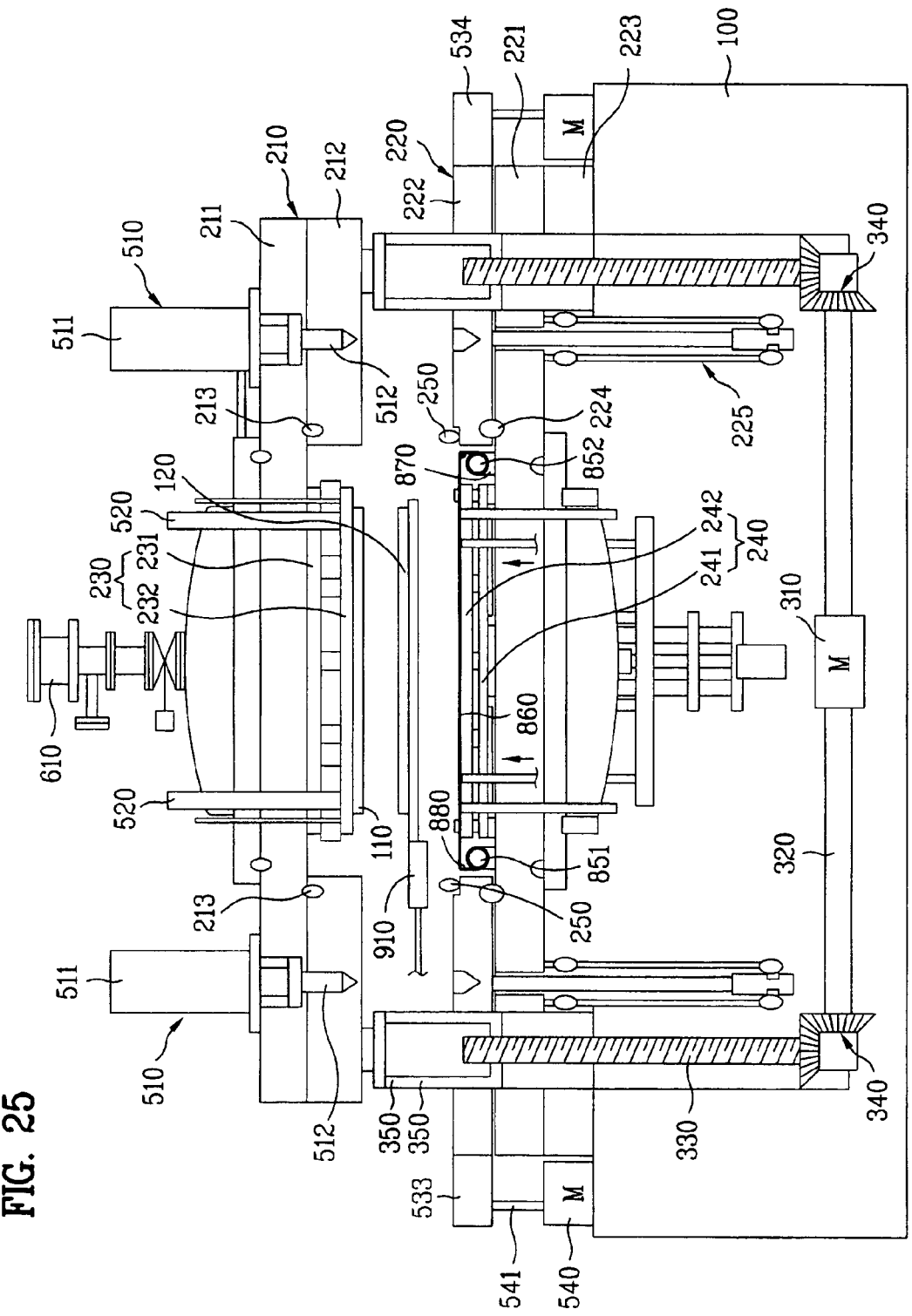
FIGS. 25 to 29 illustrate the process of bonding substrates using the substrate bonding device in accordance with the fourth aspect of the present invention.
Figure 26:
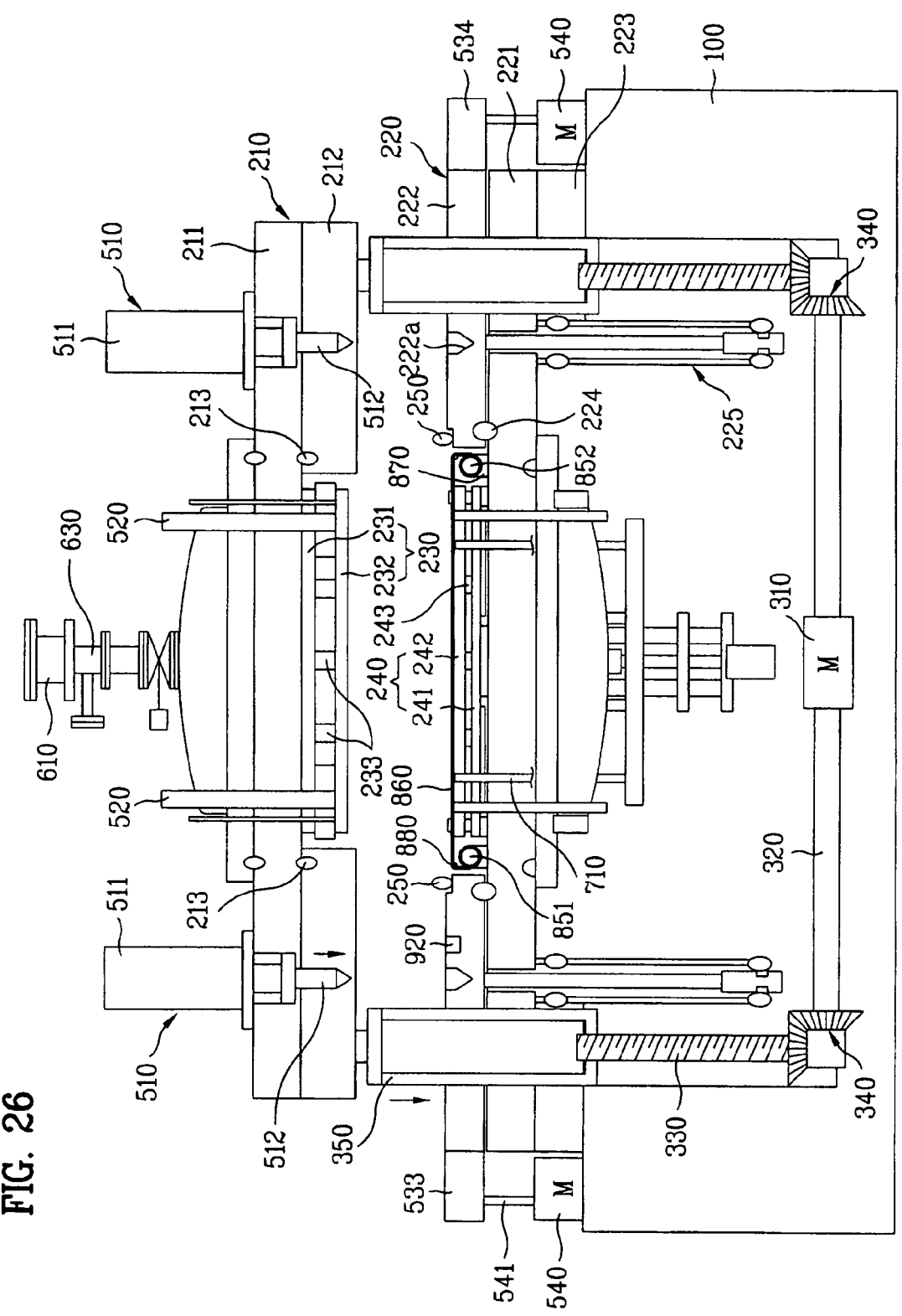

Referring to FIGS. 25 and 26, the first substrate 110 may be loaded by the loader 910 and secured by the upper stage 230 followed by the loading and securing of the second substrate 120 to the lower stage 240. While the protection sheet 860 is arranged between the lower stage 240 and the second substrate 120, the second substrate 120 may be secured to the top surface of the lower stage 240 because the protection sheet 860 is formed of a material capable of transmitting an electrostatic charge and the holes 242a in the lower stage 240 are exposed by the holes in the protection sheet 860.

Figure 27:
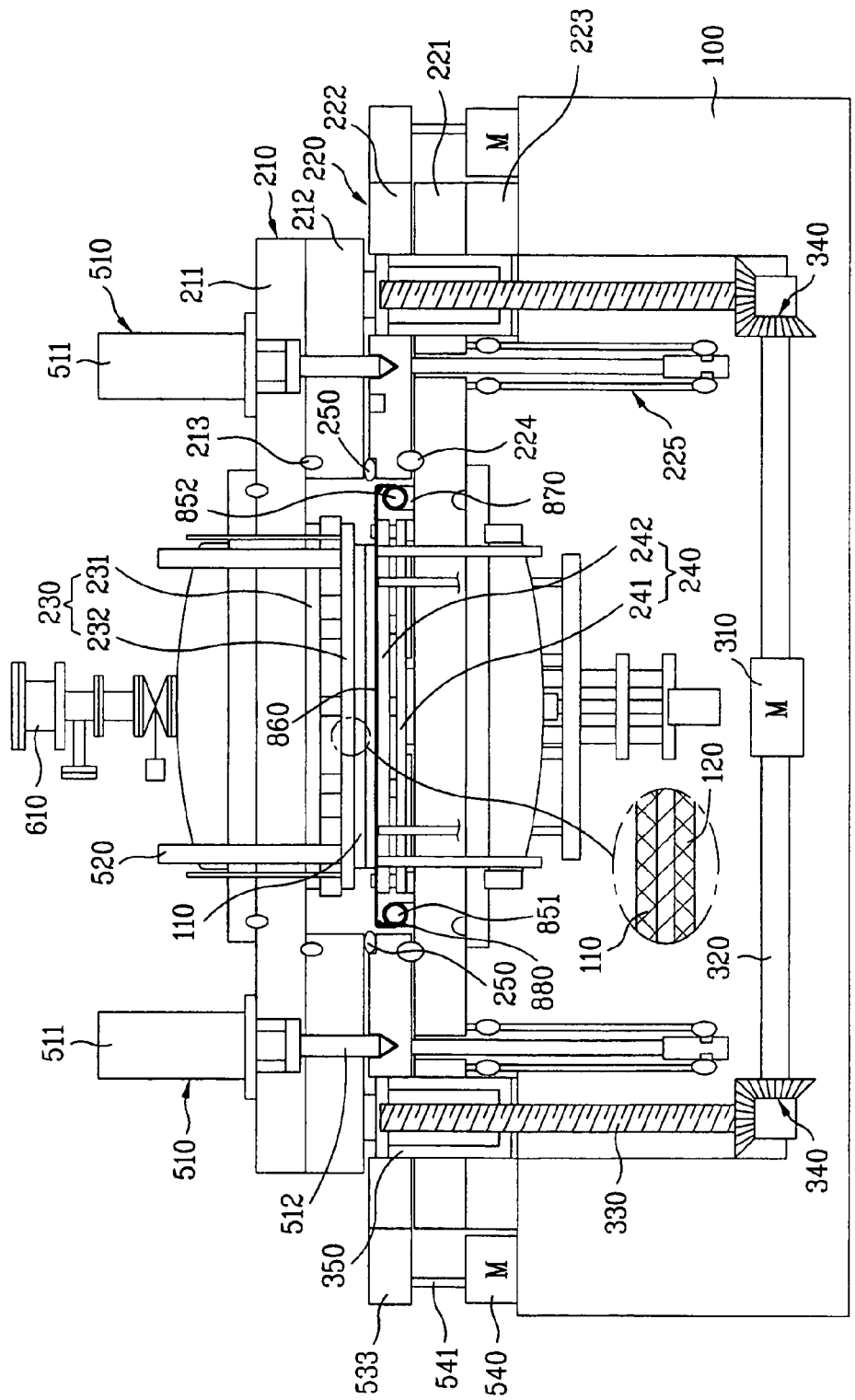
Figure 28:
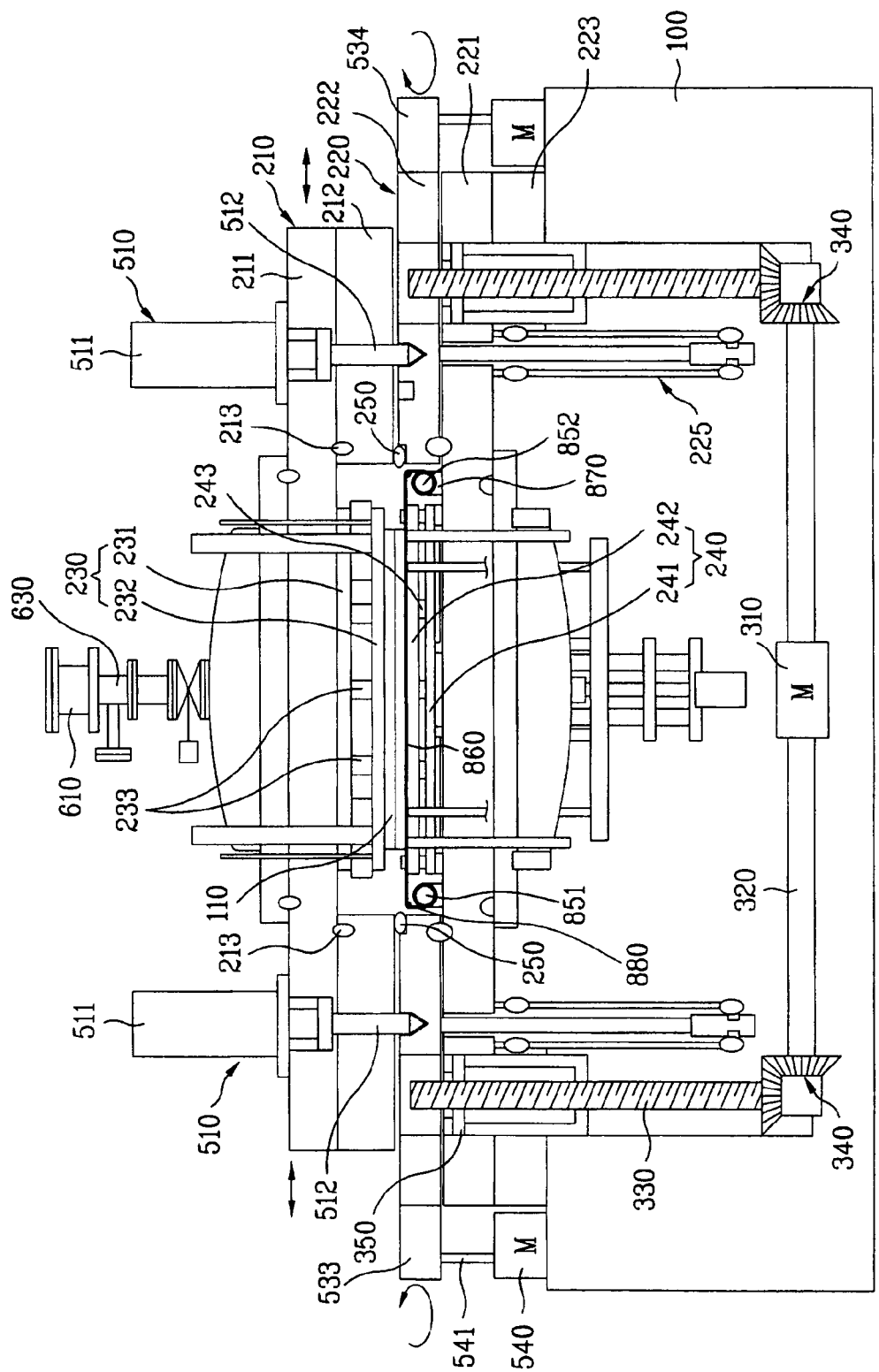
Figure 29:
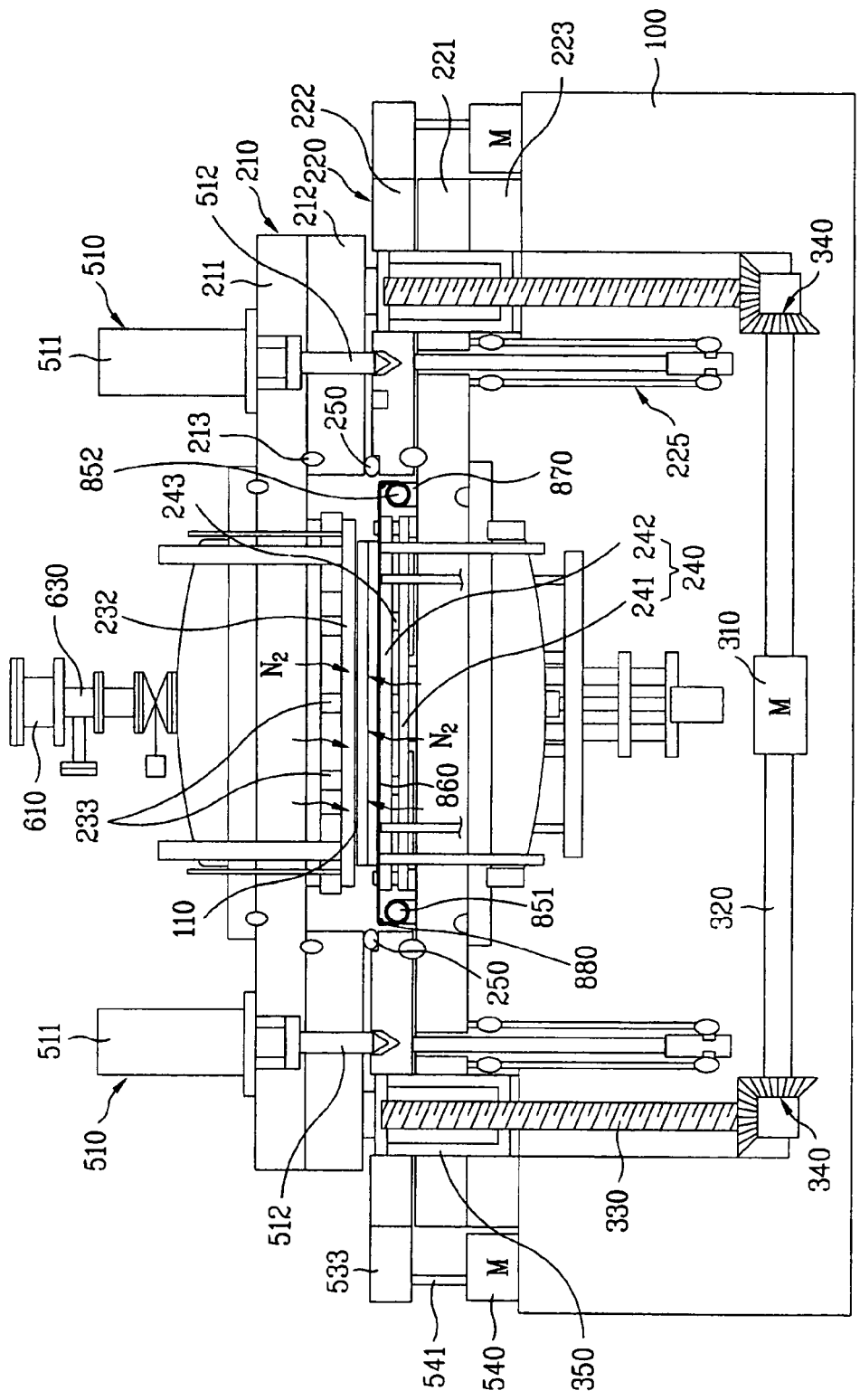

Next, referring to FIGS. 27 to 29, the substrates, secured to their respective stages, may be bonded according to, for example, the substrate bonding process described above with respect to the first aspect of the present invention. After the bonding, the bonded substrates may be unloaded from the substrate bonding device and the process described above may be repeated.

During the substrate bonding process described above, a controller (not shown) for controlling the substrate bonding device may control the number of times the protection sheet 860 has been scrolled from the first reel 851 to the working region. In one aspect of the present invention, the controller may scroll the protection sheet 860 after a predetermined number of substrates have been bonded. In another aspect of the present invention, the protection sheet 860 may be scrolled according to a predetermined time interval, wherein an amount of time is measured and wherein the protection sheet 860 is scrolled prior to a substrate bonding process if the amount of time measured exceeds the predetermined time interval.

Referring to FIG. 30, the protection sheet 860 may be scrolled by controlling the rotating part 870 to rotate the second reel 852 in a predetermined direction wherein the used protection sheet in the working region is scrolled and wound around the second reel 852 and an unused protection sheet 860 on the first reel part 851 is scrolled over the lower stage 240, to substantially cover the top surface of the lower stage 240. In order to maintain the protection sheet 860 in the working region over the surface of the stage substantially flat, the tension adjusting jigs 880 are rotated (or raised/lowered, moved in lateral directions, etc.) when an unused protection sheet 860 is scrolled to completely cover the surface of the stage by the rotation of the reels 851 and 852.

Accordingly, because positions of the openings in the protection sheet 860 substantially correspond to positions of the holes 242a and the lift pin 710, a continuous fabrication process may be made possible while the generation of defects caused by foreign material may be substantially prevented.

Figure 32:
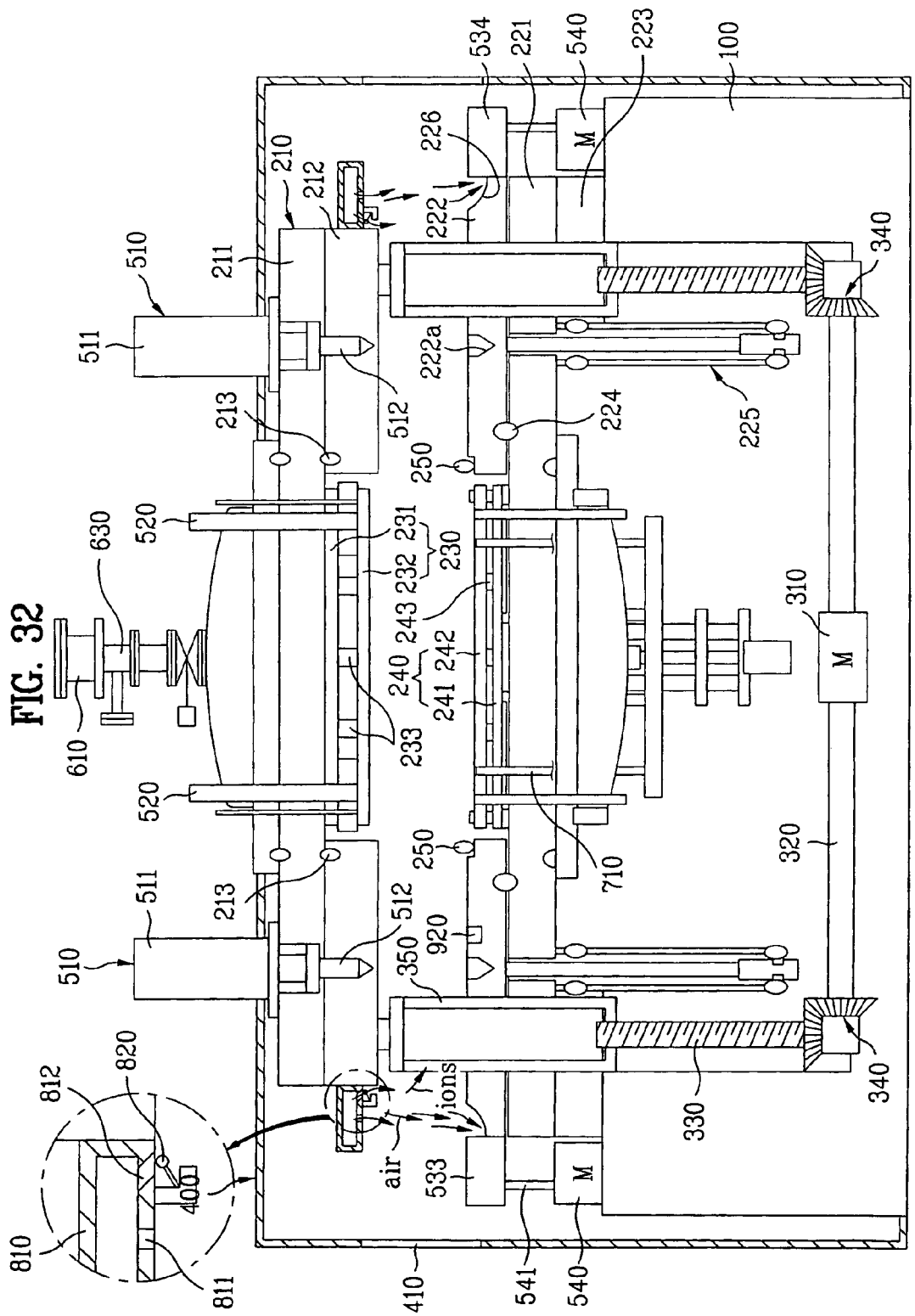
FIG. 32 illustrates the principles of the third aspect of the present invention applied to the substrate bonding device in accordance with the second aspect of the present invention.
Figure 33:
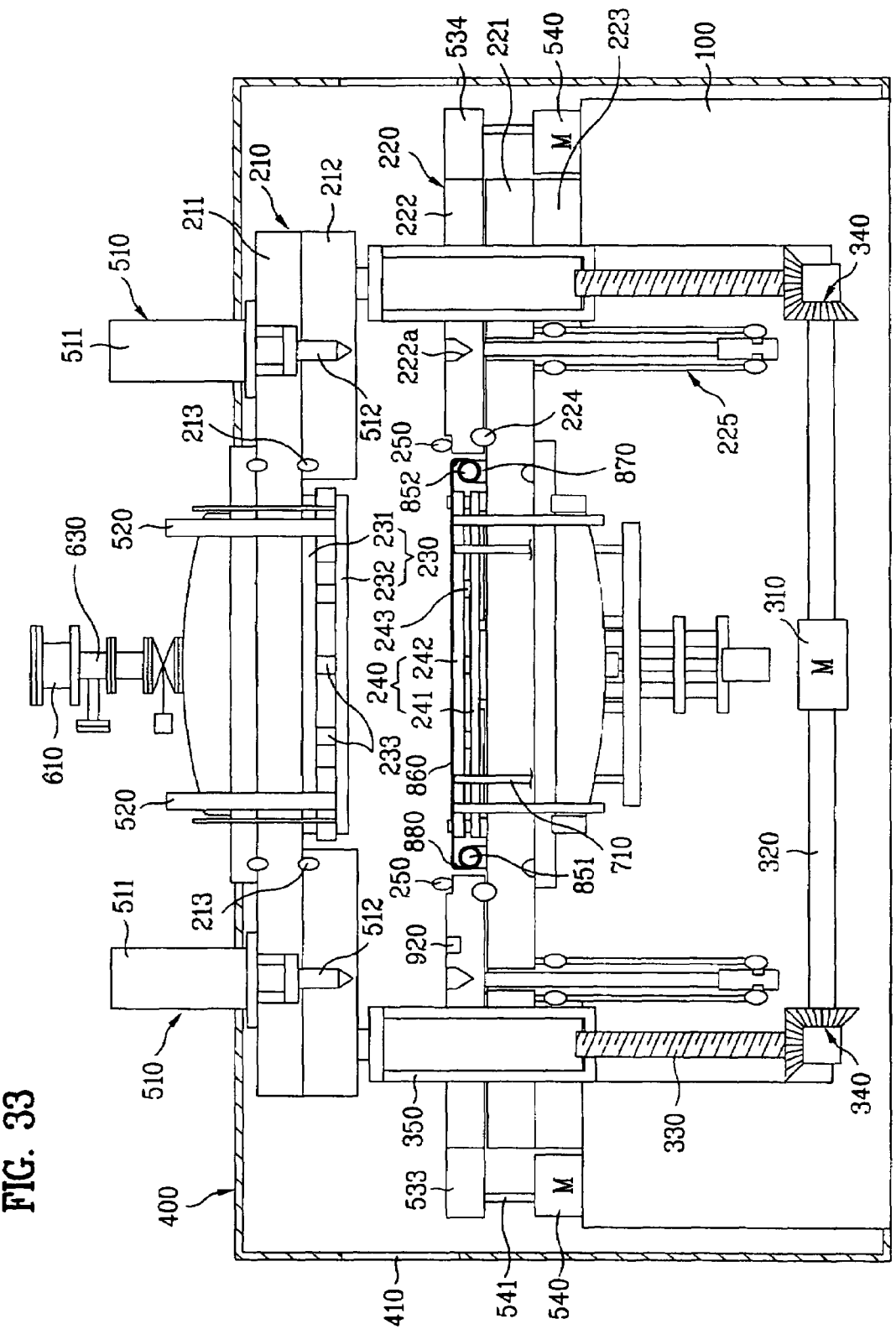
FIG. 33 illustrates the principles of the fourth aspect of the present invention applied to the substrate bonding device in accordance with the second aspect of the present invention.
Figure 34:
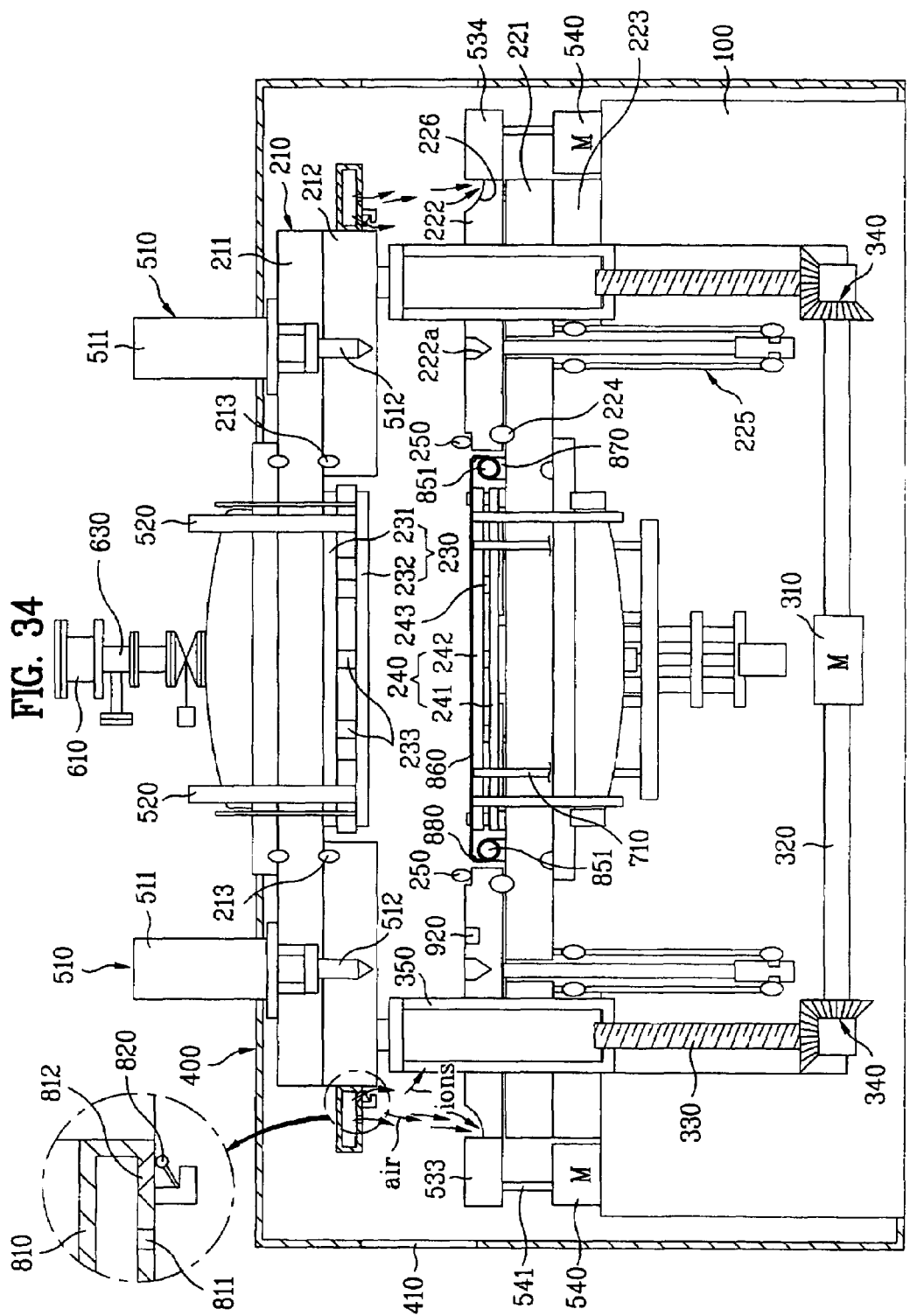
FIG. 34 illustrates the principles of the third and fourth aspects of the present invention applied to the substrate bonding device in accordance with the second aspect of the present invention.

It will be readily appreciated that the aforementioned principles of the first to fourth aspects of the present invention may be combined in substantially any manner required or may be used individually. For example, and with reference to FIG. 32, the gas spraying means and the ionizer of the third aspect may be applied to the substrate bonding device of the second aspect, wherein the spraying means and the ionizer may be mounted to the upper chamber unit proximate the first and second openings 410 and 420, formed in the case 400. Moreover, and with reference to FIG. 33, the first and second reels 851 and 852, the protection sheet 860, and the rotating part 870 of the fourth aspect may be applied to the substrate bonding device of the second aspect. Furthermore, and with reference to FIG. 34, the spraying means and the ionizer of the third aspect, and the reels 851 and 852, the protection sheet 860, and the rotating part 870 of the fourth aspect may be applied to the substrate bonding device of the second aspect. Still further, and with reference to FIG. 35, the reels 851 and 852, the protection sheet 860, and the rotating part 870 of the fourth aspect may be applied to the substrate bonding device of the third aspect, and the like.

As has been described in accordance with the principles of the present invention, the substrate bonding device facilitating the fabrication of LCD devices formed via a liquid crystal dispensing method is advantageous the overall size of the substrate bonding device may be reduced compared to related art substrate bonding devices because the substrate bonding device of the present invention is not provided with functionality to coat sealant material or dispense liquid crystal material onto substrates. Accordingly, the substrate bonding device provides a simplified design and saves space. Moreover, the volume of the interior space defined by the upper and lower chamber units may be minimized to thereby reduce the amount of time required to evacuate the interior space. By reducing the evacuation time, the amount of time required to fabricate an LCD device may be reduced. Moreover, a simplified structure may be obtained by using the plurality of rotatable cams to align the substrates by adjusting a position of the lower chamber unit.

Further, the second to fourth aspects of the present invention substantially protect the space between the chamber units against from external environment via the case. Accordingly, the introduction of foreign material may be substantially prevented, thereby preventing the generation of defects with LCD devices.

Moreover, as the substrate bonding device of the second aspect of the present invention may permit loading and unloading of the substrate through opposite sides of the substrate bonding device, and LCDs may be manufactured according to an in-line process. Accordingly a series of processes (e.g., loading and unloading substrates) may be carried out substantially simultaneously to provide a substantially continuous fabrication process and shortening an overall amount of time required to fabricate the LCDs.

Further, the substrate bonding device of the third aspect of the present invention may substantially prevent the introduction of foreign material into using a continuous spray of gas, separating an interior space between the chamber units from an external environment. In one aspect of the present invention, the spray of gas may substantially remove foreign material from loader and from the substrates during the loading of the substrates. In another aspect of the present invention, the sprayed gas may include ions and may be directed proximate the substrates to substantially prevent the generation of static electricity when the stages secure the substrates.

Lastly, the substrate bonding device of the fourth aspect of the present invention may substantially prevent the accumulation of micron-sized particles onto the stages, thereby preventing the generation of defects within the LCD caused by the micron-sized particles.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A substrate bonding device for fabricating a liquid crystal display (LCD) panel, comprising: a base frame:

a lower chamber unit mounted to the base frame, wherein the lower chamber unit defines a lower interior space and includes an upper surface;

an upper chamber unit arranged over the lower chamber unit, wherein the upper chamber unit defines an upper interior space, includes a lower surface, and is joinable to the lower chamber unit;

chamber moving means for raising and lowering the upper chamber unit;

an upper stage arranged within the upper interior space for securing a first substrate;

a lower stage arranged within the lower interior space for securing a second substrate;

alignment cameras provided to at least one of the upper and lower chamber units for verifying an alignment state of a plurality alignment marks formed on the first and second substrates;

alignment means arranged at side portions of the lower chamber unit for adjusting an alignment between the first and second substrates; and interlocking means provided to the chamber units for coupling the upper chamber unit to the lower chamber unit.

2. The substrate bonding device as claimed in claim 1, wherein the upper chamber unit includes:

an upper base exposed to an external environment; and an upper chamber plate attached to the lower surface at a periphery of the upper base.

3. The device as claimed in claim 2, wherein the upper chamber plate is provided as a rectangular rim defining the upper interior space within which the upper stage is arranged.

4. The device as claimed in claim 3, wherein the upper stage is fixed to the upper base.

5. The substrate bonding device as claimed in claim 1, wherein the lower chamber unit includes:

a lower base fixed to the base frame; and a lower chamber plate arranged above the upper surface at a periphery of the lower base.

6. The device as claimed in claim 5, wherein the lower chamber plate is provided as a rectangular rim defining the lower interior space within which the lower stage is arranged.

7. The device as claimed in claim 5, wherein the lower chamber plate is moveable in lateral directions with respect to the lower base.

8. The device as claimed in claim 5, wherein the lower stage is fixed to the lower base.

9. The substrate bonding device as claimed in claim 5, wherein the alignment means includes:

a plurality of cams rotatably provided to selectively contact and push peripheral portions of the lower chamber plate;

a plurality of shafts connected to corresponding ones of the plurality of cams; and a plurality of motors fixed to the lower base and connected to corresponding ones of the plurality of cams for rotating the plurality of cams via corresponding ones of the plurality of shafts.

10. The substrate bonding device as claimed in claim 9, wherein each of the plurality of shafts are eccentrically connected to corresponding ones of the plurality cams.

11. The substrate bonding device as claimed in claim 9, wherein each of the plurality of motors include a step motor.

12. The substrate bonding device as claimed in claim 9, wherein the lower chamber unit includes a first pair of opposing sides and a second pair of opposing sides, wherein a length of the first pair of opposing sides is greater than a length of the second pair of opposing sides;

two cams are arranged proximate each side of the first pair of opposing sides; and one cam is arranged proximate each side of the second pair of opposing sides.

13. The substrate bonding device as claimed in claim 12, wherein the cams arranged proximate each side of the second pair of opposing sides are arranged substantially in the middle of each side of the second pair of opposing sides.

14. The substrate bonding device as claimed in claim 12, wherein the cams arranged proximate each side of the first pair of opposing sides are arranged at side portions of each side of the first pair of opposing sides.

15. The substrate bonding device as claimed in claim 12, wherein a distance between oppositely arranged ones of cams remains substantially constant upon being rotated.

16. The substrate bonding device as claimed in claim 1, wherein the alignment means is arranged outside the lower interior space.

17. The substrate bonding device as claimed in claim 1, wherein the interlocking means includes:

a plurality of holes in the upper surface;

a plurality of moveable shafts each having a first end and a second end; and a plurality of linear actuators fixed to the upper chamber unit and to the first ends of the plurality of moveable shafts for projecting the second ends of the plurality of the movable shafts into a corresponding one of the plurality of holes.

18. The substrate bonding device as claimed in claim 1, wherein the chamber moving means includes:

a driving motor fixed to the base frame;

a driving shaft coupled to the driving motor;

a connecting part connected to the driving shaft;

a jack part connected to the upper chamber unit; and a connecting shaft having one end connected to the upper chamber unit, and the other end connected to receive a driving force from the driving shaft.

19. The substrate bonding device as claimed in claim 1, further comprising a case for enclosing the upper and lower chamber units.

20. The substrate bonding device as claimed in claim 19, wherein a side portion of the case includes a first opening for loading substrates into the substrate bonding device.

21. The substrate bonding device as claimed in claim 20, wherein a side portion of the case includes a second opening for unloading substrates into the substrate bonding device.

22. The substrate bonding device as claimed in claim 1, further comprising:

spraying means arranged at side portions of one of the upper and lower chamber units for spraying gas toward sides of the other one of the upper and lower chamber units;

blowing means for blowing the gas through the spraying means; and a first flow tube having a first end in communication with the spraying means and a second end in communication with the blowing means.

23. The substrate bonding device as claimed in claim 22, wherein the spraying means includes a second flow tube arranged at side portions of the upper chamber unit, wherein a plurality of spraying holes are arranged at a bottom portion of the second flow tube.

24. The substrate bonding device as claimed in claim 23, wherein the spraying means further includes an ionizer for emitting ions.

25. The substrate bonding device as claimed in claim 24, wherein the ionizer includes an ion generating tip fitted in front of the plurality of spraying holes in the second flow tube.

26. The substrate bonding device as claimed in claim 22, further comprising an ionizer arranged proximate side portions of one of the upper and lower chamber units for emitting ions toward side portions of the other one of the upper and lower chamber units.

27. The substrate bonding device as claimed in claim 26, wherein the ionizer includes:
   a flow tube arranged at side portions of the upper chamber unit, wherein the flow tube includes a plurality of spraying holes facing toward the upper and lower stages, wherein gas is flowable through the plurality of spraying holes; and
   an ion generating tip arranged proximate a front portion of each of the plurality of spraying holes.

28. The substrate bonding device as claimed in claim 27, wherein the gas includes nitrogen gas.

29. The substrate bonding device as claimed in claim 27, wherein foreign material between the upper and lower chamber units is removable by the gas.

30. The substrate bonding device as claimed in claim 1, further comprising a sealing means provided to at least one of the upper and lower surfaces for sealing an interior space surrounding the first and second substrates, wherein the sealed interior space is definable by joined ones of the upper and lower chamber units.

31. The substrate bonding device as claimed in claim 30, wherein the sealing means includes an O-ring fitted along the upper surface.

32. The substrate bonding device as claimed in claim 1, further comprising:
   first and second reels arranged at opposite side portions of at least one of the upper and lower stages;
   a protection sheet for covering a surface of at least one stage, wherein the protection sheet is scrollable by the first and second reels; and
   a rotating part for rotating the first and second reels.

33. The substrate bonding device as claimed in claim 32, wherein at least one of the upper and lower stages includes an electrostatic chuck for applying an electrostatic charge to secure a corresponding one of the first and second substrates.

34. The substrate bonding device as claimed in claim 33, wherein the electrostatic chuck includes polyimide.

35. The substrate bonding device as claimed in claim 33, wherein the electrostatic chuck includes a plurality of holes for transmitting a suction force to secure the corresponding one of the first and second substrates.

36. The substrate bonding device as claimed in claim 33, wherein the electrostatic charge appliable by the electrostatic chuck is transmittable by the protection sheet.

37. The substrate bonding device as claimed in claim 33, wherein the protection sheet includes a plurality of holes.

38. The substrate bonding device as claimed in claim 37, wherein the plurality of holes in the protection sheet are arrangeable to substantially correspond to a plurality of holes in the electrostatic chuck.

39. The substrate bonding device as claimed in claim 32, wherein the first and second reels are arranged elevationally lower than the surface of the lower stage.

40. The substrate bonding device as claimed in claim 32, wherein the first and second reels are arranged elevationally higher than the surface of the upper stage.

41. The substrate bonding device as claimed in claim 32, further comprising tension adjusting jigs arranged adjacent each of the first and second reels for maintaining the protection sheet to over the surface of the at least one stage to be substantially flat.

42. The substrate bonding device as claimed in claim 41, wherein the tension adjusting jigs are rotatably mounted.

43. The substrate bonding device as claimed in claim 41, wherein the tension adjusting jigs are movable in vertical directions.

44. The substrate bonding device as claimed in claim 41, wherein the tension adjusting jigs are movable in lateral directions.

45. The substrate bonding device as claimed in claim 32, wherein the first and second reels are arranged within at least one of the lower and upper interior spaces.

46. A substrate bonding device for fabricating a liquid crystal display device (LCD), comprising:
   a base frame;
   a lower chamber unit mounted to the base frame, wherein the lower chamber unit defines a lower interior space and includes an upper surface;
   an upper chamber unit arranged over the lower chamber unit, wherein the upper chamber unit defines an upper interior space, includes a lower surface, and is joinable to the lower chamber unit; chamber moving means for raising and lowering the upper chamber unit;
   an upper stage arranged within the upper interior space for securing a first substrate;
   a lower stage arranged within the lower interior space for securing a second substrate;
   a sealing means provided to at least one of the upper and lower surfaces for sealing an interior space surrounding the first and second substrates, wherein the sealed interior space is definable by joined ones of the upper and lower chamber units; and
   a case for enclosing the upper and lower chamber units, wherein the case includes a transparent material, wherein an inside of the substrate bonding device is observable from outside the case through the transparent material.

47. The substrate bonding device as claimed in claim 46, wherein the transparent material includes at least one window for enabling a portion of a substrate bonding process is observable from outside the case through the at least one window.

48. The substrate bonding device as claimed in claim 46, wherein an entirety of the case includes transparent material.

49. The substrate bonding device as claimed in claim 46, wherein the case includes a first opening for loading substrates into the substrate bonding device.

50. The substrate bonding device as claimed in claim 49, wherein the case includes a second opening for unloading substrates from the substrate bonding device.

51. The substrate bonding device as claimed in claim 50, wherein the first and second openings are formed in opposing surfaces of the case.

52. The substrate bonding device as claimed in claim 46, further comprising:
   spraying means arranged at side portions of one of the upper and lower chamber units for spraying gas toward sides of the other one of the upper and lower chamber units;
   blowing means for blowing the gas through the spraying means; and a first flow tube having a first end in communication with the spraying means and a second end in communication with the blowing means for transporting the gas from the blowing means to the spraying means.

53. The substrate bonding device as claimed in claim 52, wherein the spraying means includes a second flow tube arranged at side portions of the upper chamber unit, wherein a plurality of spraying holes are arranged at a bottom portion of the second flow tube.

54. The substrate bonding device as claimed in claim 53, wherein the spraying means further includes an ionizer for emitting ions.

55. The substrate bonding device as claimed in claim 54, wherein the ionizer includes an ion generating tip fitted in front of the plurality of spraying holes in the second flow tube.

56. The substrate bonding device as claimed in claim 52, wherein a peripheral region of the other one of the upper and lower chamber units includes an outwardly sloped surface.

57. The substrate bonding device as claimed in claim 56, wherein the sloped surface is curved.

58. The substrate bonding device as claimed in claim 52, further comprising an ionizer arranged proximate side portions of one of the upper and lower chamber units for emitting ions toward side portions of the other one of the upper and lower chamber units.

59. The substrate bonding device as claimed in claim 58, wherein the ionizer includes:
a flow tube arranged at side portions of the upper chamber unit, wherein the flow tube includes a plurality of spraying holes facing toward the upper and lower stages, wherein gas is flowable through the plurality of spraying holes; and
an ion generating tip arranged proximate a front portion of each of the plurality of spraying holes.

60. The substrate bonding device as claimed in claim 59, wherein the gas includes nitrogen gas.

61. The substrate bonding device as claimed in claim 59, wherein foreign material between the upper and lower chamber units is removable by the gas.

62. The substrate bonding device as claimed in claim 46, further comprising:
first and second reels arranged at opposite side portions of at least one of the upper and lower stages;
a protection sheet for covering a surface of at least one stage, wherein the protection sheet is scrollable by the first and second reels; and
a rotating part for rotating the first and second reels.

63. The substrate bonding device as claimed in claim 62, wherein at least one of the upper and lower stages includes an electrostatic chuck for applying an electrostatic charge to secure a corresponding one of the first and second substrates.

64. The substrate bonding device as claimed in claim 63, wherein the electrostatic chuck includes a polyimide material.

65. The substrate bonding device as claimed in claim 63, wherein the electrostatic chuck includes a plurality of holes for transmitting a suction force to secure the corresponding one of the first and second substrates.

66. The substrate bonding device as claimed in claim 63, wherein the electrostatic charge appliable by the electrostatic chuck is transmittable by the protection sheet.

67. The substrate bonding device as claimed in claim 62, wherein the protection sheet includes a plurality of holes.

68. The substrate bonding device as claimed in claim 67, wherein the plurality of holes in the protection sheet are arrangeable to substantially correspond to a plurality of holes in the electrostatic chuck.

69. The substrate bonding device as claimed in claim 62, wherein the first and second reels are arranged elevationally lower than the surface of the lower stage.

70. The substrate bonding device as claimed in claim 62, wherein the first and second reels are arranged elevationally higher than the surface of the upper stage.

71. The substrate bonding device as claimed in claim 62, further comprising tension adjusting jigs arranged adjacent each of the first and second reels for maintaining the protection sheet to cover the surface of the at least one stage to be substantially flat.

72. The substrate bonding device as claimed in claim 71, wherein the tension adjusting jigs are rotatably mounted.

73. The substrate bonding device as claimed in claim 71, wherein the tension adjusting jigs are movable in vertical directions.

74. The substrate bonding device as claimed in claim 71, wherein the tension adjusting jigs are movable in lateral directions.

75. The substrate bonding device as claimed in claim 62, wherein the first and second reels are arranged within at least one of the lower and upper interior spaces.

76. A substrate bonding device for fabricating a liquid crystal display device (LCD), comprising:
a base frame;
a lower chamber unit mounted to the base frame, wherein the lower chamber unit defines a lower interior space and includes an upper surface;
an upper chamber unit arranged over the lower chamber unit, wherein the upper chamber unit defines an upper interior space, includes a lower surface, and is joinable to the lower chamber unit;
chamber moving means for raising and lowering the upper chamber unit; an upper stage arranged within the upper interior space for securing a first substrate;
a lower stage arranged within the lower interior space for securing a second substrate;
spraying means arranged along side portions of one of the upper and lower chamber units for spraying gas toward side portions of the other one of the upper and lower chamber units;
blowing means for blowing the gas through the spraying means; and
a first flow tube having a first end in communication with the spraying means and a second end in communication with the blowing means;
wherein a peripheral region of the other one of the upper and lower chamber units includes an outwardly sloped surface.

77. The substrate bonding device as claimed in claim 76, wherein the spraying means includes a second flow tube arranged at side portions of the upper chamber unit, wherein a plurality of spraying holes are arranged at a bottom portion of the second flow tube.

78. The substrate bonding device as claimed in claim 77, wherein the spraying means further includes an ionizer for emitting ions.

79. The substrate bonding device as claimed in claim 78, wherein the ionizer includes an ion generating tip fitted in front of the plurality of spraying holes in the second flow tube.

80. The substrate bonding device as claimed in claim 76, wherein the sloped surface is curved.

81. The substrate bonding device as claimed in claim 76, further comprising an ionizer arranged proximate side portions of one of the upper and lower chamber units for emitting ions toward side portions of the other one of the upper and lower chamber units.

82. The substrate bonding device as claimed in claim 81, wherein the ionizer includes:
a flow tube arranged at side portions of the upper chamber unit, wherein the flow tube includes a plurality of spraying holes facing toward the upper and lower stages, wherein gas is flowable through the plurality of spraying holes; and
an ion generating tip arranged proximate a front portion of each of the plurality of spraying holes.

83. The substrate bonding device as claimed in claim 82, wherein the gas includes nitrogen gas.

84. The substrate bonding device as claimed in claim 82, wherein foreign material between the upper and lower chamber units is removable by the gas.

85. The substrate bonding device as claimed in claim 79, further comprising:
first and second reels arranged at opposite side portions of at least one of the upper and lower stages;
a protection sheet for covering a surface of at least one stage, wherein the protection sheet is scrollable by the first and second reels; and
a rotating part for rotating the first and second reels.

86. The substrate bonding device as claimed in claim 85, wherein at least one of the upper and lower stages includes an electrostatic chuck for applying an electrostatic charge to secure a corresponding one of the first and second substrates.

87. The substrate bonding device as claimed in claim 86, wherein the electrostatic chuck includes a polyimide material.

88. The substrate bonding device as claimed in claim 86, wherein the electrostatic chuck includes a plurality of holes for transmitting a suction force to secure the corresponding one of the first and second substrates.

89. The substrate bonding device as claimed in claim 86, wherein the electrostatic charge appliable by the electrostatic chuck is transmittable by the protection sheet.

90. The substrate bonding device as claimed in claim 86, wherein the protection sheet includes a plurality of holes.

91. The substrate bonding device as claimed in claim 90, wherein the plurality of holes in the protection sheet are arrangeable to substantially correspond to a plurality of holes in the electrostatic chuck.

92. The substrate bonding device as claimed in claim 86, wherein the electrostatic chuck includes a polyimide material.

93. The substrate bonding device as claimed in claim 85, wherein the first and second reels are arranged elevationally lower than the surface of the lower stage.

94. The substrate bonding device as claimed in claim 85, wherein the first and second reels are arranged elevationally higher than the surface of the upper stage.

95. The substrate bonding device as claimed in claim 85, further comprising tension adjusting jigs arranged adjacent each of the first and second reels for maintaining the protection sheet to over the surface of the at least one stage to be substantially flat.

96. The substrate bonding device as claimed in claim 95, wherein the tension adjusting jigs are rotatably mounted.

97. The substrate bonding device as claimed in claim 95, wherein the tension adjusting jigs are movable in vertical directions.

98. The substrate bonding device as claimed in claim 95, wherein the tension adjusting jigs are movable in lateral directions.

99. The substrate bonding device as claimed in claim 85, wherein the first and second reels are arranged elevationally higher than the surface of the upper stage.

100. The substrate bonding device as claimed in claim 85, wherein the first and second reels are arranged within at least one of the lower and upper interior spaces.

101. A substrate bonding device for fabricating a liquid crystal display device, comprising:
an upper stage for securing a first substrate of an LCD device;
a lower stage for securing a second substrate of the LCD device;
first and second reels arranged at opposite side portions of at least one of the upper and lower stages;
a protection sheet for substantially covering a surface of at least one stage, wherein the protection sheet is scrollable by the first and second reels; and
a rotating part for rotating the first and second reels,
wherein at least one of the upper and lower stages includes an electrostatic chuck for applying an electrostatic charge to secure a corresponding one of the first and second substrates, and
wherein the protection sheet includes a plurality of holes.

102. The substrate bonding device as claimed in claim 101, wherein the electrostatic chuck includes a plurality of holes for transmitting a suction force to secure the corresponding one of the first and second substrates.

103. The substrate bonding device as claimed in claim 101, wherein the electrostatic charge appliable by the electrostatic chuck is transmittable by the protection sheet.

104. The substrate bonding device as claimed in claim 101, wherein the plurality of holes in the protection sheet are arrangeable to substantially correspond to a plurality of holes in the electrostatic chuck.

105. The substrate bonding device as claimed in claim 101, wherein the first and second reels are arranged elevationally lower than the surface of the lower stage.

106. The substrate bonding device as claimed in claim 101, further comprising:
a lower chamber unit, wherein the lower chamber unit defines a lower interior space within which the lower stage is arranged; and
an upper chamber unit over the lower chamber unit, wherein the upper chamber unit defines an upper interior space within which the upper stage is arranged,
wherein the first and second reels are arranged within at least one of the lower and upper interior spaces.

107. The substrate bonding device as claimed in claim 101, further comprising tension adjusting jigs arranged adjacent each of the first and second reels for maintaining the protection sheet to over the surface of the at least one stage to be substantially flat.

108. The substrate bonding device as claimed in claim 107, wherein the tension adjusting jigs are rotatably mounted.

109. The substrate bonding device as claimed in claim 107, wherein the tension adjusting jigs are movable in vertical directions.

110. The substrate bonding device as claimed in claim 107, wherein the tension adjusting jigs are movable in lateral directions.

111. A substrate bonding device for fabricating a liquid crystal display panel, comprising: a base frame:
a lower chamber unit mounted to the base frame, wherein the lower chamber unit defines a lower interior space and includes an upper surface, and wherein the lower chamber unit includes a first pair of opposing sides and a second pair of opposing sides, wherein a length of the first pair of opposing sides is substantially greater than a length of the second pair of opposing sides;

an upper chamber unit arranged over the lower chamber unit, wherein the upper chamber unit defines an upper interior space, includes a lower surface, and is joinable to the lower chamber unit;

chamber moving means for raising and lowering the upper chamber unit;

an upper stage arranged within the upper interior space for securing a first substrate;

a lower stage arranged within the lower interior space for securing a second substrate;

alignment cameras provided to at least one of the upper and lower chamber units for verifying an alignment state of a plurality of alignment marks formed on the first and second substrates;

alignment means arranged at side portions of the lower chamber unit for adjusting an alignment between the first and second substrates;

interlocking means substantially provided to the chamber units for coupling the upper chamber unit to the lower chamber unit and;

a loader and an unloader located at substantially opposite sides of the bonding device for substantially simultaneous processing of substrates.

112. A substrate bonding device for fabricating a liquid crystal display device (LCD), comprising:

a base frame;

a lower chamber unit mounted to the base frame, wherein the lower chamber unit defines a lower interior space and includes an upper surface, and wherein the lower chamber unit includes a first pair of opposing sides and a second pair of opposing sides, wherein a length of the first pair of opposing sides is substantially greater than a length of the second pair of opposing sides;

an upper chamber unit arranged over the lower chamber unit, wherein the upper chamber unit defines an upper interior space, includes a lower surface, and is joinable to the lower chamber unit; chamber moving means for raising and lowering the upper chamber unit;

an upper stage arranged within the upper interior space for securing a first substrate;

a lower stage arranged within the lower interior space for securing a second substrate;

a sealing means provided to at least one of the upper and lower surfaces for sealing an interior space surrounding the first and second substrates, wherein the sealed interior space is definable by joined ones of the upper and lower chamber units;

a case for enclosing the upper and lower chamber units; wherein the case includes a transparent material, wherein an inside of the substrate bonding device is observable from outside the case through the transparent material and;

a loader and an unloader located at substantially opposite sides of the bonding device for substantially simultaneous processing of substrates.

113. A substrate bonding device for fabricating a liquid crystal display device (LCD), comprising:

a base frame;

a lower chamber unit mounted to the base frame, wherein the lower chamber unit defines a lower interior space and includes an upper surface, and wherein the lower chamber unit includes a first pair of opposing sides and a second pair of opposing sides, wherein a length of the first pair of opposing sides is substantially greater than a length of the second pair of opposing sides;

an upper chamber unit arranged over the lower chamber unit, wherein the upper chamber unit defines an upper interior space, includes a lower surface, and is joinable to the lower chamber unit;

chamber moving means for raising and lowering the upper chamber unit; an upper stage arranged within the upper interior space for securing a first substrate;

a lower stage arranged within the lower interior space for securing a second substrate;

spraying means arranged substantially along side portions of one of the upper and lower chamber units for spraying gas toward side portions of the other one of the upper and lower chamber units;

blowing means for blowing the gas through the spraying means;

a first flow tube having a first end in communication with the spraying means and a second end in communication with the blowing means;

interlocking means provided to the chamber units for substantially coupling the upper chamber unit to the lower chamber unit; and a loader and an unloader located at substantially opposite sides of the bonding device for substantially simultaneous processing of substrates.

* * * * *